US012789304B2

(12) United States Patent
Marburger et al.

(10) Patent No.: US 12,789,304 B2
(45) Date of Patent: Nov. 10, 2026

(54) ADJUSTABLE LENGTH BLOCK ASSEMBLIES

(71) Applicant: FIREBALL TOOL WORKS LLC, Spokane, WA (US)

(72) Inventors: Jason A. Marburger, Spokane, WA (US); Elliott Ian Wong, Alhambra, CA (US)

(73) Assignee: FIREBALL TOOL WORKS LLC, Spokane, WA (US)

(*) Notice: Subject to any disclaimer, the term of this patent is extended or adjusted under 35 U.S.C. 154(b) by 312 days.

(21) Appl. No.: 18/419,348

(22) Filed: Jan. 22, 2024

(65) Prior Publication Data

US 2024/0165760 A1 May 23, 2024

Related U.S. Application Data

(63) Continuation-in-part of application No. 17/400,939, filed on Aug. 12, 2021, now Pat. No. 11,878,383.

(51) Int. Cl.
*B23Q 3/10* (2006.01)
*B25B 5/02* (2006.01)

(52) U.S. Cl.
CPC . *B23Q 3/10* (2013.01); *B25B 5/02* (2013.01)

(58) Field of Classification Search
CPC .. B25H 1/08; B25H 1/10; B23Q 3/102; B25B 5/02
See application file for complete search history.

(56) References Cited

U.S. PATENT DOCUMENTS 3,506,253 A * 4/1970 Swenson .................. B23Q 3/06 269/137
4,805,889 A 2/1989 Liepse
5,324,013 A * 6/1994 Marino ..................... B25B 1/12 269/137
5,595,378 A 1/1997 Martinsson et al.
(Continued)

FOREIGN PATENT DOCUMENTS

DE 102024105648 A1 7/2025
FR 1334524 A 8/1963
(Continued)

OTHER PUBLICATIONS

"International Search Report and Written Opinion", Application No. PCT/US21/47887, Dec. 7, 2021, 9 pages.
(Continued)

*Primary Examiner* — Tyrone V Hall, Jr.
(74) *Attorney, Agent, or Firm* — FIG. 1 Patents

(57) ABSTRACT

Adjustable length block assemblies are described. In an example, an adjustable length block assembly includes a block body with a tooth surface, a plate member with a tooth surface, and an adjustable block component. The tooth surfaces of the plate member and the block body are engageable to interlock the plate member with the block body. Thus, the block body is engageable with the plate member at multiple different positions to support repositioning of the adjustable length block assembly. Further, the adjustable block component is operable to control an overall length of the adjustable length block assembly to support precise adjustments to the adjustable length block assembly.

20 Claims, 65 Drawing Sheets

(56) References Cited

U.S. PATENT DOCUMENTS

| | | | | |
|---|---|---|---|---|
| 6,126,158 | A * | 10/2000 | Engibarov | B25B 5/08 269/157 |
| 10,357,859 | B1 * | 7/2019 | Reed | B25B 1/2489 |
| 11,878,383 | B2 | 1/2024 | Marburgher et al. | |
| 2020/0156218 | A1 | 5/2020 | Chang | |
| 2023/0047132 | A1 | 2/2023 | Marburger et al. | |

FOREIGN PATENT DOCUMENTS

| | | | |
|---|---|---|---|
| GB | 591087 | A | 8/1947 |
| GB | 1217741 | A | 12/1970 |
| WO | 2014072092 | A1 | 5/2014 |

OTHER PUBLICATIONS

U.S. Appl. No. 17/400,939, filed May 25, 2023, "Non-Final Office Action", U.S. Appl. No. 17/400,939, filed May 25, 2023, 9 pages.

U.S. Appl. No. 17/400,939, filed Sep. 18, 2023, "Notice of Allowance", U.S. Appl. No. 17/400,939, filed Sep. 18, 2023, 5 pages.

* cited by examiner

4000b

4006

4008

ADJUSTABLE LENGTH BLOCK ASSEMBLIES

RELATED APPLICATION

This application is a continuation-in-part of and claims priority to U.S. patent application Ser. No. 17/400,939, filed Aug. 12, 2021, entitled "Positionable Block Assemblies", the entire disclosure of which is hereby incorporated by reference herein in its entirety.

BACKGROUND

Welders, carpenters, and personnel in general often desire to arrange workpieces at various positions to apply work to the workpieces, such as for designing, joining, finishing, etc. A welder, for instance, frequently desires to weld metal workpieces together at specific positions and angles. To assist personnel in arranging and holding workpieces in position, gridded tables have been developed that include grids of holes that are arranged to receive and hold various tools, such as pins, clamps, stop blocks, etc. Stop blocks, for instance, can be arranged on a grid table via pins that attempt to secure the stop blocks in various positions. Conventional pin and stop block implementations, however, do not provide for secure attachment to a grid table and are prone to unwanted movement during use. Further, precise placement of a stop block on a grid is difficult due to imprecision involved in a convention pin and stop block assembly. Thus, conventional tools lack the ability to quickly and accurately align workpieces in various scenarios and to ensure that workpiece alignment does not change while work is being applied to a workpiece.

SUMMARY

Adjustable length block assemblies are described. Example block assemblies, e.g., adjustable length block assemblies, include a block body with a tooth surface and a plate member with a tooth surface. The tooth surfaces of the plate member and the block body are engageable to interlock the plate member with the block body. Further, the block body is engageable with the plate member at multiple different positions to enable variable positioning of a block assembly. In some examples, the block assemblies include an adjustable block component that is operable to adjust a length of the block assembly to achieve a variety of different working scenarios.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
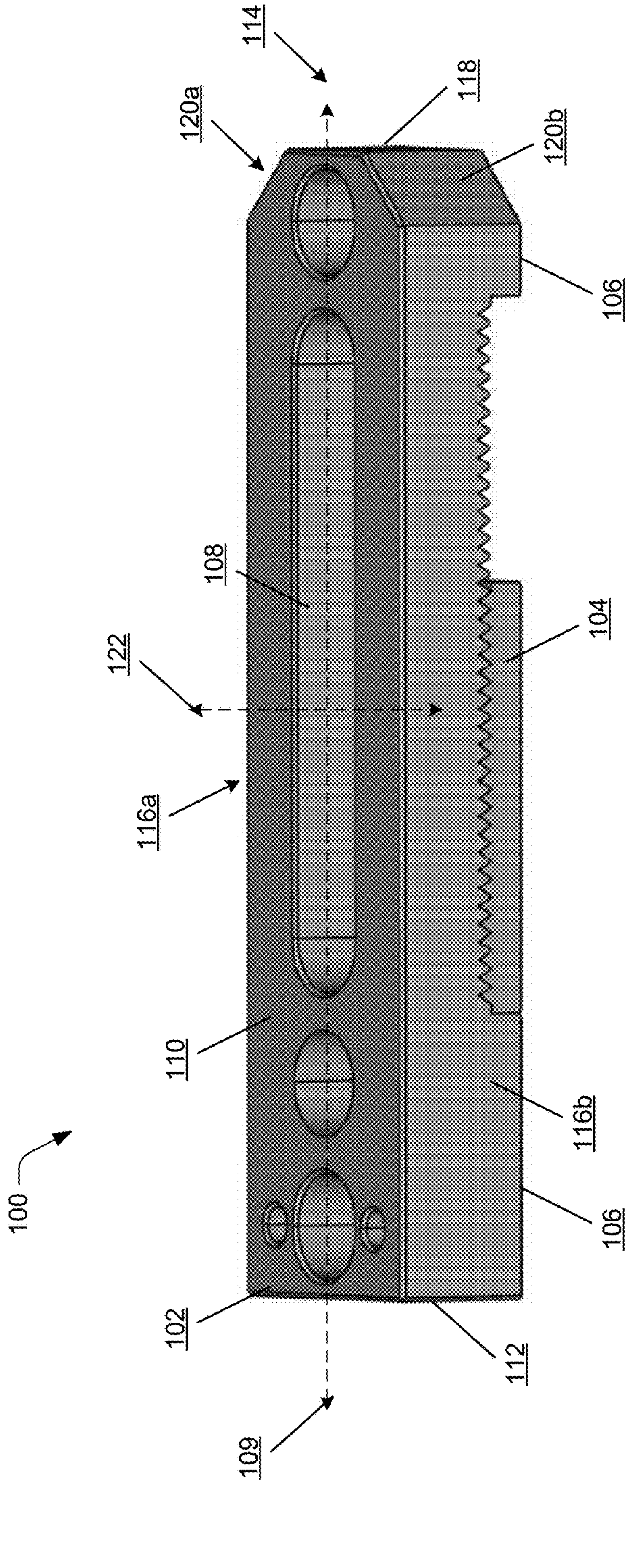
FIG. 1 depicts a side view of an example block assembly in accordance with one or more implementations.

Adjustable length block assemblies are described. In an example implementation a block assembly, e.g., an adjustable length block assembly, includes a block body and a plate member that is engageable with the block body. The block body, for instance, includes a first tooth surface and the plate member includes a second tooth surface that is engageable with the first tooth surface of the block body to generate a block assembly. Further, the block body and the plate member include apertures through which pins and/or other fasteners can be placed to attach the block assembly to an adjacent surface, such as a gridded surface of a worktable.

In an example implementation a block body of a block assembly includes an extended pin slot, and a plate member includes circular apertures that align with the pin slot. To attach the block assembly to a grid surface, the tooth surfaces of the plate member and the block body are engaged, and pins are positioned through the pin slot of the block body, the apertures of the plate member, and apertures within the grid surface. With the pins engaged through the block assembly and with the grid surface, the block body can be repositioned on the grid surface by disengaging the tooth surface of the block body from the tooth surface of the plate member and moving the block body relative to the plate member. The pin slot in the block body, for instance, allows movement of the block body while the pins remain engaged through the block body. Further, engagement of the pins through the apertures in the plate member prevents movement of the plate member during movement of the block body. Generally, this enables precise positioning and repositioning of the block body.

In at least one implementation of a block assembly the tooth patterns of the block body and the plate member are formed at specific increments of a linear measurement scale, such as units of the Imperial measurement system and/or metric system. Accordingly, precise positioning of the block body relative to the plate member can be achieved via movement of the block body relative to the plate member by engaging the tooth surface of the block body with the tooth surface of the plate member at different positions. Further, at least some implementations utilize differing tooth patterns in a block body and a plate member to provide for different incremental engagement of a block body with a plate member.

In at least one implementation of a block assembly the tooth surfaces of the block body and the plate member are formed as surface features, such as via machining and/or casting of the respective parts of the block assembly. Alternatively or additionally modular tooth fittings can be utilized that are attachable to a block body and/or a plate member to enable toothed engagement of a plate member with a block body as part of a block assembly. For instance, a block body and/or a plate member include a fitting cavity into which a tooth fitting can be removably attached. Alternatively or additionally, a tooth fitting can be attached to a side surface of a block body and/or a plate member to provide the block body and/or plate member with a tooth surface for toothed engagement.

In some implementations, the block assembly is an adjustable length block assembly. For instance, the block body includes a first mounting interface that is attachable to a second mounting interface of an adjustable block component. The adjustable block component is generally operable to provide fine adjustment to an overall length of the adjustable length block assembly, e.g., continuous adjustment between zero and one fourth of an inch. To do so, in one example the adjustable block component includes a mounting body, a sliding body, and an actuation component. The mounting body and the sliding body form a wedge, such that actuation of the actuation component causes the sliding body to move relative to an angled face of the mounting body. During movement, a front surface of the adjustable block component is configured to remain substantially perpendicular to a plane defined by the top surface of the block body. In this way, the adjustable length block assembly is capable of minute length changes to better contact and secure a workpiece.

Accordingly, the described block assemblies provide for a multitude of different block configurations and workpiece arrangements not provided by conventional tools for aligning workpieces. In the following discussion, example block assemblies are described that may employ the techniques described herein. Example scenarios are also described in which the example block assemblies are utilized to align example workpieces. The example block assemblies are not limited to performance of the example scenarios.

Adjustable Length Block Assemblies

FIGS. 1-41 depict various attributes of example block assemblies that are operable to employ techniques described herein. FIG. 1 depicts a side view of an example block assembly 100 in accordance with one or more implementations described herein. The block assembly 100 includes a block body 102 and a plate member 104 engaged with a bottom surface 106 of the block body 102. The block body 102 forms a closed pin slot 108 that is formed longitudinally along a longitudinal axis 109 of the block body 102 and through a top surface 110 of the block body 102. In at least one implementation the pin slot 108 forms an extended and elongated oval slot extending longitudinally along block body 102. As further described below, pins can be placed through the pin slot 108 to secure the block assembly 100 to an adjacent surface, such as a gridded work surface. The block body 102 includes various surfaces that can be used for workpiece and/or tool arrangement including a rear surface 112, a front surface 114, a side surface 116*a*, and a side surface 116*b*.

In this particular example the front surface 114 includes multiple surfaces includes a face surface 118, an angled surface 120*a*, and an angled surface 120*b*. The face surface 118, for instance, is coplanar with a plane that runs codirectionally with a lateral axis 122 of the block body 102. The angled surfaces 120*a*, 120*b* are angled relative to the face surface 118 and the side surfaces 116*a*, 116*b*. In at least one implementation, the angled surface 120*a* intersects the side surface 116*a* and the face surface 118 at an acute angle (e.g., 45 degrees) and the angled surface 120*b* intersects the side surface 116*b* and the face surface 118 at an acute angle, e.g., 45 degrees. As further detailed below, the differently angled surfaces of the front surface 114 enable workpieces to be arranged at different angles relative to one another.

Figure 2A:
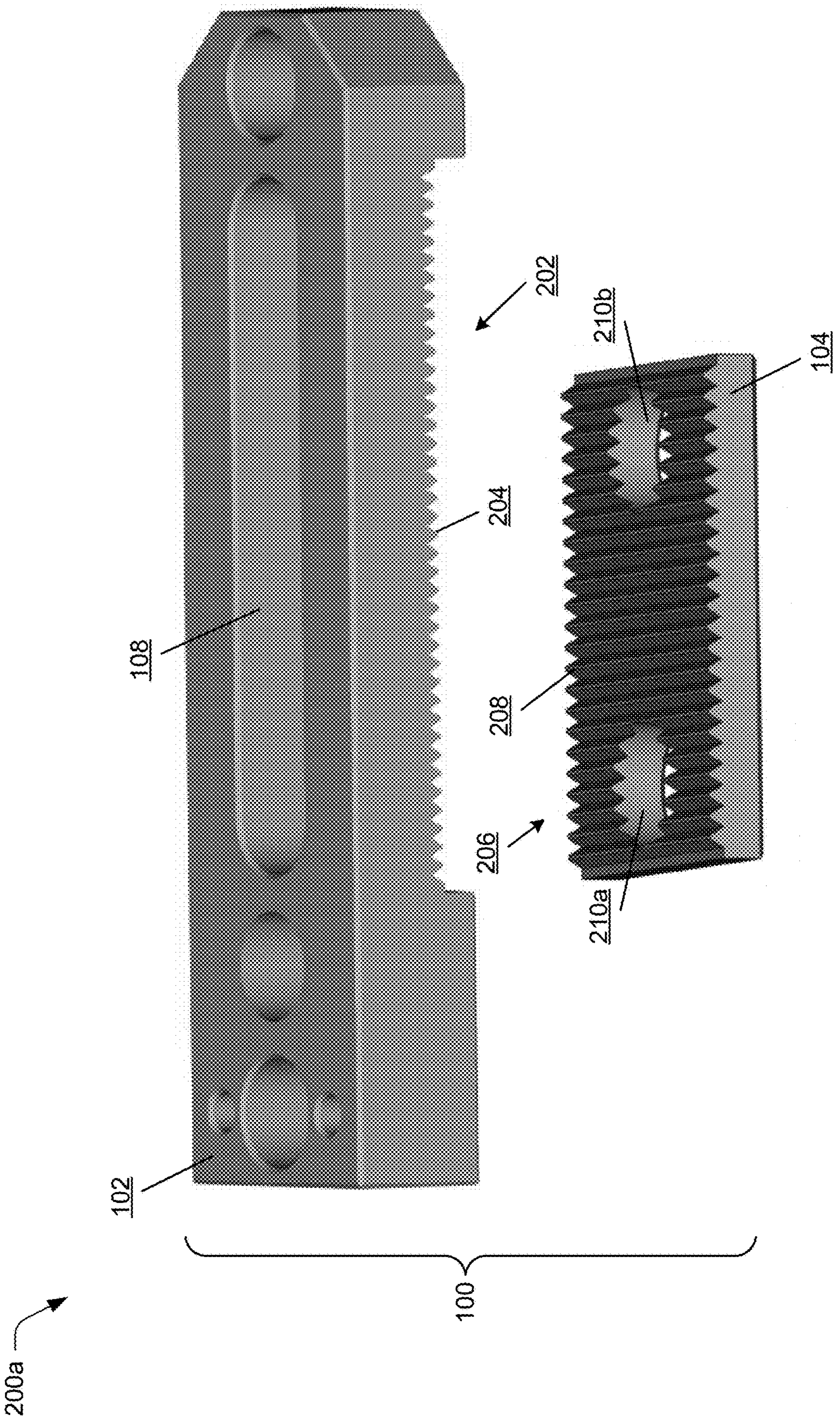
FIG. 2*a* depicts a view of a block assembly with a plate member disengaged from a block body in accordance with one or more implementations.

FIG. 2*a* depicts a view 200*a* of the block assembly 100 with the plate member 104 disengaged from the block body 102. The view 200*a* illustrates an interior surface 202 of the block body 102 including a side view of a body tooth surface 204, and a top surface 206 of the plate member 104 including a plate tooth surface 208. The interior surface 202 forms an interior cavity of the of the block body 102 in which the plate member 104 is engageable. Further, the pin slot 108 extends through an interior of the block body 102 from the top surface 206 to the interior surface 202. The body tooth surface 204 forms teeth according to a particular tooth pattern, and the plate tooth surface 208 forms teeth according to a particular tooth pattern. As described below, the body tooth surface 204 and the plate tooth surface 208 engage (e.g., mesh) with one another to cooperatively form the block assembly 100. Generally, the plate member 104 is dimensioned to fit within the interior surface 202 to enable the plate tooth surface 208 and the body tooth surface 204 to engage. The view 200*a* also illustrates that the plate member 104 forms a pin aperture 210*a* and a pin aperture 210*b* that are formed to enable pins and/or other attachment mechanisms to protrude through the plate member 104. For instance, pins can be placed through the pin slot 108 and penetrate the pin apertures 210*a*, 210*b* to enable attachment of the block assembly to an adjacent surface.

Figure 2B:
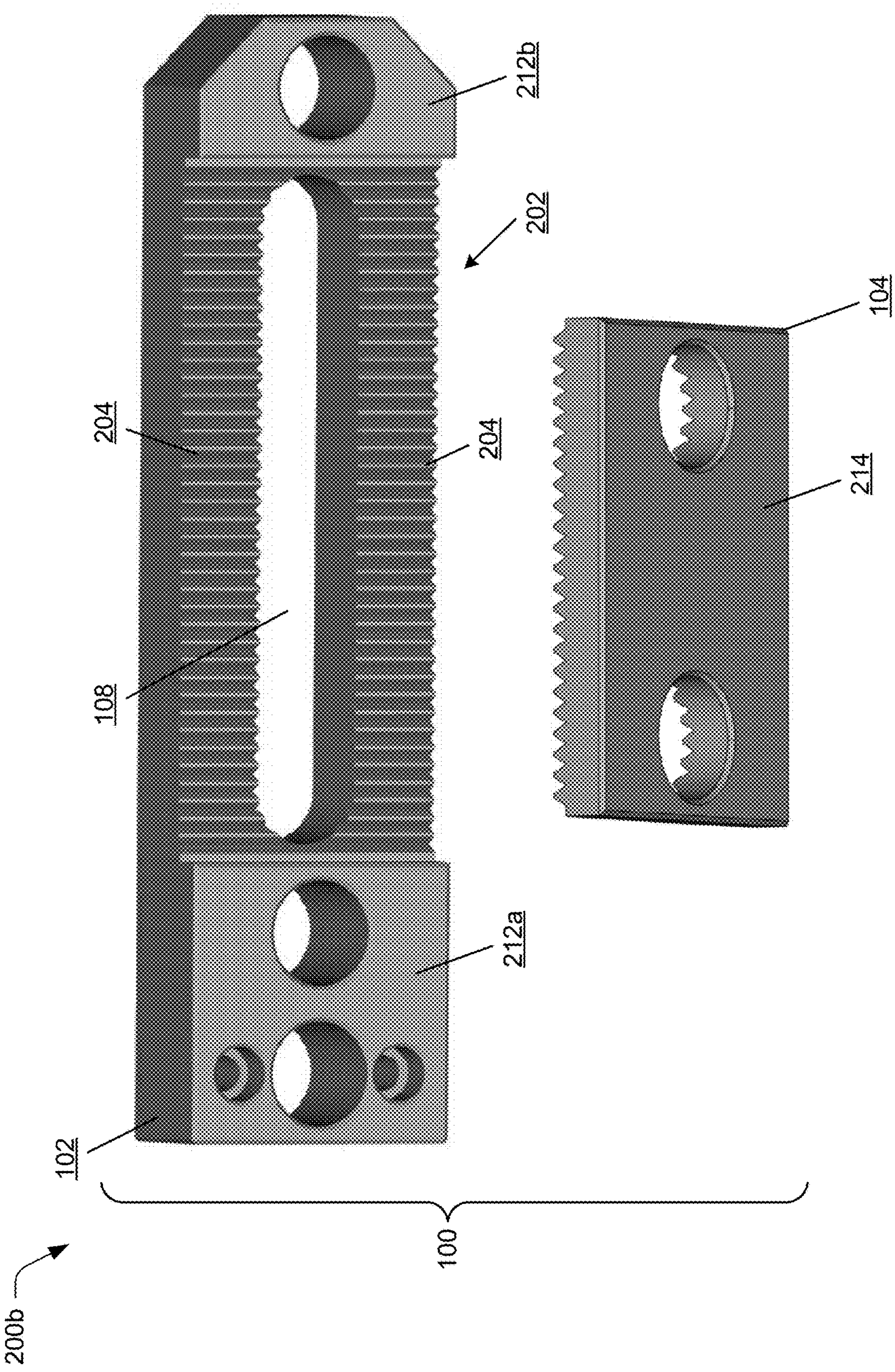
FIG. 2*b* depicts a view of a block assembly with a plate member disengaged from a block body in accordance with one or more implementations.

FIG. 2*b* depicts a view 200*b* of the block assembly 100 with the plate member disengaged from the block body 102. The view 200*b* illustrates the interior surface 202 of the block body 102 with the body tooth surface 204. In this particular example the pin slot 108 is formed within the body tooth surface 204. The view 200*b* also illustrates bottom surfaces 212*a*, 212*b* of the block body 102 and a bottom surface 214 of the plate member 104. With the plate member 104 engaged with the block body 102, the bottom surfaces 212*a*, 212*b*, 214 form a bottom surface of the block assembly 100. For instance, with the plate member 104 engaged within the interior surface 202, the bottom surface 214 of the plate member 104 is substantially coplanar with the bottom surfaces 212*a*, 212*b*.

Figure 3:
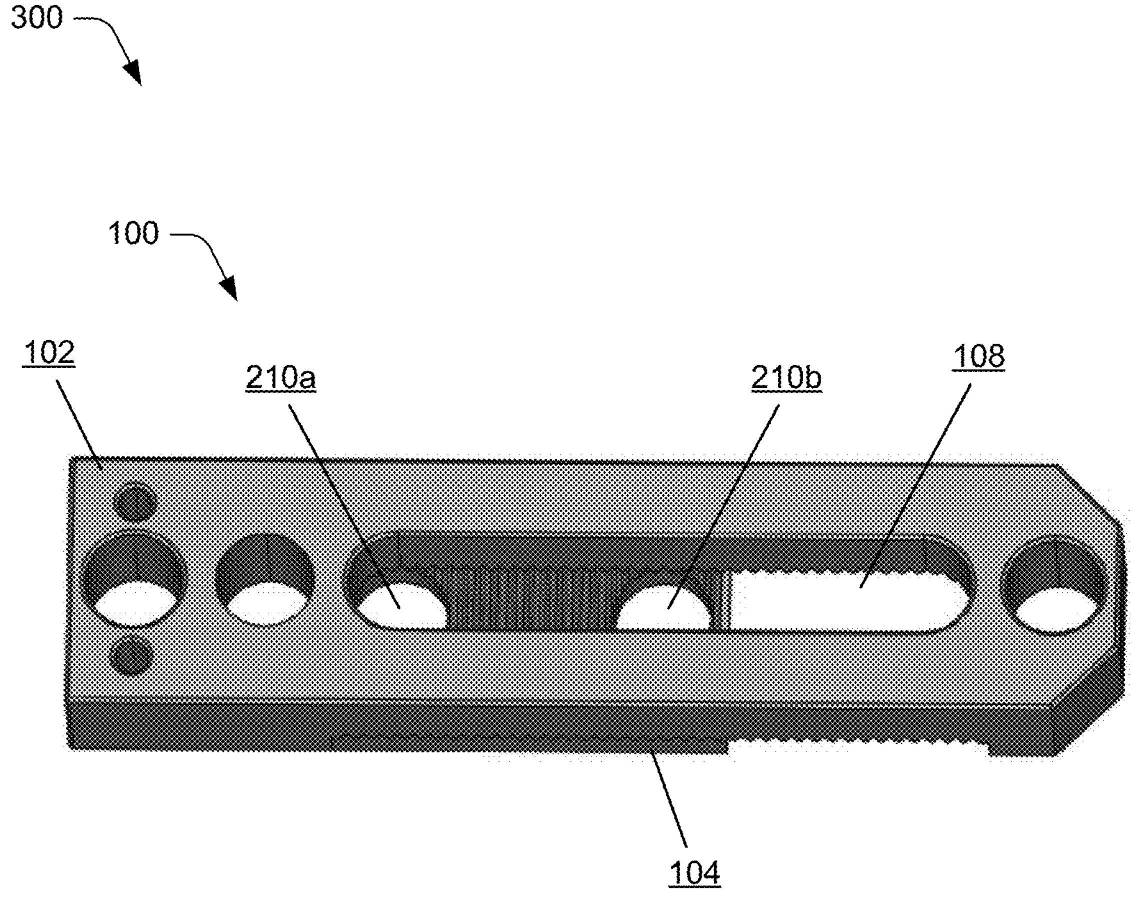
FIG. 3 depicts a top view of a block assembly with a plate member engaged with a block body in accordance with one or more implementations.

FIG. 3 depicts a top view 300 of the block assembly 100 with the plate member 104 engaged with the block body 102. In the view 300, the pin apertures 210*a*, 210*b* are visible through the pin slot 108. As illustrated, with the plate member 104 engaged with the block body 102, the pin apertures 210*a*, 210*b* align with the pin slot 108.

Figure 4:
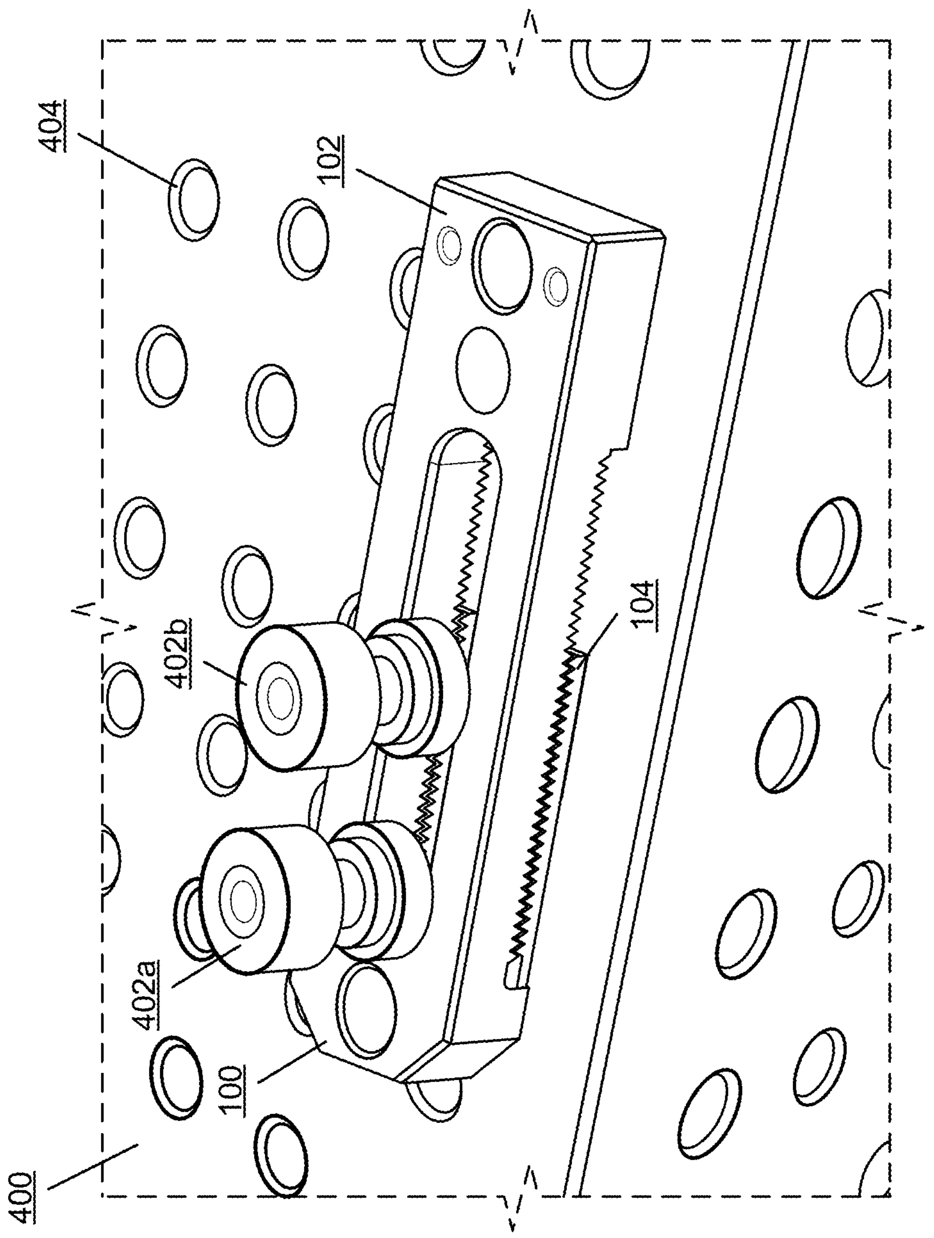
FIG. 4 depicts a block assembly attached to a grid surface in accordance with one or more implementations.

FIG. 4 depicts the block assembly 100 attached to a grid surface 400 via a pin 402*a* and a pin 402*b*. The grid surface 400, for instance, is part of a table and/or other work surface and includes grid apertures 404 into which various apparatus can be placed, such as the pins 402*a*, 402*b*. Generally, the pins 402*a*, 402*b* are placed through the pin slot 108, penetrate the pin apertures 210*a*, 210*b* (not illustrated here) and penetrate a set of grid apertures 404 to fasten the block assembly 100 to the grid surface 400. With the plate member 104 engaged with the block body 102 and the pins 402*a*, 402*b* fastening the block assembly 100 to the grid surface 400, the block assembly 100 is securely fastened to the grid surface 400 and resists movement such as during placement and manipulation of a workpiece against the block assembly 100.

Figure 5:
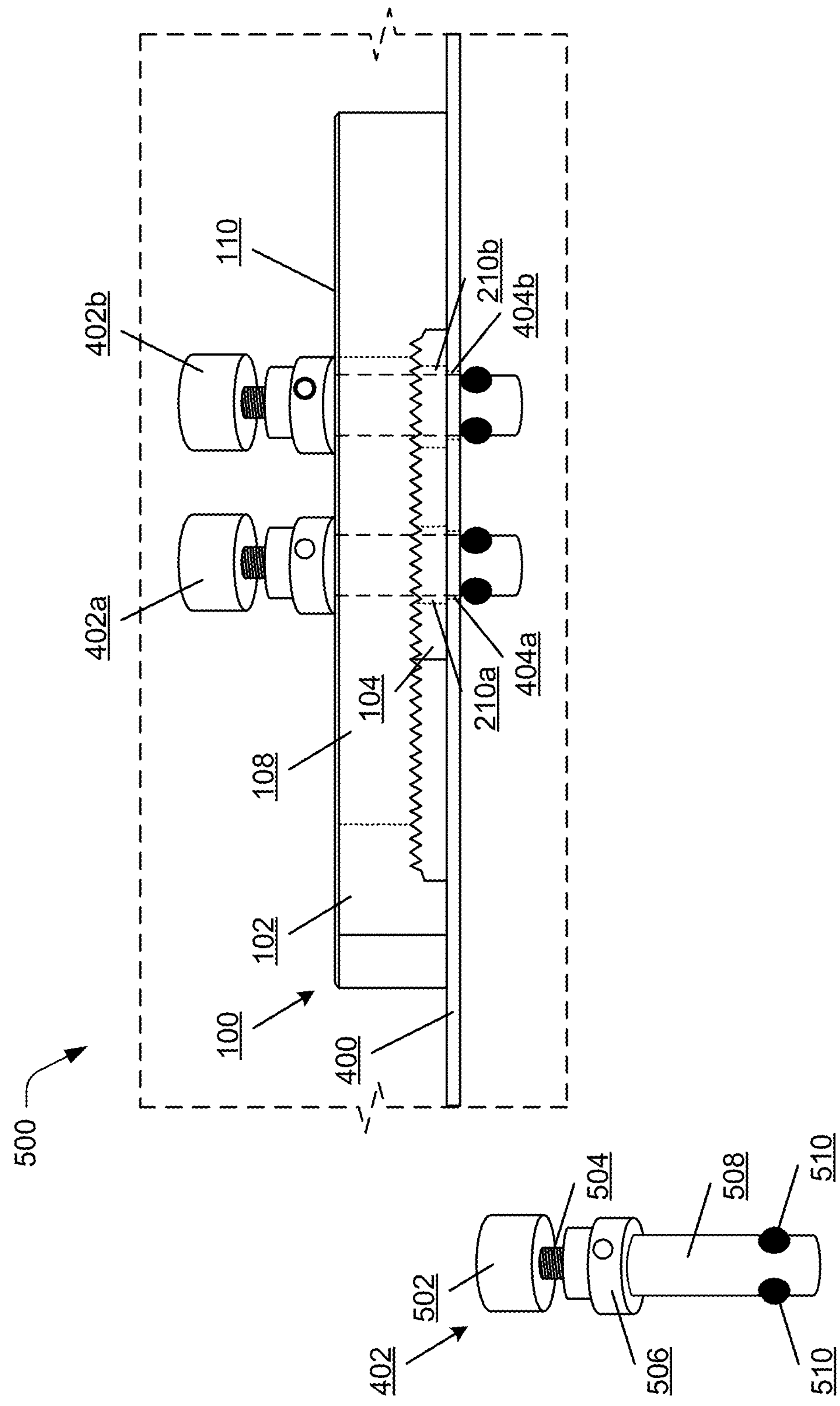
FIG. 5 depicts a side view with a partial transparent view of a block assembly attached to a grid surface in accordance with one or more implementations.

FIG. 5 depicts a side view 500 with a partial transparent view of the block assembly attached to the grid surface 400, such as described with reference to FIG. 4. The side view 500 shows the pins 402*a*, 402*b* penetrating the pin slot 108 of the block body 102, the pin apertures 210*a*, 210*b* of the plate member 104, and grid apertures 404*a*, 404*b* of the grid surface 400.

A pin 402 is also depicted that represents an implementation of the pins 402*a*, 402*b* and for purpose of explaining operation of the pins 402*a*, 402*b* for fastening the block assembly 100 to an adjacent surface, e.g., the grid surface 400. The pin 402 includes a pin head 502 attached to a threaded pin rod 504, a pin collar 506, a pin shaft 508, and pin bearings 510. To enable the pin 402 to be used to fasten the block assembly 100 to the grid surface 400, the pin head 502 is loosened (e.g., rotated counterclockwise) to cause the pin rod 504 to move upwardly within the pin shaft 508. This movement of the pin rod 504 releases tension on the pin bearings 510 and enables the pin bearings 510 to move inwardly into the pin shaft 508.

Accordingly, the pin 402 is placed through the pin slot 108, a pin aperture of the pin apertures 210*a*, 210*b*, and a grid aperture 404. The pin head 502 is then tightened (e.g., rotated clockwise) to cause the pin rod 504 to move downwardly within the pin shaft 508 and to apply pressure to the pin bearings 510 to force the pin bearings 510 outwardly from the pin shaft 508. The pin bearings 510 are captured within the pin shaft 508 such that they do not escape from the pin shaft 508 but are held in an outwardly protruding state relative to the pin shaft 508 by pressure from the pin rod 504. Generally, a containment circumference created by the pin bearings 510 is larger than a circumference of a grid aperture 404 and thus when the pin 402 is tightened the pin bearings 510 prevent the pin 402 from moving upwardly through the grid aperture 404. Further, the pin collar 506 engages with the top surface 110 of the block body 102 and tightening of the pin 402 causes the pin collar 506 to apply pressure against the top surface 110.

Accordingly, engagement of the pin bearings 510 with the grid surface 400 and the pin collar 506 with the top surface 110 of the block body 102 secures the block assembly 100 to the grid surface 400. This particular example of attachment of the block assembly 100 to an adjacent surface is presented for purpose of example only, and a wide variety of different attachment techniques can be utilized in accordance with the described implementations, such as using a threaded fastener (e.g., a threaded bolt) and a threaded grid aperture 404, a bolt and nut placed through the block assembly 100 and a grid aperture 404, and/or any other suitable attachment mechanism.

Figure 6:
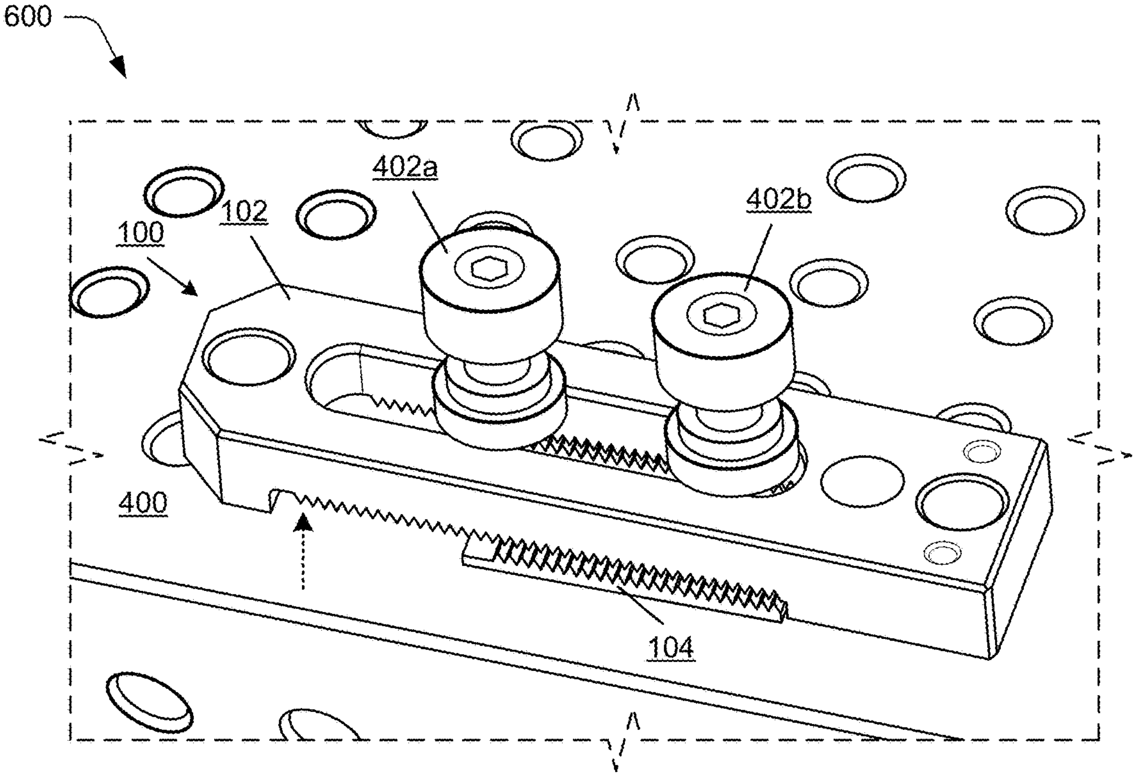
FIG. 6 depicts a scenario in which a block assembly is placed in a position to enable movement in accordance with one or more implementations.

FIG. 6 depicts a scenario 600 in which the block assembly 100 is placed in a position to enable movement. In the scenario 600, the pins 402*a*, 402*b* are loosened (e.g., as described above) which reduces pressure applied by the pins 402*a*, 402*b* holding the block assembly 100 against the grid surface 400. This enables the block body 102 to be moved away from the plate member 104 (e.g., upwardly away from the grid surface 400) and to disengage from the plate member 104.

Figure 7:
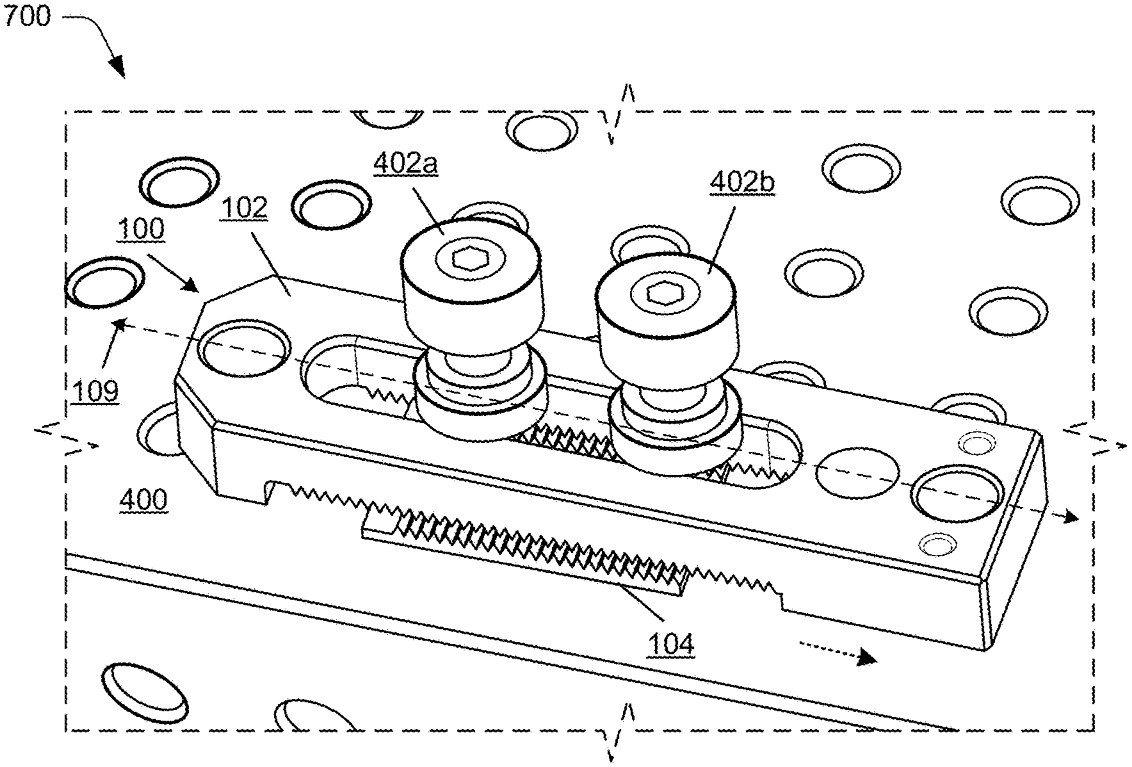
FIG. 7 depicts a scenario in which a block assembly is repositioned in accordance with one or more implementations.

FIG. 7 depicts a scenario 700 in which the block assembly 100 is repositioned. The scenario 700, for example, represents a continuation of the scenario 600. In the scenario 700, the block body 102 is disengaged from the plate member 104 and is repositioned relative to the plate member 104. For instance, with the pins 402*a*, 402*b* loosened, a user lifts the block body 102 to disengage from the plate member 104 and then repositions the block body 102 relative to the plate member 104. The user, for example, slides the block body 102 along the grid surface 400 and longitudinally relative to the longitudinal axis 109. Generally, during movement of the block body 102 the pins 402*a*, 402*b* remain engaged within respective pin apertures 210*a*, 210*b* within the plate member 104 and grid apertures 404 and thus hold the plate member 104 in position, e.g., to prevent movement of the plate member 104 during movement of the block body 102.

Figure 8:
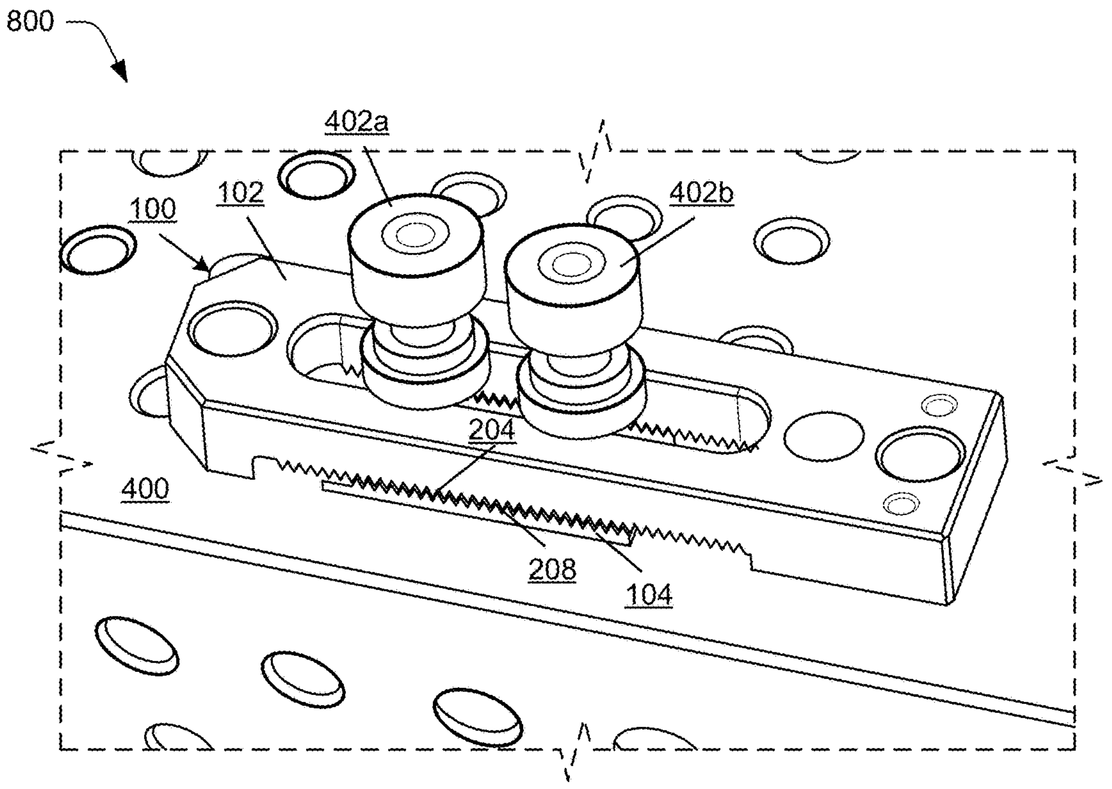
FIG. 8 depicts a scenario in which a block assembly is fastened to an adjacent surface in accordance with one or more implementations.

FIG. 8 depicts a scenario 800 in which the block assembly 100 is fastened to an adjacent surface. The scenario 800, for instance, represents a continuation of the scenario 700. In the scenario 800 the block body 102 is engaged with the plate member 104. For instance, after moving the block body 102 along the grid surface 400 (e.g., as described in the scenario 700), a user releases the block body 102 such that the body tooth surface 204 of the block body 102 engages with the plate tooth surface 208 of the plate member 104. Further, the pins 402*a*, 402*b* can be tightened to fasten the block assembly 100 against the grid surface 400. In at least one implementation, the block body movement and repositioning depicted in the scenarios 700, 800 occurs without movement of the plate member 104. For instance, during movement of the block body 102, the pins 402*a*, 402*b* remain engaged within respective pin apertures 210*a*, 210*b* within the plate member 104 and grid apertures 404 and thus hold the plate member 104 in position, thus preventing movement of the plate member 104 during movement of the block body 102. Accordingly, by maintaining attachment of the plate member 104 during movement of the block body 102, precise positioning of the block assembly 100 is enabled.

Figure 9:
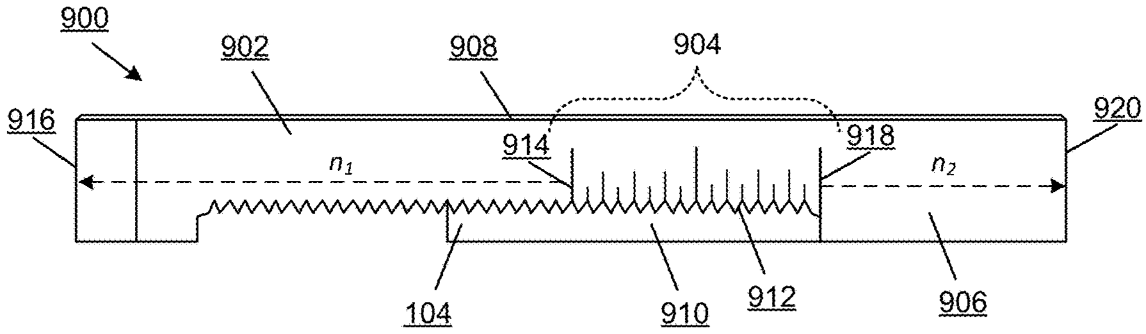
FIG. 9 depicts a block assembly in accordance with one or more implementations.

FIG. 9 depicts a block assembly 900 which represents a variation and/or extension of the block assembly 100 introduced above. The block assembly 900 includes a block body 902 engaged with the plate member 104. The block assembly 900 includes a scale region 904 on a side surface 906 of the block body 902. Generally, the scale region 904 is a visual representation of a particular linear measurement scale and includes linear measurement markings that each represent a particular linear measurement unit in the particular measurement scale. The linear measurement units in the scale region 904 can be configured using any suitable measurement system such as the Imperial measurement system (e.g., foot, inches, fractions of inches), the metric measurement system (e.g., centimeter, millimeter), and/or any other suitable linear measurement convention.

The scale region 904 can be applied to the side surface 906 using any suitable application technique, such as engraving into the side surface 906, painting onto the side surface 906, use of a sticker or other adhesive object that include the scale region 904 and that is applied to the side surface 906, and/or combinations thereof. Additionally or alternatively to applying the scale region 904 on the side surface 906, the scale region 904 can be applied to other regions of the block body 902 (e.g., a top surface 908), to the plate member 104 (e.g., on a side surface 910 of the plate member 104), and/or combinations thereof. In this particular example, scale marks of the scale region 904 are aligned with portions of a tooth surface 912 of the block body 902. Generally, this enables repositioning of the block body 902 relative to the plate member 104 to correspond to increments of the scale region 904, which is discussed in more detail below.

In at least one implementation, the scale region 904 is positioned at a predefined distance from a region and/or regions of the block body 902. For instance, consider that the scale region 904 is configured using measurement units u, e.g., wherein u represents metric units and/or Imperial units. In one example, a scale mark 914 of the scale region 904 is placed $n_1$ units of u from a front surface 916 of the block body 902. Consider, for example, that the scale region 904 represents units u of inches, e.g., two total inches with scale marks at $\frac{1}{8}^{th}$ inch increments. Accordingly, the scale mark 914 can be placed $n_1$ inches from the front surface 916, e.g., where $n_1=4$. As an alternative or additional implementation a scale mark 918 can be placed $n_2$ units of u from a rear surface 920 of the block body 902. For instance, utilizing the inches example above, the scale mark 918 is placed $n_2$ inches from the rear surface 920, e.g., where $n_2=2$. In at least one implementation the distance of the scale region 904 from a particular surface/surfaces of the block body 902 is visually marked on the block body 902, such as to visually indicate a number of units u that the scale region 904 is positioned from a particular surface of the block body 902. Generally, this provides for precise placement and repositioning of the block assembly 900. While the example above is described with reference to Imperial units, other suitable measurement systems can additionally or alternatively be utilized, such as metric units.

Figure 10A:
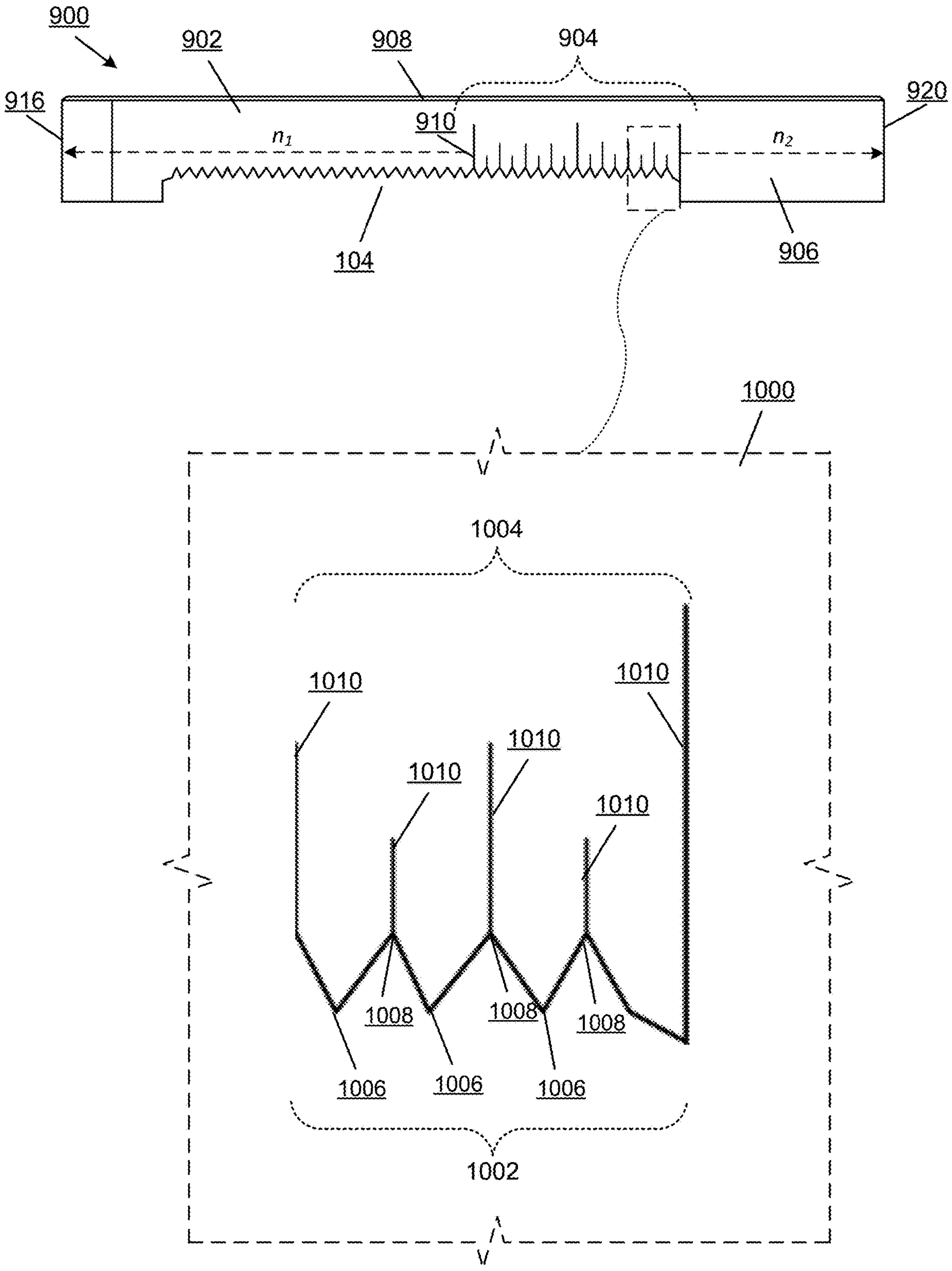
FIG. 10*a* depicts a detailed illustration of a block body section of a block body in accordance with one or more implementations.

FIG. 10*a* depicts a detailed illustration of a block body section 1000 of the block body 902 in accordance with one or more implementations. The block body section 1000 includes a tooth surface section 1002 of the tooth surface 912 and a scale region section 1004 of the scale region 904. The tooth surface section 1002 includes teeth 1006 and valleys 1008 between the teeth 1006, and the scale mark section 1004 includes scale marks 1010. In this particular example each scale mark 1010 is aligned with a particular valley 1008. Generally, this enables repositioning of the block body 902 relative to the plate member 104 to increment according to linear measurement units reflected in the scale marks 1010.

Figure 10B:
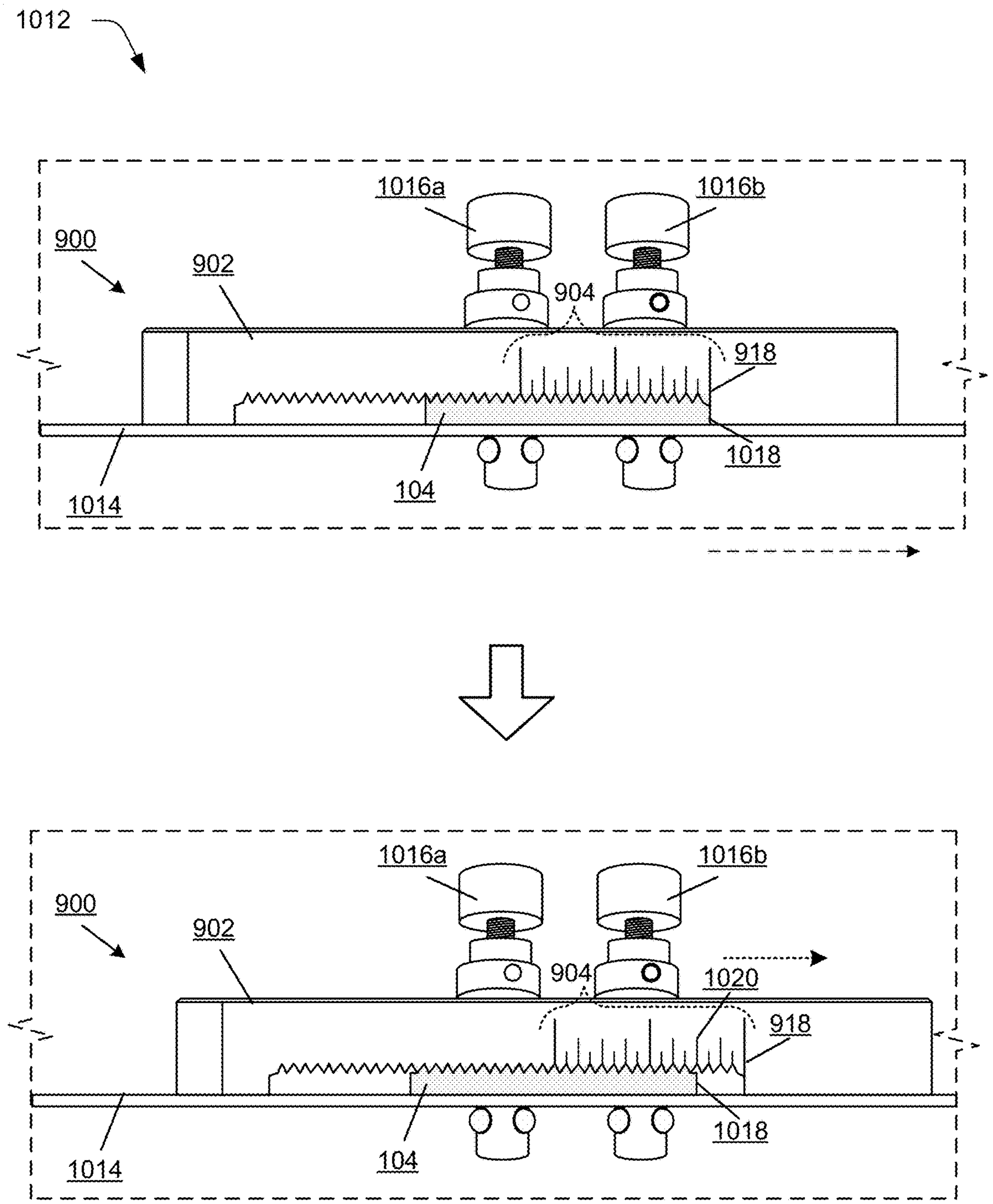
FIG. 10*b* depicts a scenario for repositioning of a block assembly based on the scale region in accordance with one or more implementations.

FIG. 10*b* depicts a scenario 1012 for repositioning of the block assembly 900 based on the scale region 904 in accordance with one or more implementations. In the upper section of the scenario 1012 the block assembly 900 is depicted as fastened to a grid surface 1014, such as described above. Proceeding to the lower section of the scenario 1012, the block body 902 is repositioned on the grid surface 1014 relative to the plate member 104. For instance, as described above, pins 1016*a*, 1016*b* are loosened and a user lifts the block body 902 and repositions the block body 902 while the plate member 104 remains fastened to the grid surface 1014.

In conjunction with repositioning the block body 902 an amount of movement of the block body 902 is reflected by alignment of the plate member 104 with the scale region 904. For instance, in the upper section of the scenario 1012 an edge 1018 of the plate member 104 is aligned with the scale mark 918 of the scale region 904. After repositioning the block body 902 the edge 1018 is aligned with a scale mark 1020 of the scale region 904. Accordingly a number of linear measurement units between the scale marks 918, 1020 indicates a distance of movement of the block body 902. In this particular example, the edge 1018 moves four scale marks from the scale mark 918 to the scale mark 1020 thus indicating that the block body 902 moved four linear measurement units. For instance, in an example where the scale region 904 is configured to indicate 2 total inches, the scale marks indicate $\frac{1}{8}^{th}$ inch increments and thus the block body 902 moved ½ inch. Thus, utilizing the scale region 904 to demarcate linear measurement units for movement of the block body 902 enables precise manipulation and placement of the block assembly 900.

Figure 10C:
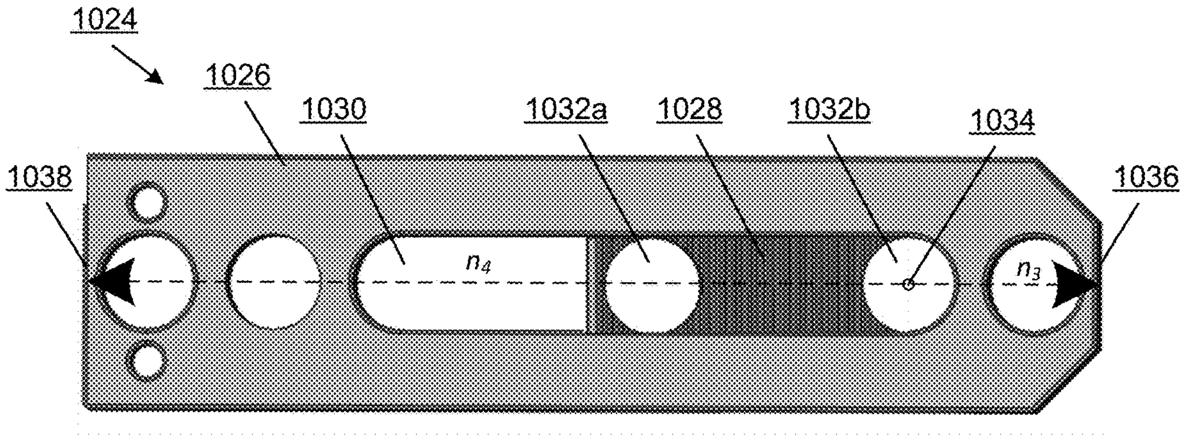
FIG. 10*c* depicts an implementation of a block assembly that utilizes a distance offset for a plate assembly in accordance with one or more implementations.

FIG. 10*c* depicts an implementation of a block assembly 1024 that utilizes a distance offset for a plate assembly in accordance with one or more implementations. The block assembly 1024 includes a block body 1026 and a plate member 1028 engaged with the block body 1026, such as via tooth surfaces on the block body 1026 and the plate member 1028, as described above. Generally, the block body 1026 and the plate member 1028 can incorporate various features and attributes of block bodies and plate members discussed throughout this disclosure.

Further, the block body 1026 includes a pin slot 1030 and the plate member 1028 includes pin apertures 1032*a*, 1032*b* that can be utilized for attachment of the block assembly 1024, such as to an adjacent surface, e.g., a gridded surface. In this particular example the pin aperture 1032*b* is positioned within the plate member 1028 such that with the plate member 1028 engaged with the block body 1026, a center 1034 of the pin aperture 1032*b* is offset from a front surface 1036 of the block body 1026 by a distance $n_3$ units. Alternatively or additionally, the center 1034 is offset from a rear surface 1038 of the block body 1026 by a distance of $n_4$ units. In at least one implementation, $n_3$, $n_4$ are non-integer values of a particular linear measurement unit, such as inches, centimeters, millimeters, etc.

Figure 10D:
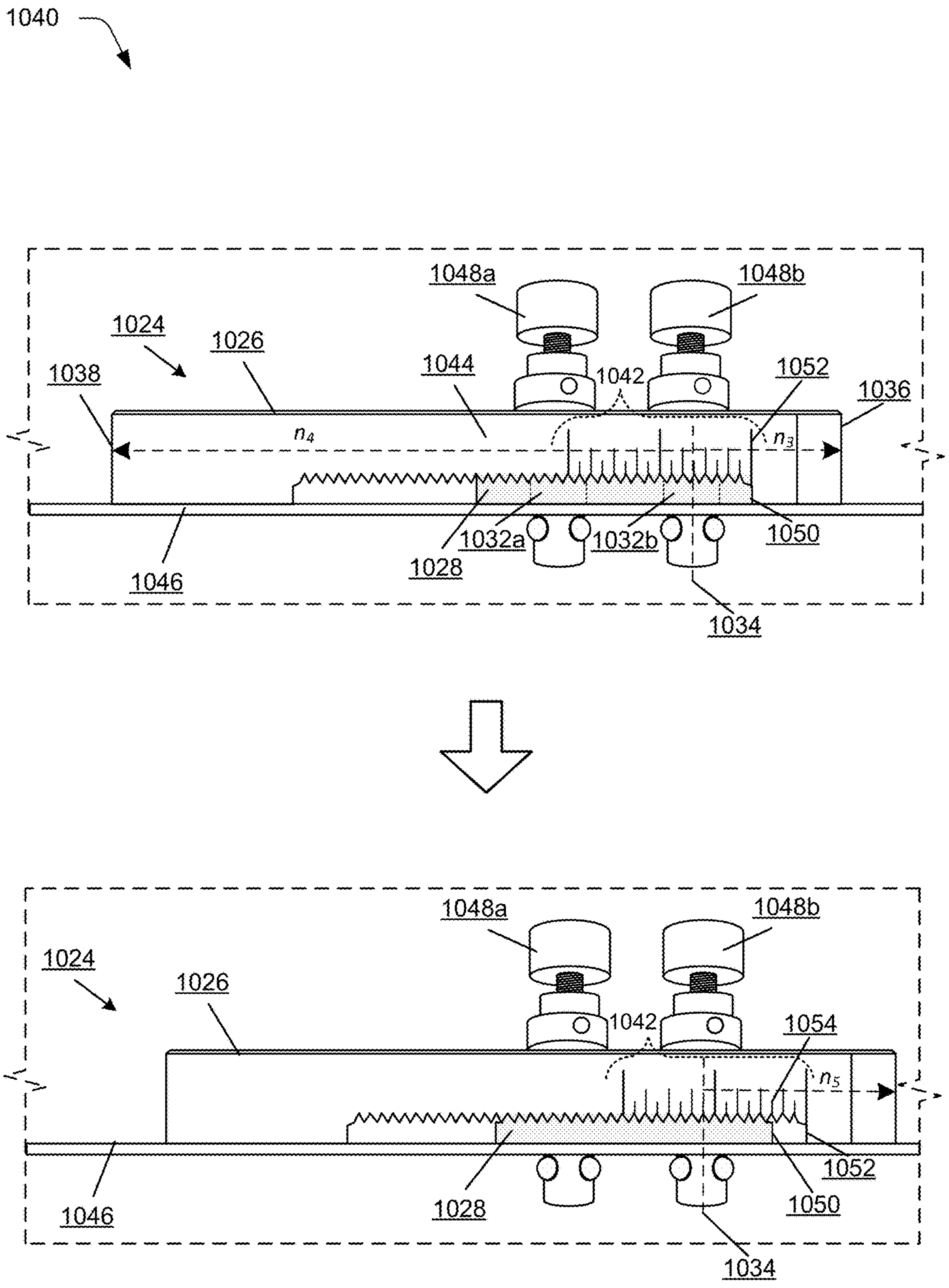
FIG. 10*d* depicts a scenario illustrating aspects for implementing a distance offset utilizing a plate assembly in accordance with one or more implementations.

FIG. 10*d* depicts a scenario 1040 illustrating aspects for implementing a distance offset utilizing a plate assembly in accordance with one or more implementations. The upper portion of the scenario 1040 includes the block assembly 1024 introduced above including the block body 1026 and the plate member 1028, and the block body 1026 includes a scale region 1042 on a side surface 1044 of the block body 1026. Further, the block assembly 1024 is attached to a grid surface 1046 via pins 1048*a*, 1048*b*. Depicted through the plate member 1028 are outlines of the pin apertures 1032*a*, 1032*b* in the plate member 1028 through which the pins 1048*a*, 1048*b* are placed to attach the block assembly 1024 to the grid surface 1046. The center 1034 of the pin aperture 1032*b* is also depicted at the distance $n_3$ from the front surface 1036 and the distance $n_4$ from the rear surface 1038.

As mentioned above, the distances $n_3$, $n_4$ are non-integer values of a particular linear measurement unit. For instance, consider that scale marks of the scale region 1042 are placed at increments of an inch, e.g., $1/8^{th}$ inch increments. Accordingly, the position of the center 1034 of the pin aperture 1032*b* can be positioned at an offset from $1/8^{th}$ inch increments, e.g., at a $1/16^{th}$ inch offset from the front surface 1036. For instance, with the plate member 1028 positioned at a rightmost engaged position relative to the block body 1026, the distance $n_3$ represents an integer value n' of units u from the front surface 1036 plus an offset value o. Utilizing units u of inches, for example, n'=2, o=$1/16^{th}$, and thus $n_3$=2 and $1/16^{th}$ inches from the front surface 1036. The distance $n_4$ may also be positioned using a similar offset value and/or a variation on the offset value.

Proceeding to the lower portion of the scenario 1040, the block body 1026 is repositioned on the grid surface 1046 relative to the plate member 1028. For instance, as described above, pins 1048*a*, 1048*b* are loosened and a user lifts the block body 1026 and repositions the block body 1026 while the plate member 1028 remains fastened to the grid surface 1046.

In conjunction with repositioning the block body 1026 an amount of movement of the block body 1026 is reflected by alignment of the plate member 1028 with the scale region 1042. For instance, in the upper section of the scenario 1040 an edge 1050 of the plate member 1028 is aligned with a scale mark 1052 of the scale region 1042. After repositioning the block body 1026 the edge 1050 is aligned with a scale mark 1054 of the scale region 1042. Accordingly a number of linear measurement units between the scale marks 1052, 1054 indicates a distance of movement of the block body 1026. In this particular example, the edge 1050 moves three scale marks from the scale mark 1052 to the scale mark 1054 thus indicating that the block body 1026 moved three linear measurement units. For instance, in an example where the scale marks of the scale region 1042 positioned at $1/8^{th}$ inch increments, this indicates that the block body 1026 moved 3/8 inch. Further, considering the offset distance of the center 1034 of the pin aperture 1032*b*, the center 1034 is now a distance of $n_5$ from the front surface 1036, wherein $n_5=n_3+3/8$. For instance, where $n_3$=2 and $1/16^{th}$ inches, $n_5$=2 and $7/16^{th}$ inches. Thus, while movement of the block body 1026 relative to the plate member 1028 occurs in $1/8^{th}$ increments (e.g., based on pitch distances of the teeth of the block body 1026 and the plate member 1028), the distance between the plate member 1028 and the front surface 1036 and/or the rear surface 1038 occurs offset by the offset value o, e.g., $1/16^{th}$ inch offsets.

Generally, different plate members with no offset values and/or different offset values can be utilized to enable movement of a block assembly accordingly to different offsets, e.g., to enable surfaces of a block body to be positioned based on different measurement units and offset values to accommodate a variety of different usage scenarios.

Figure 11A:
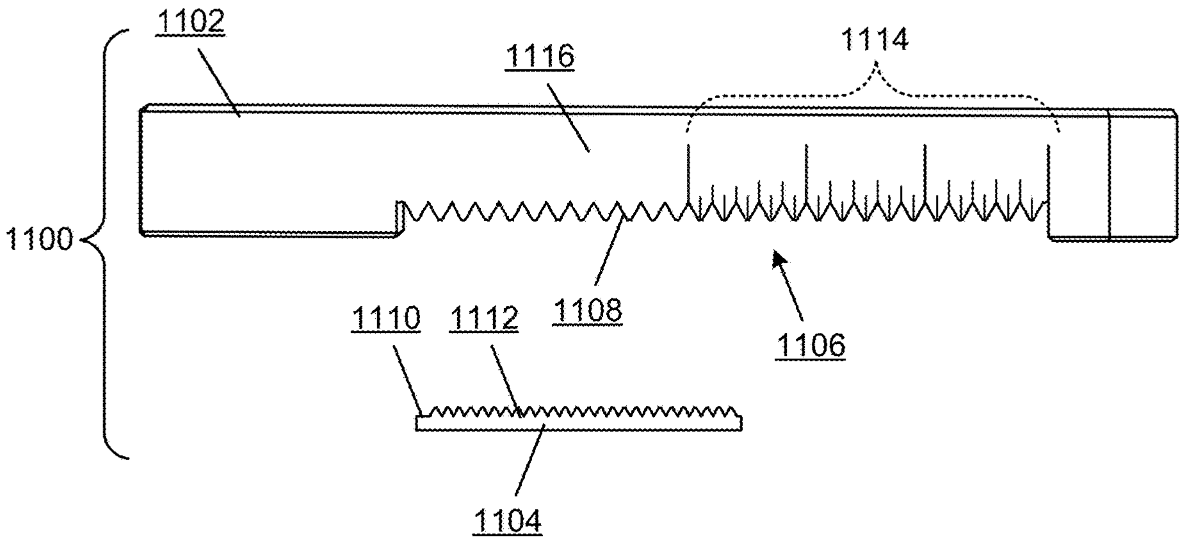
FIG. 11*a* depicts a block assembly that utilizes differing tooth patterns in accordance with one or more implementations.

FIG. 11*a* depicts a block assembly 1100 that utilizes differing tooth patterns in accordance with one or more implementations. The block assembly 1100, for instance, represents an extension and/or variation of the block assemblies described above and/or below. The block assembly 1100 includes a block body 1102 and a plate member 1104 which are illustrated in FIG. 11*a* as being disengaged from one another. The block body 1102 forms an interior surface 1106 which includes a body tooth surface 1108, and the plate member 1104 includes a top surface 1110 which includes a plate tooth surface 1112. The block body 1102 also includes a scale region 1114 formed on a side surface 1116 of the block body 1102 and adjacent a portion of the body tooth surface 1108.

Notice in this particular example that the plate tooth surface 1112 exhibits a differing tooth pattern than the body tooth surface 1108. The plate tooth surface 1112, for instance, has smaller teeth and a finer (e.g., more dense) tooth pattern (e.g., smaller tooth pitch) than the body tooth surface 1108. In at least one implementation this enables for fine adjustment and positioning of the block body 1102 relative to the plate member 1104. This example is not to be construed as limiting, however, and other implementations can utilize a plate tooth surface 1112 with a coarser tooth pattern, e.g., larger tooth pitch.

Figure 11B:
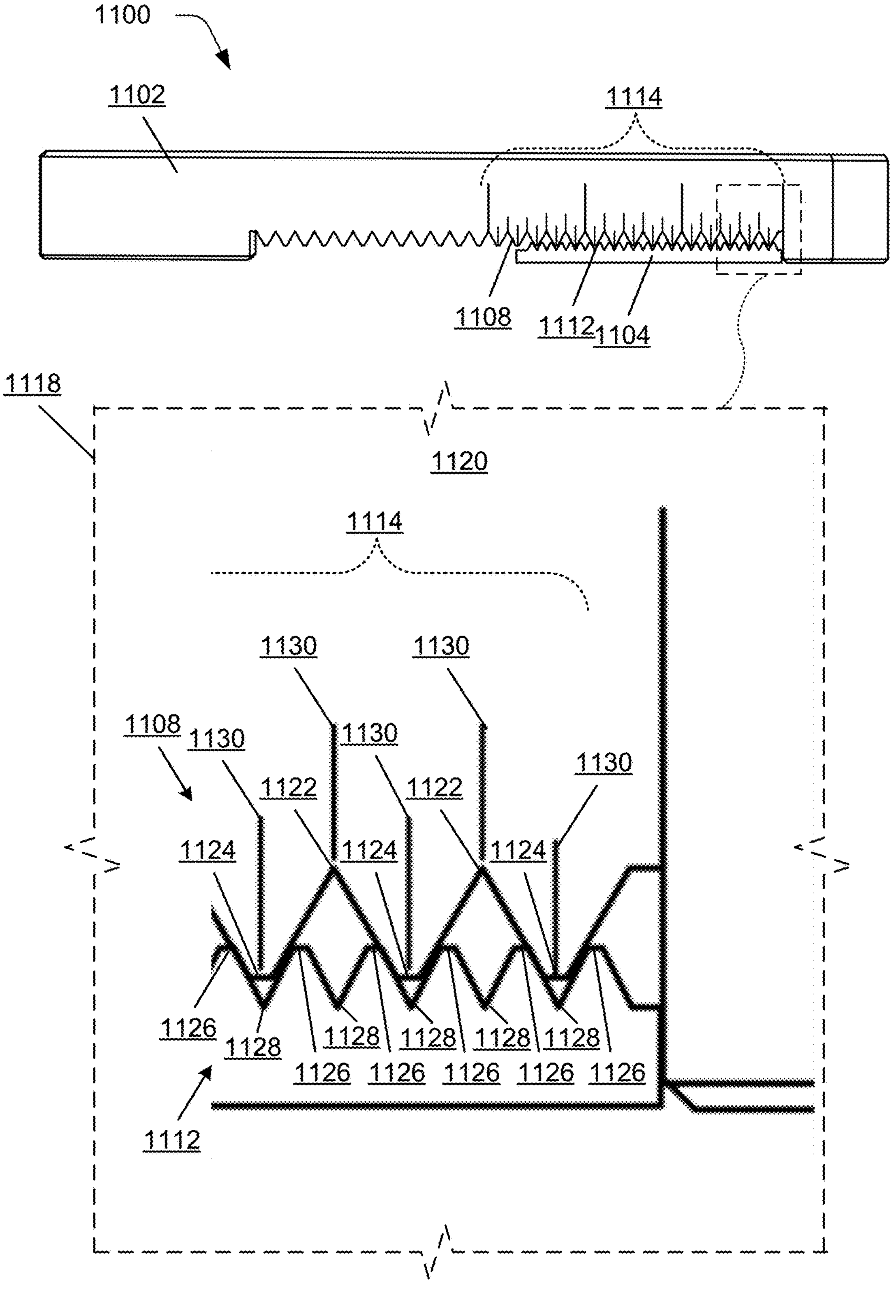
FIG. 11*b* depicts a block assembly with a block body and a plate member engaged in accordance with one or more implementations.

FIG. 11*b* depicts the block assembly 1100 with the block body 1102 and the plate member 1104 engaged. The body tooth surface 1108, for instance, is engaged with the plate tooth surface 1112. FIG. 11*b* also depicts a close-up view 1118 of a section 1120 of the block assembly 1100 showing engagement of the body tooth surface 1108 with the plate tooth surface 1112. The body tooth surface 1108 includes teeth 1122 and valleys 1124 between the teeth 1122 and the plate tooth surface 1112 includes teeth 1126 and valleys 1128 between the teeth 1126. In this particular example the teeth 1122 of the body tooth surface 1108 engage with every other valley 1128 of the plate tooth surface 1112. Further, the distance between the teeth 1122 is greater than the distance between the teeth 1126. Thus, the body tooth surface 1108 exhibits a different tooth pitch distance than the plate tooth surface 1112. As mentioned above, utilizing this differential in tooth size and/or spacing between the body tooth surface 1108 and the plate tooth surface 1112 enables for fine adjustment of the block body 1102 relative to the plate member 1104.

Notice also that scale marks 1130 of the scale region 1114 are placed at each tooth of the teeth 1122 and each valley 1124 to enable precise measurement of movement of the block body 1102 relative to the plate member 1104. Generally, the scale region 1114 and the scale marks 1130 can be configured according to any particular linear measurement scale, such as in Imperial and/or metric linear measurement units. Further, the scale marks 1130 are positioned to coincide with instances of a tooth of the teeth 1122 and/or a valley 1124.

Accordingly, the block assembly 1100 illustrates that differential tooth sizes and/or tooth patterns can be utilized to provide for different adjustability options for block assemblies. For instance, tooth bodies and plate members with different tooth patterns are provided to support a variety of different adjustability and operating implementations.

Figure 12:
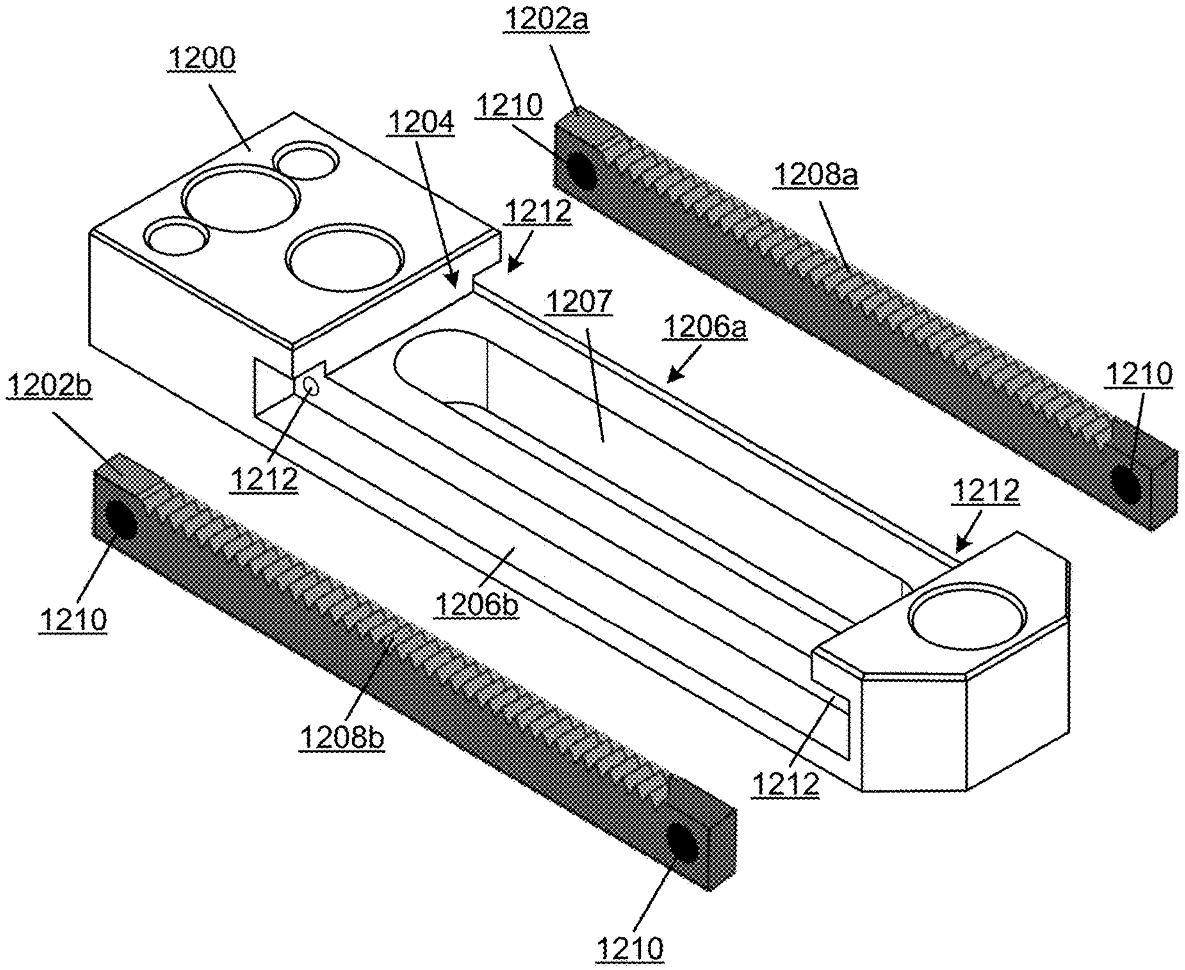
FIG. 12 depicts an implementation of a block body that utilizes modular attachable tooth fittings in accordance with one or more implementations.

FIG. 12 depicts an implementation of a block body 1200 that utilizes modular attachable tooth fittings 1202*a*, 1202*b* in accordance with one or more implementations. The block body 1200 forms an interior surface 1204 that includes a fitting cavity 1206*a* and a fitting cavity 1206*b*. The fitting cavities 1206*a*, 1206*b* extend longitudinally along the block body 1200 and codirectionally with a pin slot 1207. Further, the tooth fitting 1202*a* includes a tooth surface 1208*a* and the tooth fitting 1202*b* includes a tooth surface 1208*b*. The fitting cavities 1206*a*, 1206*b* are formed to enable the tooth fittings 1202*a*, 1202*b* to be inserted into the fitting cavities 1206*a*, 1206*b* such that the tooth surfaces 1208*a*, 1208*b* enable the block body 1200 to be utilized as part of a block assembly, such as described above.

The tooth fittings 1202*a*, 1202*b* can be fastened into the fitting cavities 1206*a*, 1206*b* utilizing any suitable attachment technique, such as using fasteners, adhesive, press fitting, and so forth. In this particular example the tooth fittings 1202*a*, 1202*b* include apertures 1210 through which fasteners can be placed to attach the tooth fittings 1202*a*, 1202*b* within the fitting cavities 1206*a*, 1206*b*. Further, the block body 1200 includes apertures 1212 within the fitting cavities 1206*a*, 1206*b* and into which fasteners can be placed to attach the tooth fittings 1202*a*, 1202*b* into the fitting cavities 1206*a*, 1206*b*. The apertures 1212, for instance, are tapped and can receive a threaded fastener.

Figure 13:
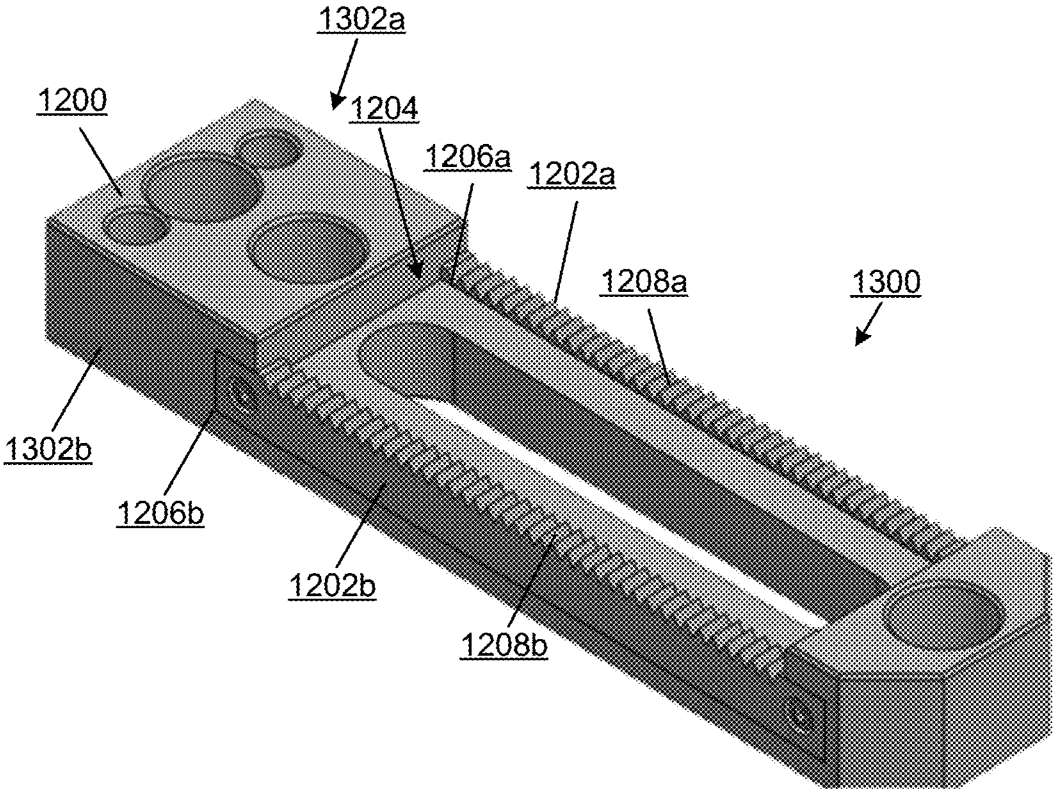
FIG. 13 depicts a block body with tooth fittings attached to form a block body assembly in accordance with one or more implementations.

FIG. 13 depicts the block body 1200 with the tooth fittings 1202*a*, 1202*b* attached to form a block body assembly 1300 in accordance with one or more implementations. The block body assembly 1300, for instance, represents an instance of the various block bodies discussed herein. In the block body assembly 1300 the tooth fittings 1202*a*, 1202*b* are positioned within the fitting cavities 1206*a*, 1206*b* and fastened using any suitable fastening technique. Notice that when positioned within the fitting cavities 1206*a*, 1206*b*, the tooth surfaces 1208*a*, 1208*b* extend outwardly and protrude from the interior surface 1204 of the block body 1200. Generally, this enables the tooth surfaces 1208*a*, 1208*b* to engage with a plate member as part of a block assembly. In this particular example with the tooth fittings 1202*a*, 1202*b* engaged within the fitting cavities 1206*a*, 1206*b*, the tooth fittings 1202*a*, 1202*b* are substantially coplanar, respectively, with side surfaces 1302*a*, 1302*b* of the block body 1200.

Figure 14:
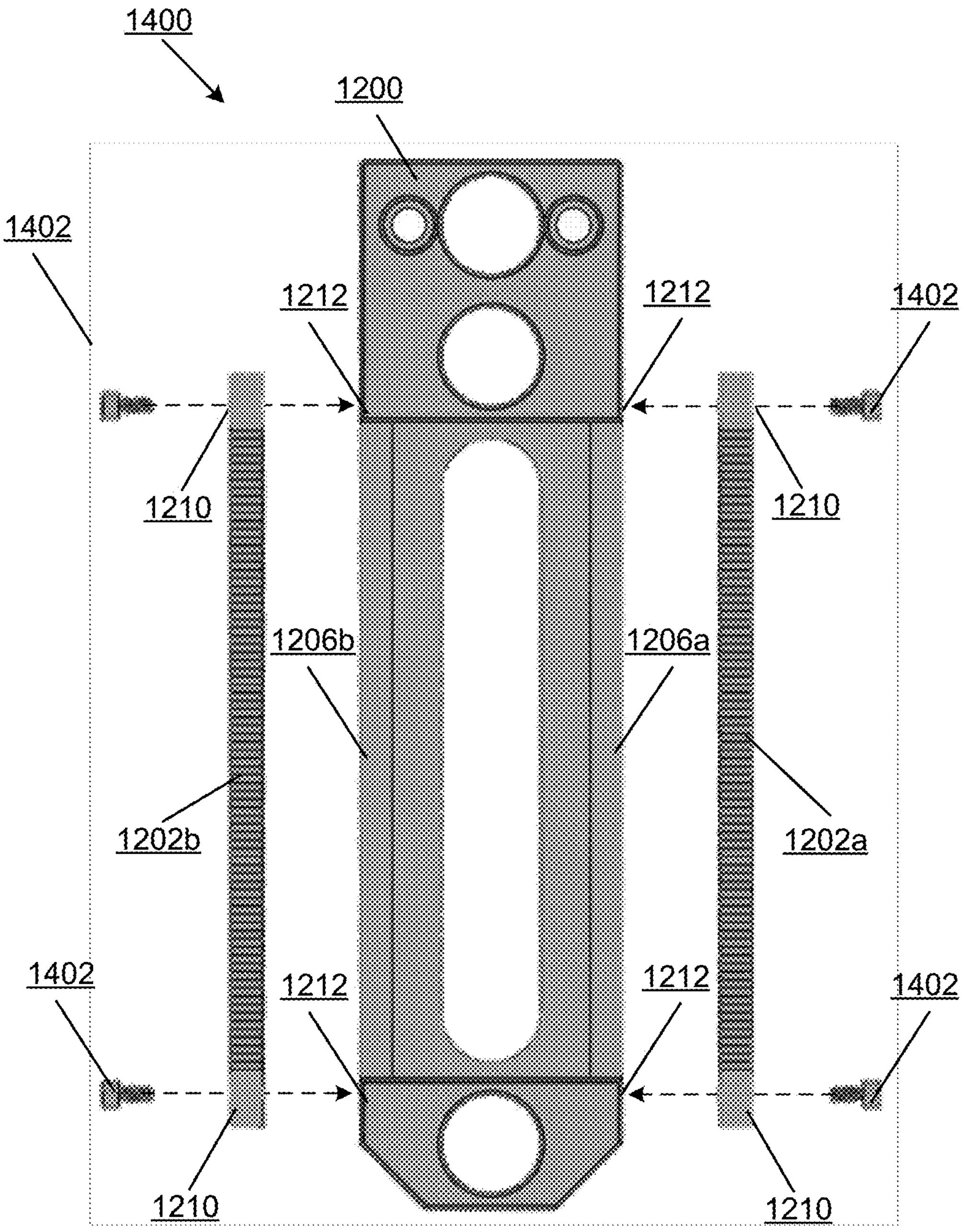
FIG. 14 depicts a bottom view of a block body and tooth fittings arranged for attachment in accordance with one or more implementations.

FIG. 14 depicts a bottom view 1400 of the block body 1200 and the tooth fittings 1202*a*, 1202*b* arranged for attachment. Also depicted are fasteners 1402 used to fasten the tooth fittings 1202*a*, 1202*b* within the fitting cavities 1206*a*, 1206*b*. To fasten the tooth fittings 1202*a*, 1202*b* into the fitting cavities 1206*a*, 1206*b*, the fasteners 1402 are inserted through the apertures 1210 in the tooth fittings 1202*a*, 1202*b* and into the apertures 1212 in the fitting cavities 1206*a*, 1206*b*. The fasteners 1402, for instance, are threaded and the apertures 1212 are tapped to receive threaded attachment of the fasteners 1402 to enable fastening of the tooth fittings 1202*a*, 1202*b* into the fitting cavities 1206*a*, 1206*b*.

Figure 15:
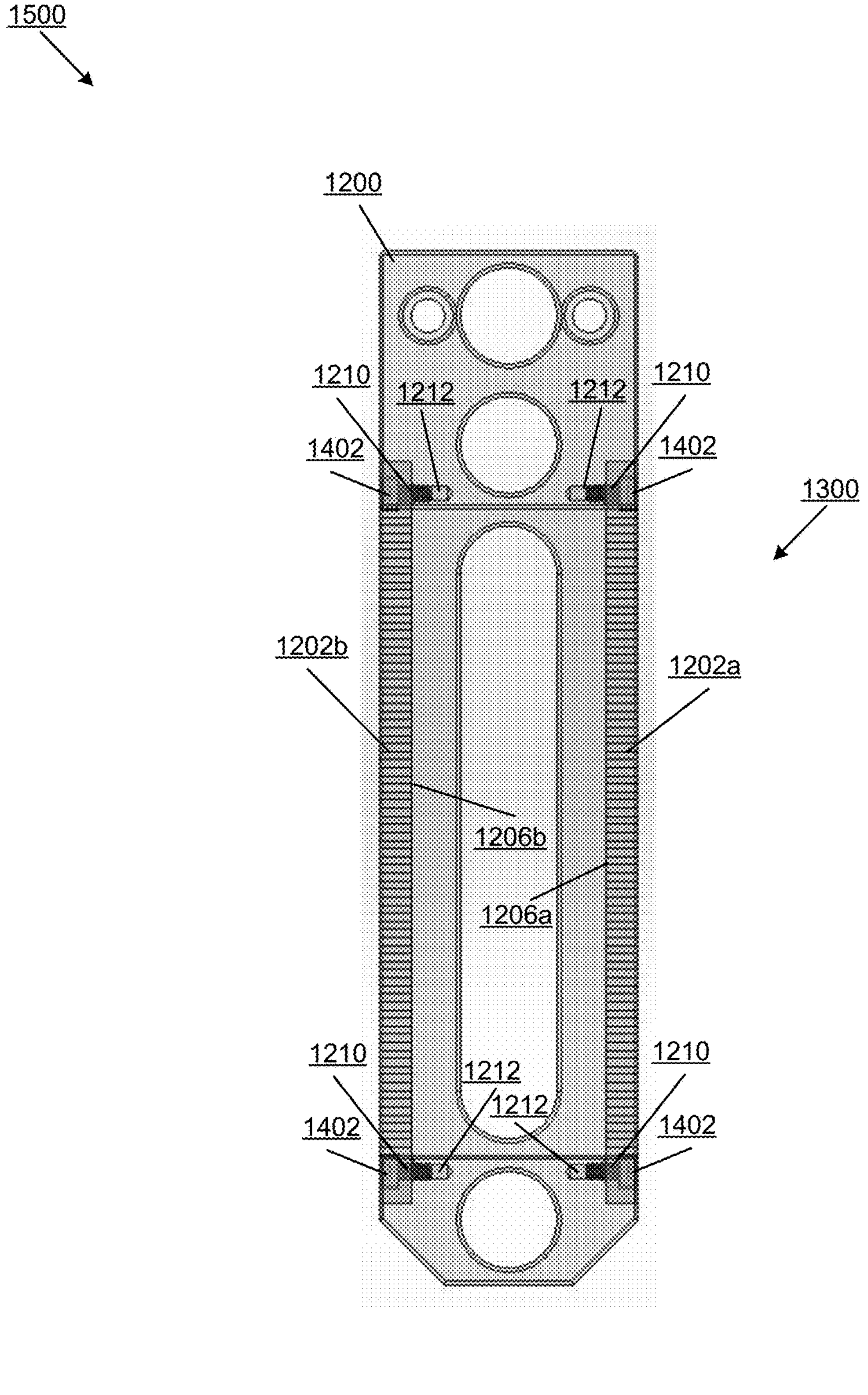
FIG. 15 depicts a transparent view of a block body assembly with tooth fittings attached in accordance with one or more implementations.

FIG. 15 depicts a transparent view 1500 of the block body assembly 1300 with the tooth fittings 1202*a*, 1202*b* attached within the fitting cavities 1206*a*, 1206*b*. The transparent view 1500 illustrates that the fasteners 1402 are inserted through the apertures 1210 in the tooth fittings 1202*a*, 1202*b* and fastened into the apertures 1212 positioned within the fitting cavities 1206*a*, 1206*b* of the block body 1200 to form the block body assembly 1300. The fasteners 1402 can be attached within the apertures 1212 using any suitable attachment technique, such as threaded attachment, adhesive, press fitting, etc. Accordingly, the block body assembly 1300 is usable as part of a block assembly such as described throughout this disclosure.

While the block body assembly 1300 is illustrated in the context of attachment of the tooth fittings 1202*a*, 1202*b* within the fitting cavities 1206*a*, 1206*b*, this is not to be construed as limiting and alternative implementations can utilize attachment to an exterior side surface of a conventional block member, e.g., a stop block that does not include fitting cavities for attachment. Thus, the tooth fittings 1202*a*, 1202*b* can be used to convert a conventional stop block into a block body assembly for use as described throughout this disclosure. Further, tooth fittings 1202*a*, 1202*b* with different tooth sizes and tooth patterns can be utilized to provide for a variety of different usage scenarios.

Figure 16:
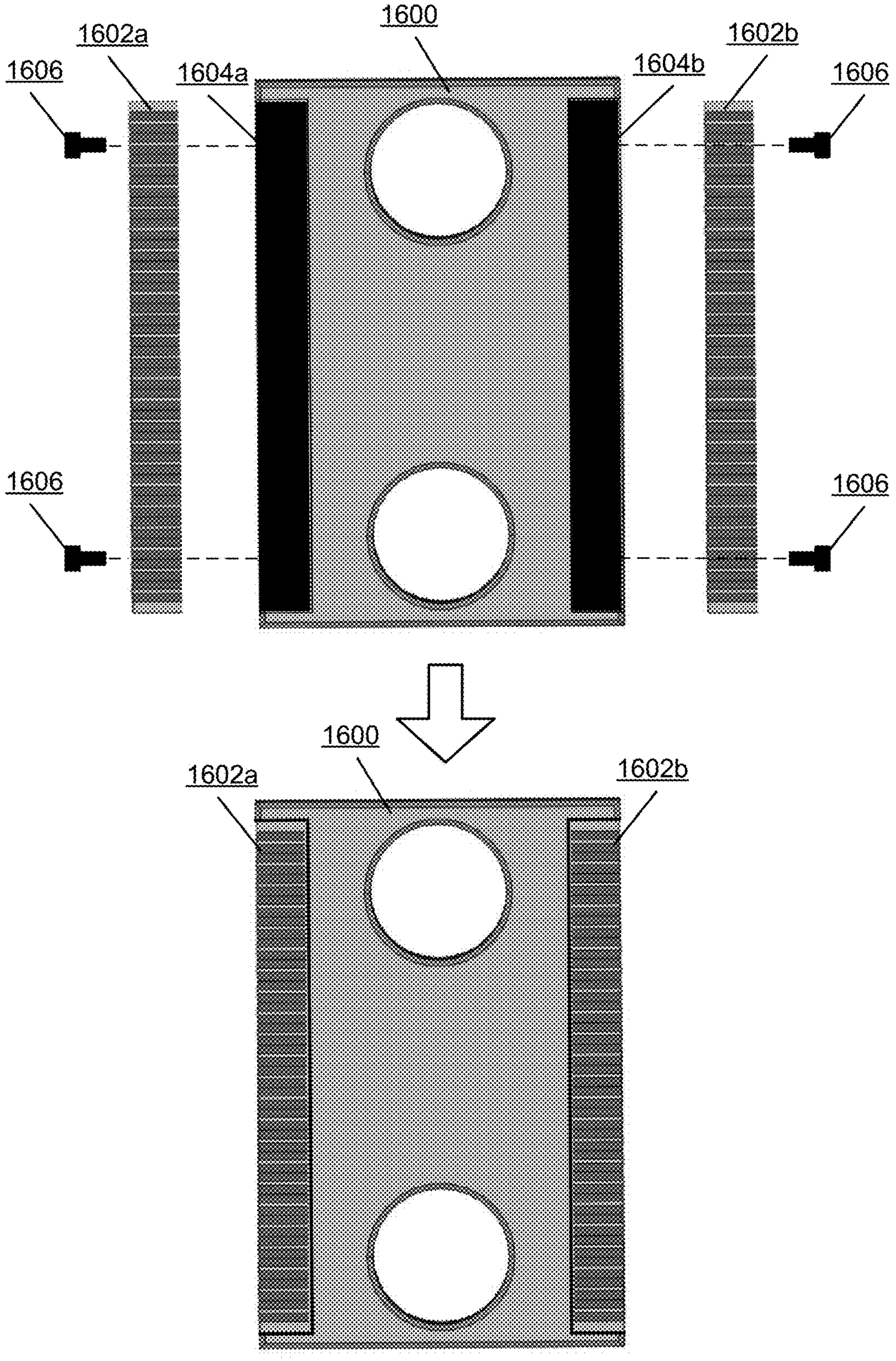
FIG. 16 depicts an implementation of a plate member that utilizes attachable tooth fittings in accordance with one or more implementations.

FIG. 16 depicts an implementation of a plate member 1600 that utilizes attachable tooth fittings 1602*a*, 1602*b* in accordance with one or more implementations. The plate member 1600, for instance, represents an extension and/or variation of the plate members described above and thus incorporates at least some of the features previously described. The tooth fittings 1602*a*, 1602*b* are attachable within fitting cavities 1604*a*, 1604*b*, respectively, via fasteners 1606. The plate member 1600, for instance, includes tapped apertures into which the fasteners 1606 can be inserted via threaded attachment to attach the tooth fittings 1602*a*, 1602*b* via threaded attachment. Alternatively or additionally any other suitable attachment method can be utilized such as adhesive, press fitting, etc.

The lower portion of FIG. 16 illustrates the plate member 1600 with the tooth fittings 1602*a*, 1602*b* attached within the fitting cavities 1604*a*, 1604*b*, e.g., via the fasteners 1606. Accordingly, the plate member 1600 can be utilized within the context of a block assembly such as described throughout this disclosure. While the plate member 1600 is illustrated in the context of attachment of the tooth fittings 1602*a*, 1602*b* within the fitting cavities 1604*a*, 1604*b*, this is not to be construed as limiting and alternative implementations can utilize attachment to an exterior side surface of a plate to generate a plate member, e.g., a plate that does not include fitting cavities for attachment. Further, tooth fittings with different tooth sizes and tooth patterns can be utilized to provide for a variety of different usage scenarios.

Thus, the block body assembly 1300 and the plate member 1600 illustrate that modular tooth fittings can be utilized to provide for different usage implementations such as by utilizing tooth fittings with different tooth size, different tooth patterns, etc.

Figure 17:
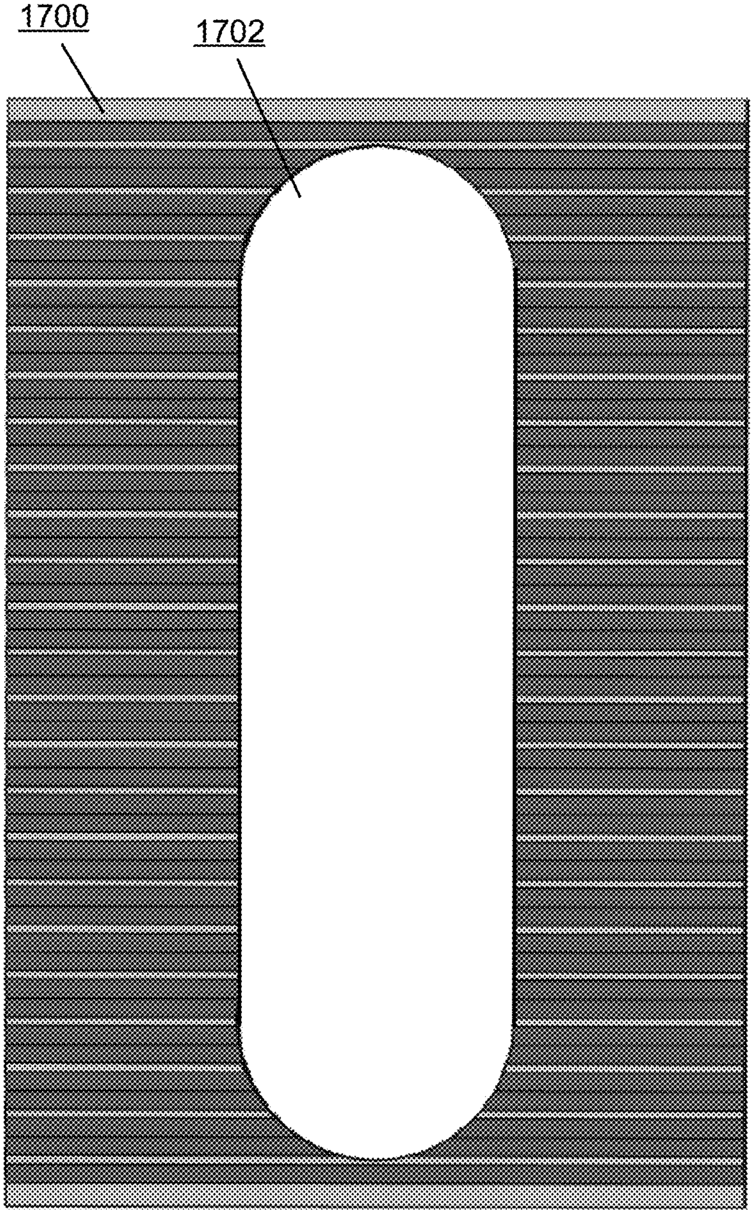
FIG. 17 depicts a plate member that includes a pin slot for pin placement in accordance with one or more implementations.

FIG. 17 depicts a plate member 1700 that includes a pin slot 1702 for pin placement, e.g., alternatively to the circular pin apertures described previously. In this particular example the pin slot 1702 forms an extended oval slot extending longitudinally along the length of the plate member 1700. The pins 402 described above, for instance, can be placed within a pin slot of a block body and through the pin slot 1702 to provide an implementation of a block assembly. In at least one implementation utilizing the plate member 1700 with the pin slot 1702 provides for increased adaptability for a block assembly, such as to accommodate grid surfaces with different grid aperture patterns, grid aperture spacing, grid aperture sizes, and so forth.

Figure 18:
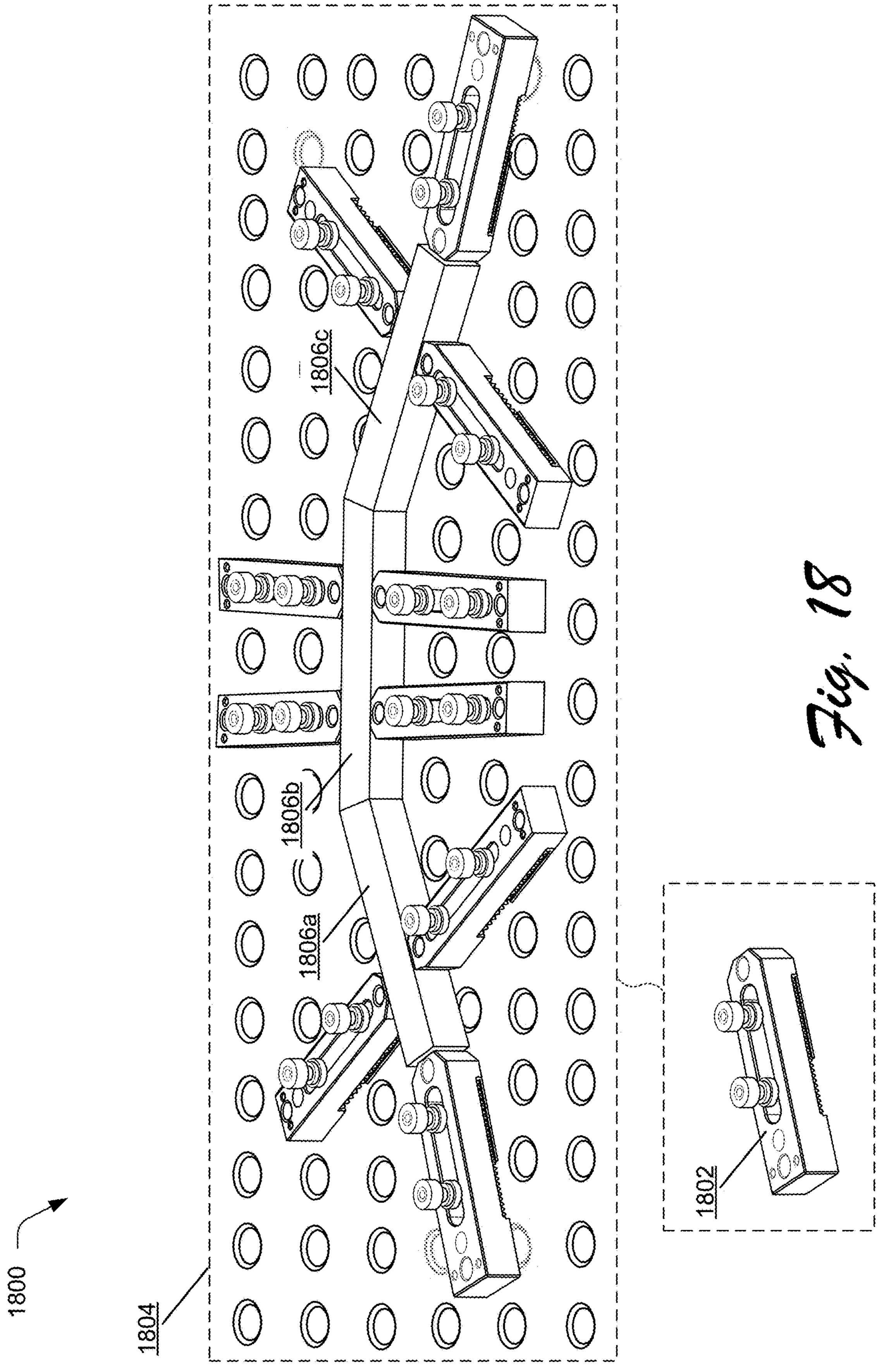
FIG. 18 depicts an example usage scenario which utilizes a set of block assemblies in accordance with one or more implementations.

FIG. 18 depicts an example usage scenario 1800 which utilizes a set of block assemblies 1802, each of which represents an instance of any implementation or combination of implementations of the block assemblies described herein. In the scenario 1800 various block assemblies 1802 are fastened to a grid surface 1804 and are utilized to position and secure a set of workpieces including a workpiece 1806*a*, a workpiece 1806*b*, and a workpiece 1806*c*. The set of workpieces, for instance, are positioned and secured to enable work to be applied to the workpieces 1806*a*, 1806*b*, 1806*c*, such as for joining the workpieces 1806*a*, 1806*b*, 1806*c*. Generally, by utilizing the block assemblies 1802, the workpieces 1806*a*, 1806*b*, 1806*c* are able to be precisely and securely positioned to enable work to be applied to the workpieces 1806*a*, 1806*b*, 1806*c* without unintended movement of the workpieces 1806*a*, 1806*b*, 1806*c* while work is being applied.

Figure 19:
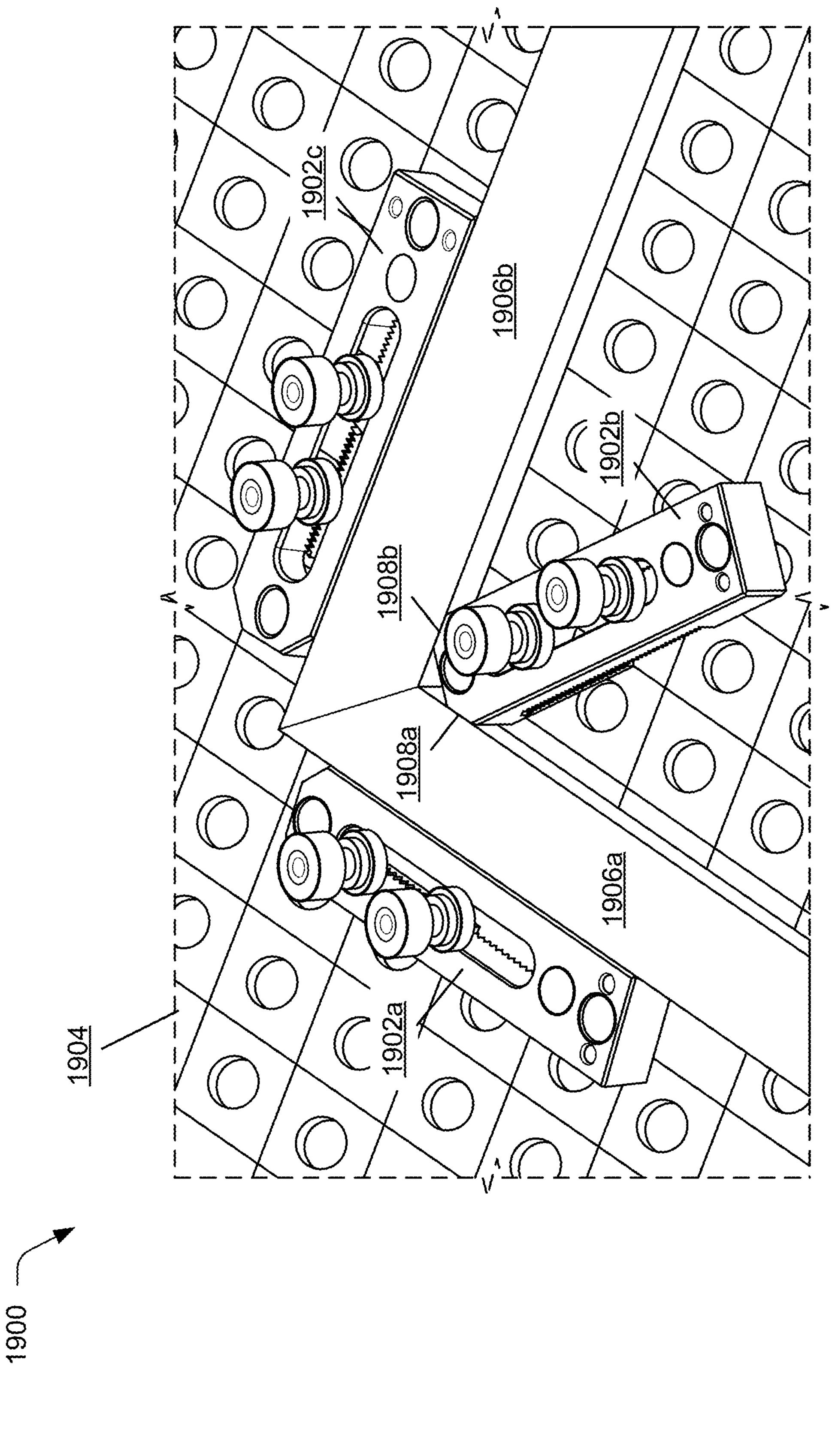
FIG. 19 depicts an example usage scenario which utilizes a set of block assemblies in accordance with one or more implementations.

FIG. 19 depicts an example usage scenario 1900 which utilizes a set of block assemblies 1902*a*, 1902*b*, 1902*c*, each of which represent an instance of any implementation or combination of implementations of the block assemblies described herein. In the scenario 1900 the block assemblies 1902*a*, 1902*b*, 1902*c* are fastened to a grid surface 1904 and are utilized to position and secure a set of workpieces including a workpiece 1906*a* and a workpiece 1906*b*. In this particular example notice that angled surfaces 1908*a*, 1908*b* of the block assembly 1902*b* are used to secure edges of the workpieces 1906*a*, 1906*b* where the workpieces 1906*a*, 1906*b* meet, e.g., at an angled joint between the workpieces 1906*a*, 1906*b*. Thus, various surfaces of the described block assemblies are able to be utilized to support a variety of different workpiece arrangements and configurations.

Figure 20:
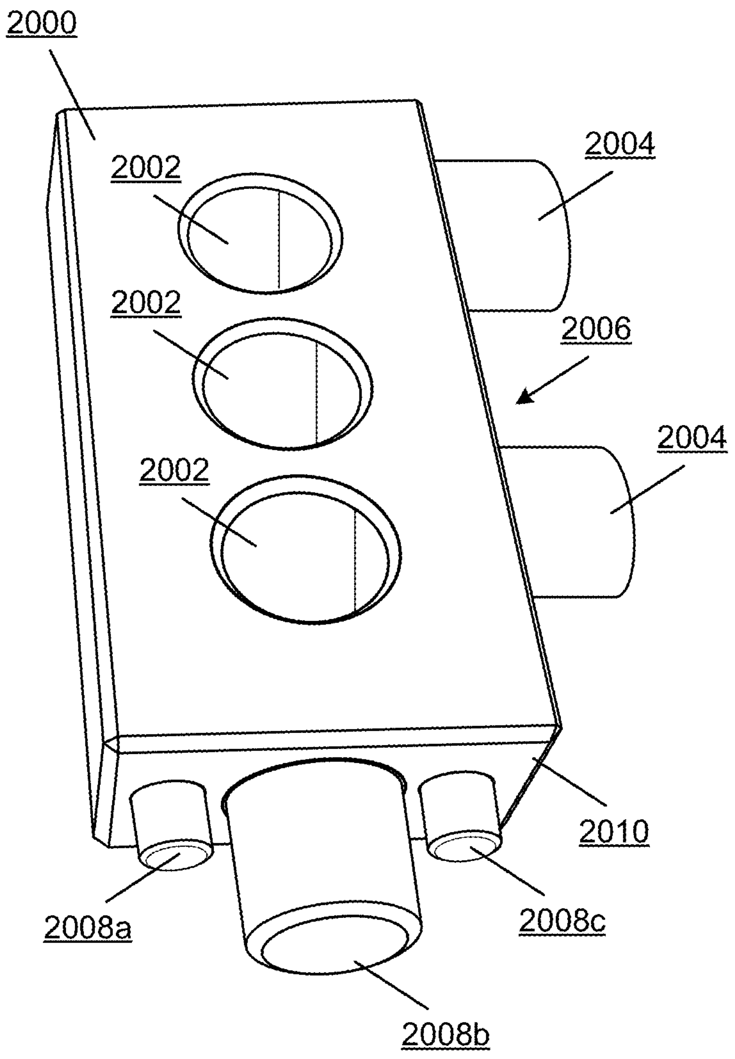
FIG. 20 depicts an accessory block that can be utilized in conjunction with a block assembly in accordance with one or more implementations.

FIG. 20 depicts an accessory block 2000 that can be utilized in conjunction with a block assembly to support different working scenarios. The accessory block 2000 forms apertures 2002 into which various materials and tools are placeable, such as doweling, piping, clamps, and so forth. The accessory block 2000 also includes pins at different locations to support attachment for different operating scenarios. For instance, pins 2004 on a side 2006 of the accessory block 2000 enable attachment of accessories to the side of the accessory block, such as via placement of the pins 2004 into apertures of an accessory, e.g., another accessory block 2000. Further, pins 2008*a*, 2008*b*, 2008*c* on a bottom surface 2010 of the accessory block 2000 enable attachment of the accessory block 2000 to another object such as a block assembly. Generally, the pins 2008*a*, 2008*b*, 2008*c* can be attached into apertures within bottom surface 2010 in different ways, such as via threaded attachment, adhesive, press fitting, etc. Alternatively the pins 2008*a*, 2008*b*, 2008*c* can be formed as features of the accessory block 2000, such as machined features and/or cast features such that the accessory block 2000 and the pins 2008*a*, 2008*b*, 2008*c* (and optionally the pins 2004) are formed from a single piece of material.

Figure 21:
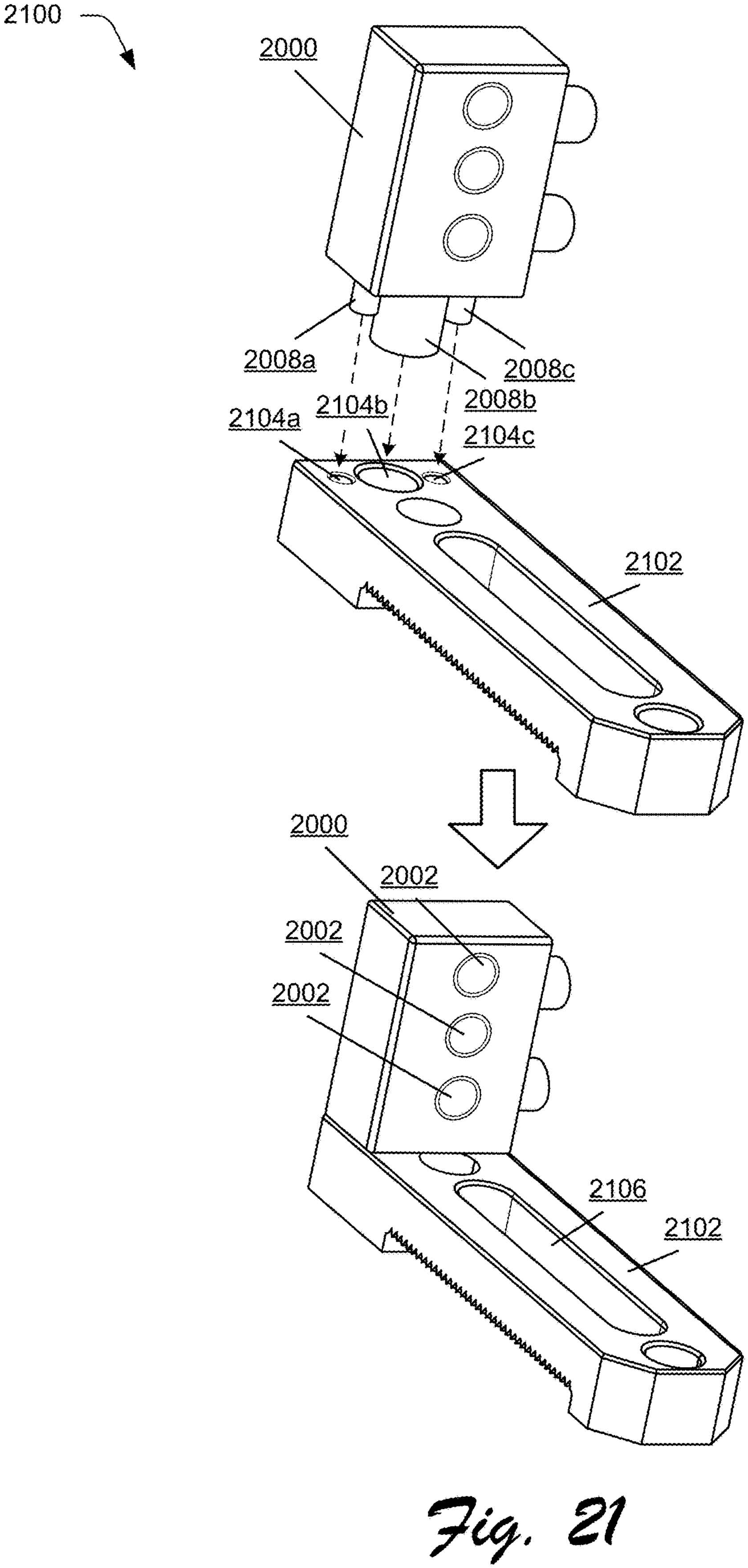
FIG. 21 depicts an example implementation scenario for attachment of an accessory block in accordance with one or more implementations.

FIG. 21 depicts an example implementation scenario 2100 for attachment of the accessory block 2000 to a block body 2102. In the upper portion of the scenario 2100 the pins 2008*a*, 2008*b*, 2008*c* are aligned with apertures 2104*a*, 2104*b*, 2104*c* formed within the block body 2102. Proceeding to the lower portion of the scenario 2100 the pins 2008*a*, 2008*b*, 2008*c* are placed into the apertures 2104*a*, 2104*b*, 2104*c* to fasten the accessory block 2000 to the block body 2102. In at least one implementation the pins 2008*a*, 2008*b*, 2008*c* are attached within the apertures 2104*a*, 2104*b*, 2104*c* via frictional attachment between the pins 2008*a*, 2008*b*, 2008*c* and the apertures 2104*a*, 2104*b*, 2104*c*. Accordingly, the block body 2102 with the attached accessory block 2000 can be used for various purposes, such as for attachment of the block body 2102 to a grid surface and placement of workpieces and/or tools within the apertures 2002. The block body 2102, for instance, can be combined with a plate member to form a block assembly as described throughout and then attached to a grid surface. Alternatively the block body 2102 can be attached to a grid surface without a plate member such as via pin placement through a pin slot 2106 to enable the block body 2102 and the accessory block 2000 to be used for workpiece and/or tool placement.

Figure 22:
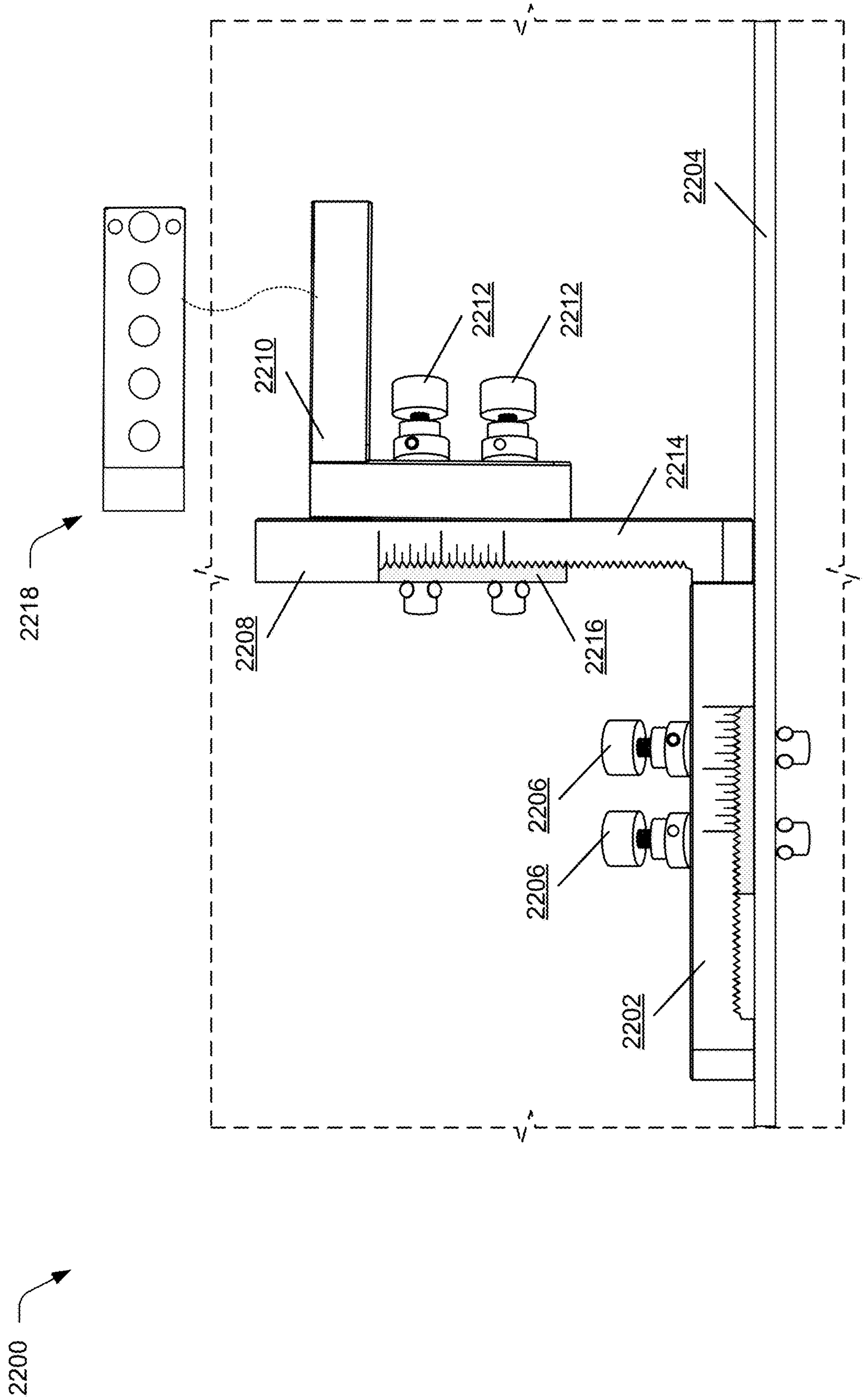
FIG. 22 depicts a scenario for utilizing a block assembly in a vertical orientation in accordance with one or more implementations.

FIG. 22 depicts a scenario 2200 for utilizing a block assembly in a vertical orientation in accordance with one or more implementations. In the scenario 2200 a block assembly 2202 is attached to a grid surface 2204 via pin attachment using pins 2206, such as described above. Further, a block assembly 2208 is attached to the block assembly 2202 in a vertical orientation relative to the grid surface 2204. The block assembly 2208 can be attached to the block assembly 2202 via any suitable attachment mechanism, such as threaded fasteners, friction pins, another form of attachment pin, and so forth.

Further to the scenario 2200, a bracket 2210 is secured to the block assembly 2208 via pins 2212. The pins 2212, for instance, are placed through apertures and/or a pin slot in the bracket 2210, through a pin slot in a block body 2214 of the block assembly 2208, and through apertures and/or a pin slot of a plate member 2216 of the block assembly. The pins 2212 are tightened to secure the bracket 2210 to the block assembly 2208. Accordingly, the pins 2212 can be loosened to enable the plate member 2216 to move vertically up and down relative to the block body 2214 and to enable corresponding vertical movement of the bracket 2210 relative to the grid surface 2204. Generally, this enables precise movement of the bracket 2210 to achieve specific vertical orientations of the bracket 2210. Further, the block assembly 2202 can be moved horizontally along the grid surface 2204 such as described above to enable horizontal movement of the bracket 2210 relative to the grid surface 2204. Accordingly, this arrangement enables precise vertical and horizontal positioning of the bracket 2210 to achieve a variety of different operating positions.

At 2218 a top view of the bracket 2210 is illustrated showing that the bracket 2210 includes various apertures into which various workpieces and tools can be placed to enable a variety of different working scenarios.

Figure 23:
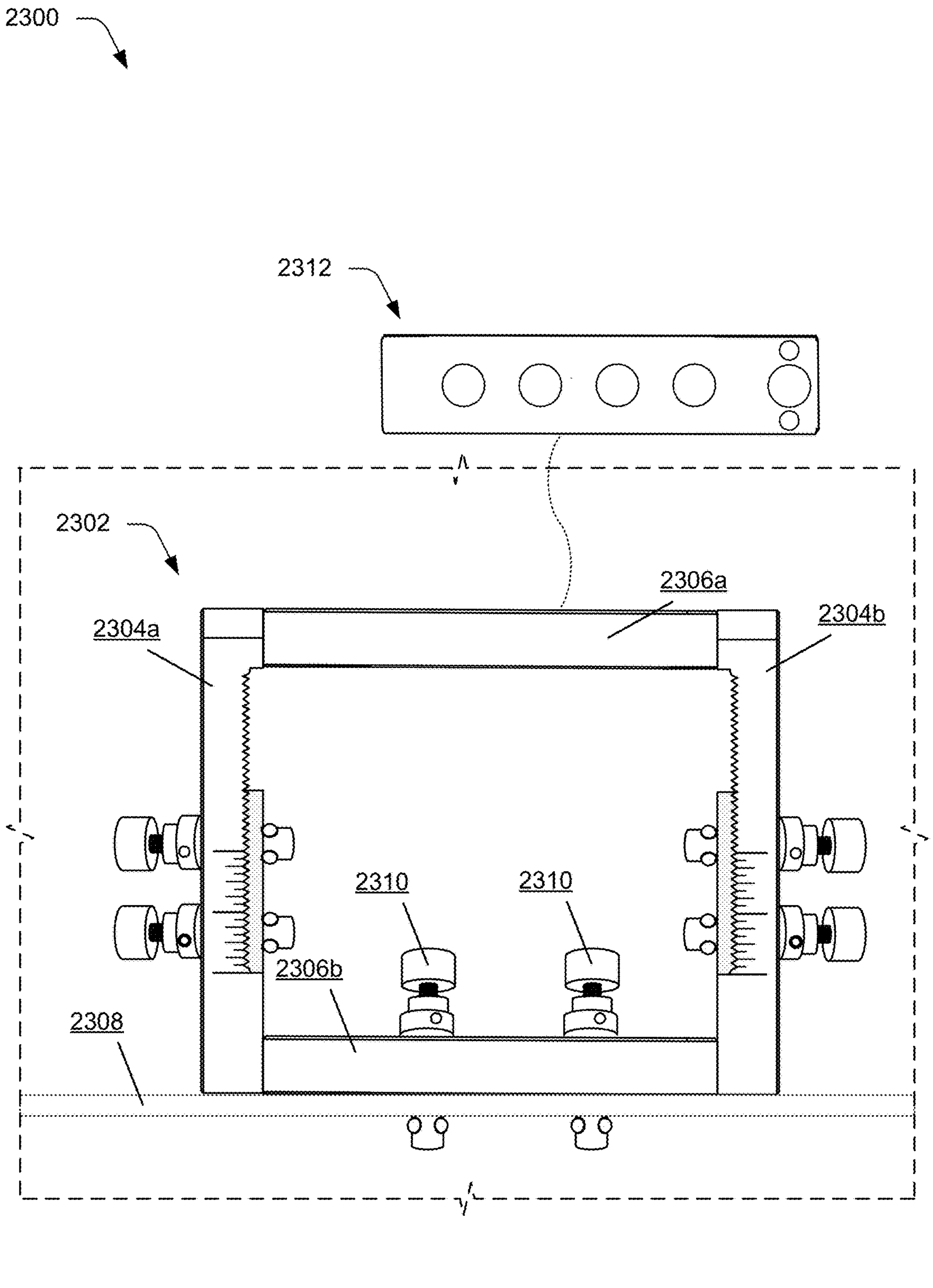
FIG. 23 depicts a scenario for utilizing block assemblies in a joined configuration with other blocks in accordance with one or more implementations.

FIG. 23 depicts a scenario 2300 for utilizing block assemblies in a joined configuration with other blocks in accordance with one or more implementations. In the scenario 2300 a block arrangement 2302 is illustrated including a set of block assemblies 2304*a*, 2304*b* attached to a set of block members 2306*a*, 2306*b* using any suitable attachment mechanism such as such as threaded fasteners, friction pins, another form of attachment pin, and so forth. Further, the block arrangement 2302 is attached to a grid surface 2308 via pins 2310 placed through apertures and/or a pin slot within the block member 2306*b* to secure the block member 2306*b* to the grid surface 2308. At 2312 a top view of the bracket block member 2306*a* is illustrated showing that the block member 2306*a* includes various apertures into which various workpieces and tools can be placed to enable a variety of different working scenarios. Accordingly, the block arrangement 2302 supports a variety of different operating scenarios. For instance, additional blocks can be secured to the block assemblies 2304*a*, 2304*b* to provide for additional workpiece arrangement scenarios. Further, although the block arrangement 2302 is depicted as secured to the grid surface 2308, in additional or alternative implementations the block arrangement 2302 can be utilized without attachment to an adjacent surface, e.g., as a standalone block assembly for workpiece and/or tool arrangement.

Figure 24:
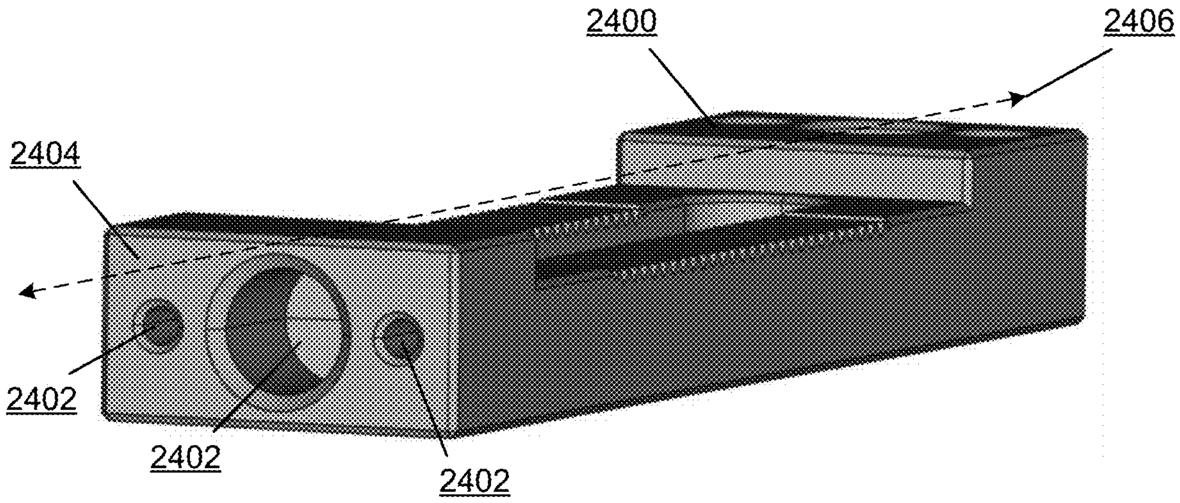
FIG. 24 depicts an example implementation of a block body with longitudinal apertures in accordance with one or more implementations.

FIG. 24 depicts an example implementation of a block body 2400 with longitudinal apertures, which represents a variation and/or extension of the different block bodies discussed herein. The block body 2400 includes apertures 2402 formed within an end surface 2404 of the block body 2400. The apertures 2402, for instance, are formed within the end surface 2404 codirectionally with a longitudinal axis 2406 of the block body 2400. Generally, the apertures 2402 support attachment of various objects to the block body 2400, such as other block bodies, accessory blocks, accessories, and so forth. The apertures 2402 can be formed in various ways, such as with tapped threads for threaded attachment, smooth interiors, counterbored configuration, and so forth.

Figure 25:
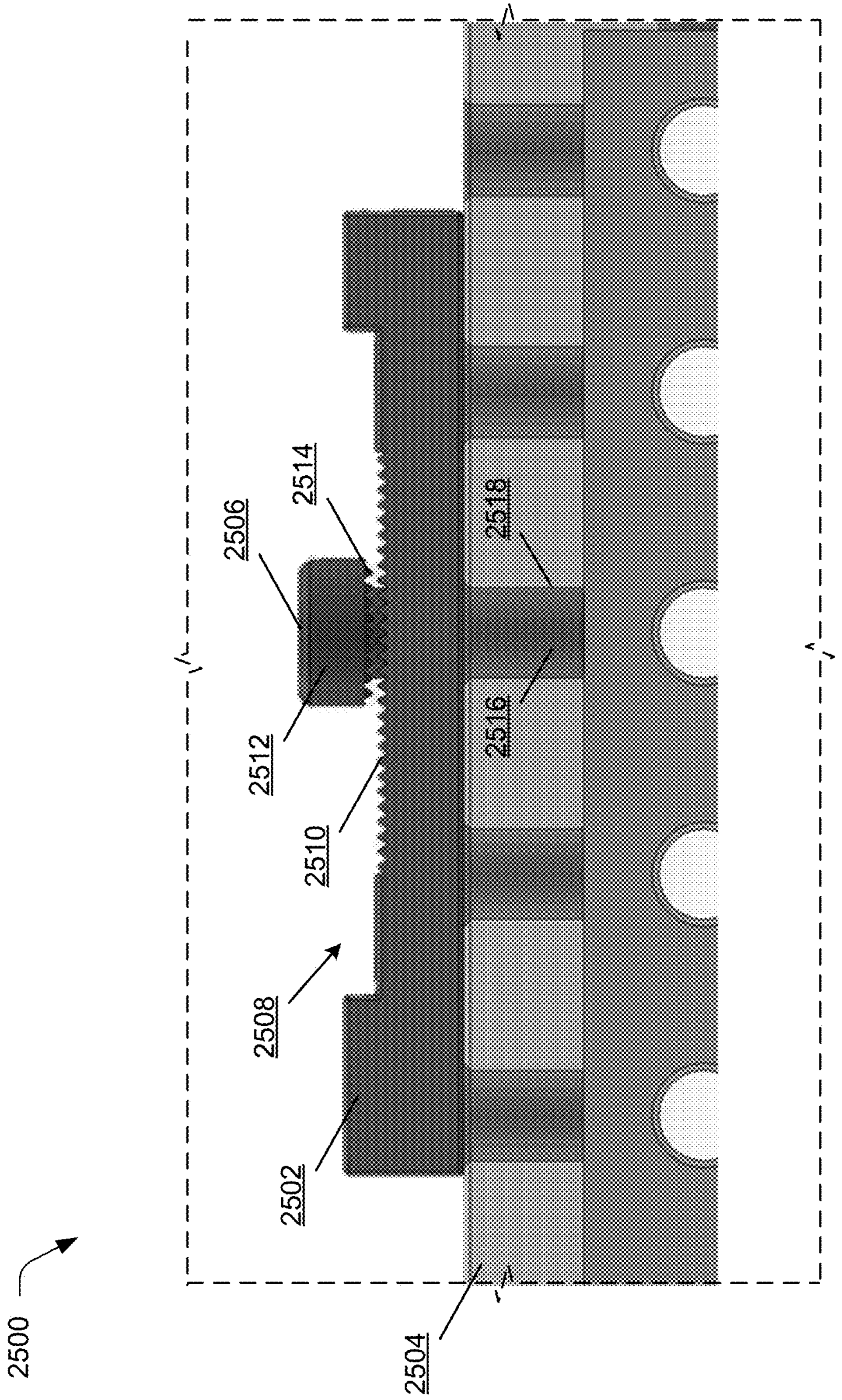
FIG. 25 depicts a scenario for utilizing a toothed member for attachment of a block body to an adjacent surface in accordance with one or more implementations.

FIG. 25 depicts a scenario 2500 for utilizing a toothed member for attachment of a block body to an adjacent surface in accordance with one or more implementations. The scenario 2500 includes a block body 2502 attached to a grid surface 2504 via a tooth pin 2506. In at least one implementation the block body 2502 represents an instance and/or variation of the block bodies discussed throughout this disclosure. The block body 2502, for instance, includes an interior surface 2508 with a body tooth surface 2510. Further, the tooth pin 2506 includes a pin head 2512 with a pin tooth surface 2514 and a pin shaft 2516 that is insertable through an aperture (e.g., a pin slot) in the block body 2502 and a grid aperture 2518 to attach the block body 2502 to the grid surface 2504. As further detailed below, the pin tooth surface 2514 is engageable with the body tooth surface 2510 to prevent movement of the block body 2502 relative to the grid surface 2504.

Figure 26:
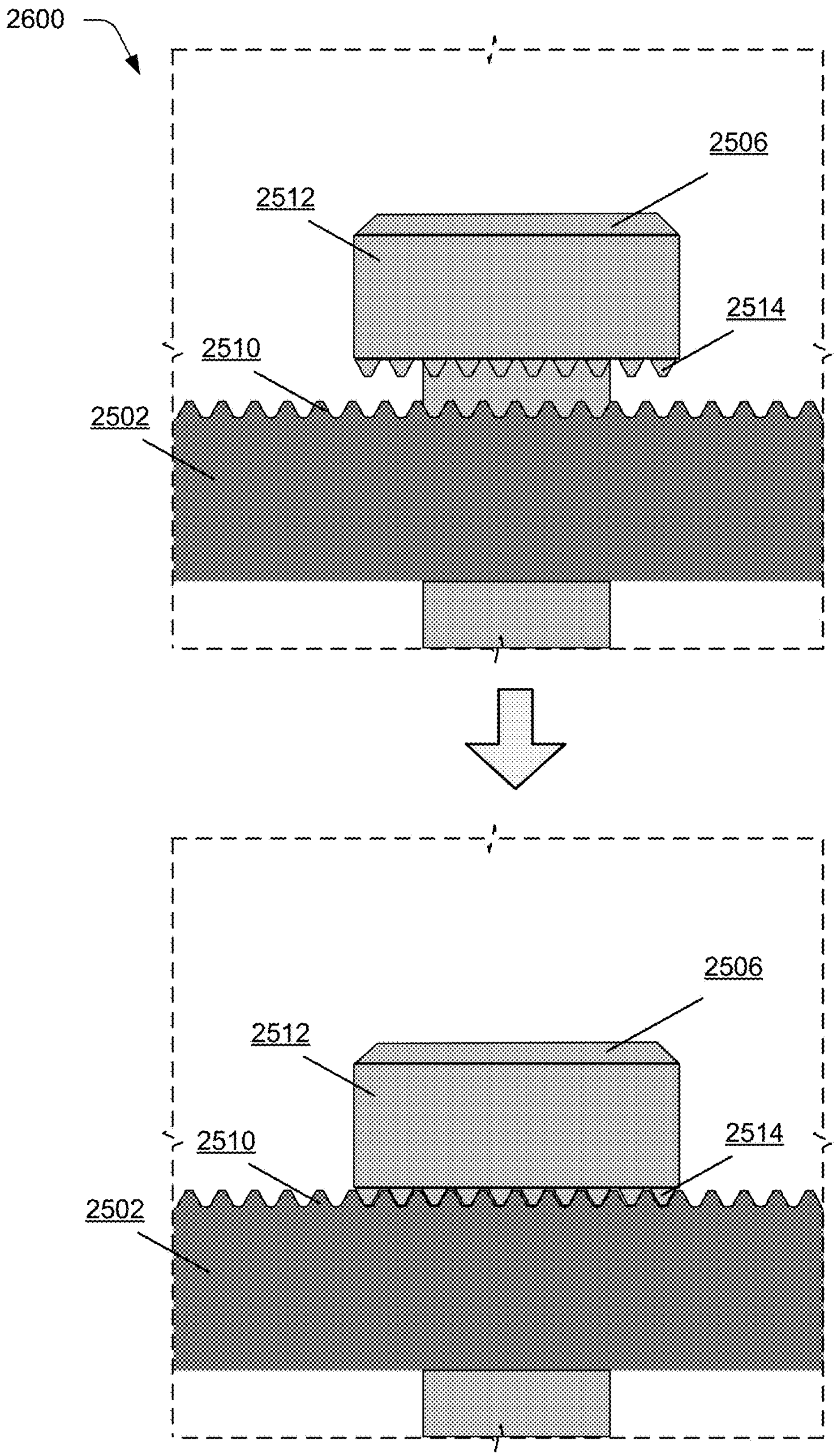
FIG. 26 depicts an implementation scenario for engaging a tooth pin with a block body in accordance with one or more implementations.

FIG. 26 depicts an implementation scenario 2600 for engaging a tooth pin with a block body in accordance with one or more implementations. In the upper portion of the scenario 2600, the tooth pin 2506 is depicted with the pin tooth surface 2514 disengaged from the body tooth surface 2510 of the block body 2502. The tooth pin 2506, for instance, is lifted above the body tooth surface 2510 such that the pin tooth surface 2514 and the body tooth surface 2510 are not engaged, e.g., are not in contact with one another. Proceeding to the lower portion of the scenario 2600 the tooth pin 2506 is engaged with the block body 2502 such that the pin tooth surface 2514 is engaged with the body tooth surface 2510. For instance, with the tooth pin 2506 engaged through the block body 2502 and with an adjacent surface (e.g., a grid surface), engagement of the tooth pin 2506 with the block body 2502 prevents movement of the block body 2502 relative to the adjacent surface. Generally, the pin tooth surface 2514 and the body tooth surface 2510 can be configured based on various tooth surface details discussed throughout this disclosure, such as to include a common tooth pattern and/or differing tooth patterns.

Figure 27:
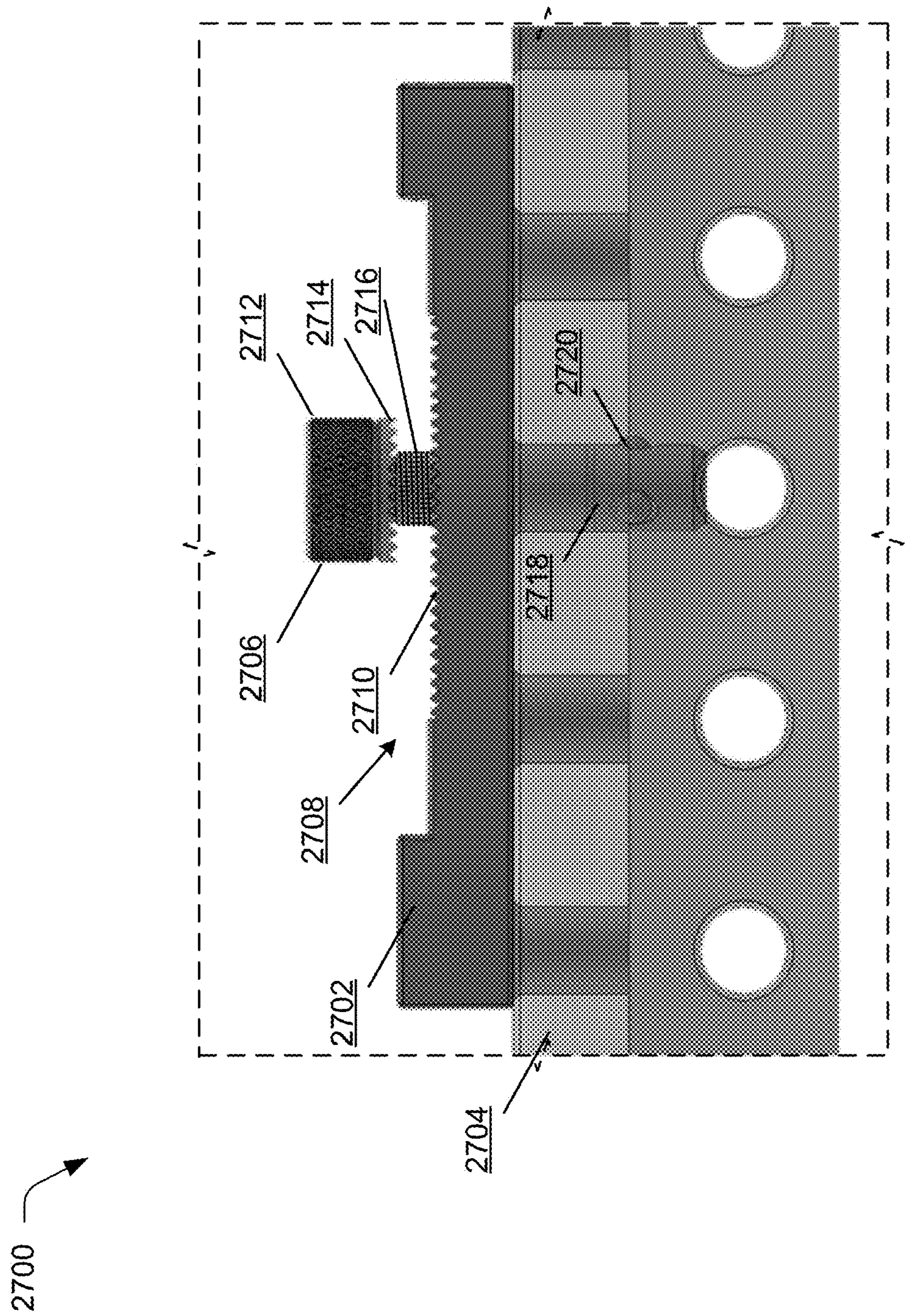
FIG. 27 depicts a scenario for utilizing a locking toothed member for attachment of a block body to an adjacent surface in accordance with one or more implementations.

FIG. 27 depicts a scenario 2700 for utilizing a locking toothed member for attachment of a block body to an adjacent surface in accordance with one or more implementations. The scenario 2700 includes a block body 2702 attached to a grid surface 2704 via a locking pin 2706. In at least one implementation the block body 2702 represents an instance and/or variation of the block bodies discussed throughout this disclosure. The block body 2702, for instance, includes an interior surface 2708 with a body tooth surface 2710. Further, the locking pin 2706 includes a pin head 2712, a tooth plate 2714, an inner pin shaft 2716, and an outer pin shaft 2718. Generally, the tooth plate 2714 can be configured in various ways such as a circular plate (e.g., a washer), a rectangular plate, and/or any other suitable plate with a tooth surface.

Generally, the outer pin shaft 2718 is insertable through an aperture (e.g., a pin slot) in the block body 2702 and a grid aperture 2720 in the grid surface 2704 to attach the block body 2702 to the grid surface 2704. Further, the inner pin shaft 2716 is positioned internally to the outer pin shaft 2718 and can move within the outer pin shaft 2718. For instance, the inner pin shaft 2716 is threaded and an interior of the outer pin shaft 2718 is tapped to enable threaded engagement of the inner pin shaft 2716 with the interior of the outer pin shaft 2718. For instance, rotating the pin head 2712 causes the inner pin shaft 2716 to move up or down (e.g., depending on direction of rotation) relative to the outer pin shaft 2718. In an example implementation, tightening the pin head 2712 and the inner pin shaft 2716 (e.g., via clockwise rotation) causes the inner pin shaft 2716 to move downward within the outer pin shaft 2718 and causes the tooth plate 2714 to engage with the body tooth surface 2710 to prevent movement of the block body 2702 relative to the grid surface 2704. In at least one implementation the tooth plate 2714 floats on the inner pin shaft 2716 and thus does not rotate with the pin head 2712 and the inner pin shaft 2716. Generally, this enables tightening of the pin head 2712 against the tooth plate 2714 to secure the tooth plate 2714 against the body tooth surface 2710. Further, loosening the pin head 2712 and the inner pin shaft 2716 (e.g., via counterclockwise rotation) causes the inner pin shaft 2716 to move upward within the outer pin shaft 2718 and causes the tooth plate 2714 to disengage from the body tooth surface 2710 to allow movement of the block body 2702 relative to the grid surface 2704. Generally, the tooth plate 2714 and the body tooth surface 2710 can be configured based on various tooth surface details discussed throughout this disclosure, such as to include a common tooth pattern and/or differing tooth patterns.

Figure 28:
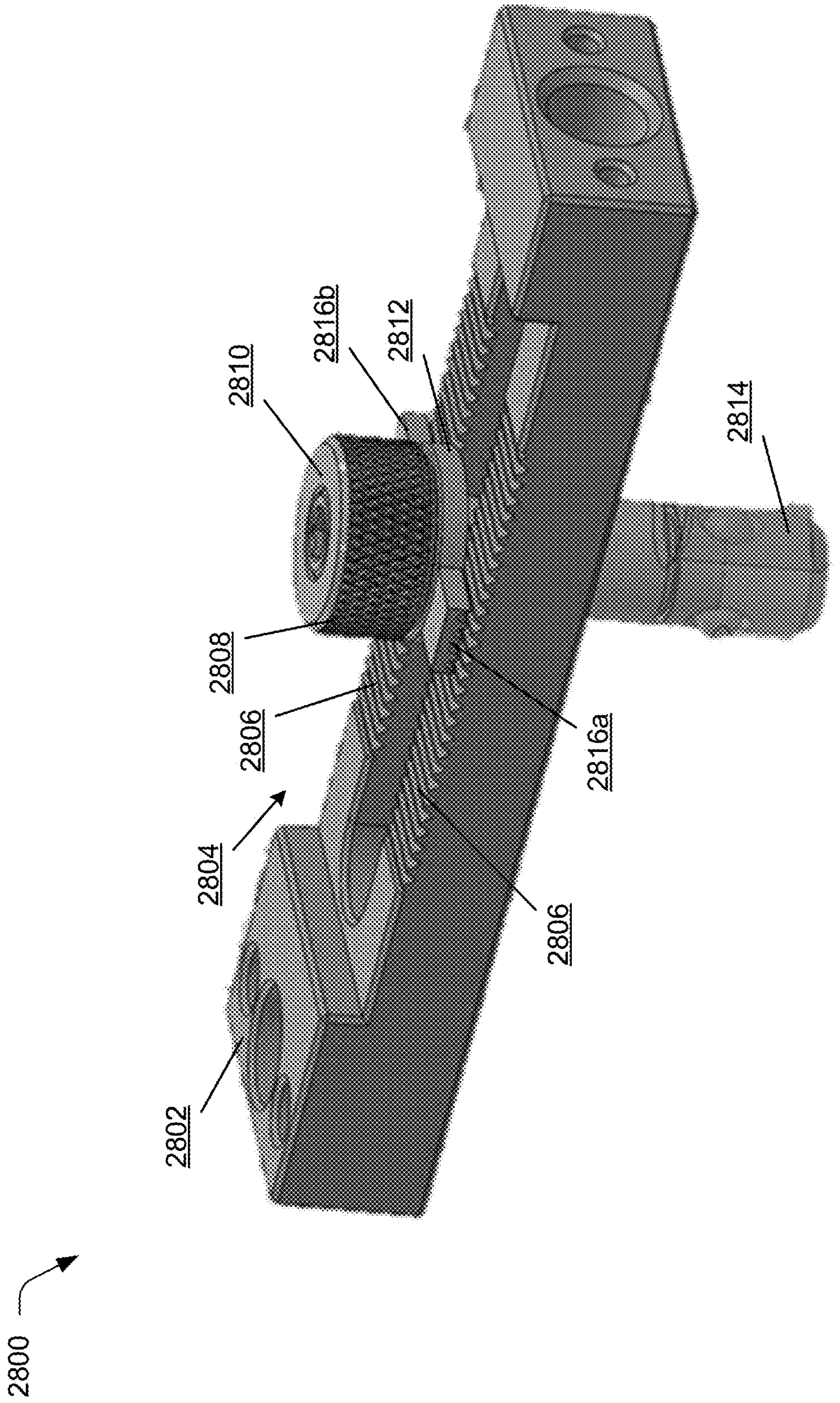
FIG. 28 depicts a scenario for utilizing a locking pin and a pin plate with tooth wings for attachment of a block body to an adjacent surface in accordance with one or more implementations.

FIG. 28 depicts a scenario 2800 for utilizing a locking pin and a pin plate with tooth wings for attachment of a block body to an adjacent surface in accordance with one or more implementations. The scenario 2800 includes a block body 2802 with an interior surface 2804 and a body tooth surface 2806 on the interior surface 2804, and a locking pin 2808 with a pin head 2810, a pin plate 2812, and an outer pin shaft 2814. Further, the pin plate 2812 includes tooth wings 2816*a*, 2816*b*. The tooth wings 2816*a*, 2816*b*, for instance, extend outwardly from the pin plate 2812 and have toothed surfaces that are engageable with the body tooth surface 2806.

Similarly to the locking pin 2706 detailed above, the locking pin 2808 includes an inner pin shaft (not depicted here) that is movable within the outer pin shaft 2814. For instance, rotating the pin head 2810 causes the inner pin shaft to move up or down (e.g., depending on direction of rotation) relative to the outer pin shaft 2814. In an example implementation, with the locking pin 2808 engaged with an adjacent surface (e.g., a grid surface), tightening the pin head 2810 and the inner pin shaft (e.g., via clockwise rotation) causes the inner pin shaft to move downward within the outer pin shaft 2814 and causes downward movement of the pin plate 2812. Further downward movement of pin plate 2812 causes the tooth wings 2816*a*, 2816*b* to engage with the body tooth surface 2806 to prevent movement of the block body 2802 relative to an adjacent surface. In at least one implementation the pin plate 2812 floats on the inner pin shaft and thus does not rotate with the pin head 2810 and the inner pin shaft. Generally, this enables tightening of the pin head 2810 against the pin plate 2812 to secure the tooth wings 2816*a*, 2816*b* against the body tooth surface 2806. Further, loosening the pin head 2810 and the inner pin shaft (e.g., via counterclockwise rotation) causes the inner pin shaft to move upward within the outer pin shaft 2814 and enables the pin plate 2812 and thus the tooth wings 2816*a*, 2816*b* to disengage from the body tooth surface 2806 to allow movement of the block body 2802 relative to an adjacent surface. Generally, the tooth wings 2816*a*, 2816*b* and the body tooth surface 2806 can be configured based on various tooth surface details discussed throughout this disclosure, such as to include a common tooth pattern and/or differing tooth patterns.

Figure 29:
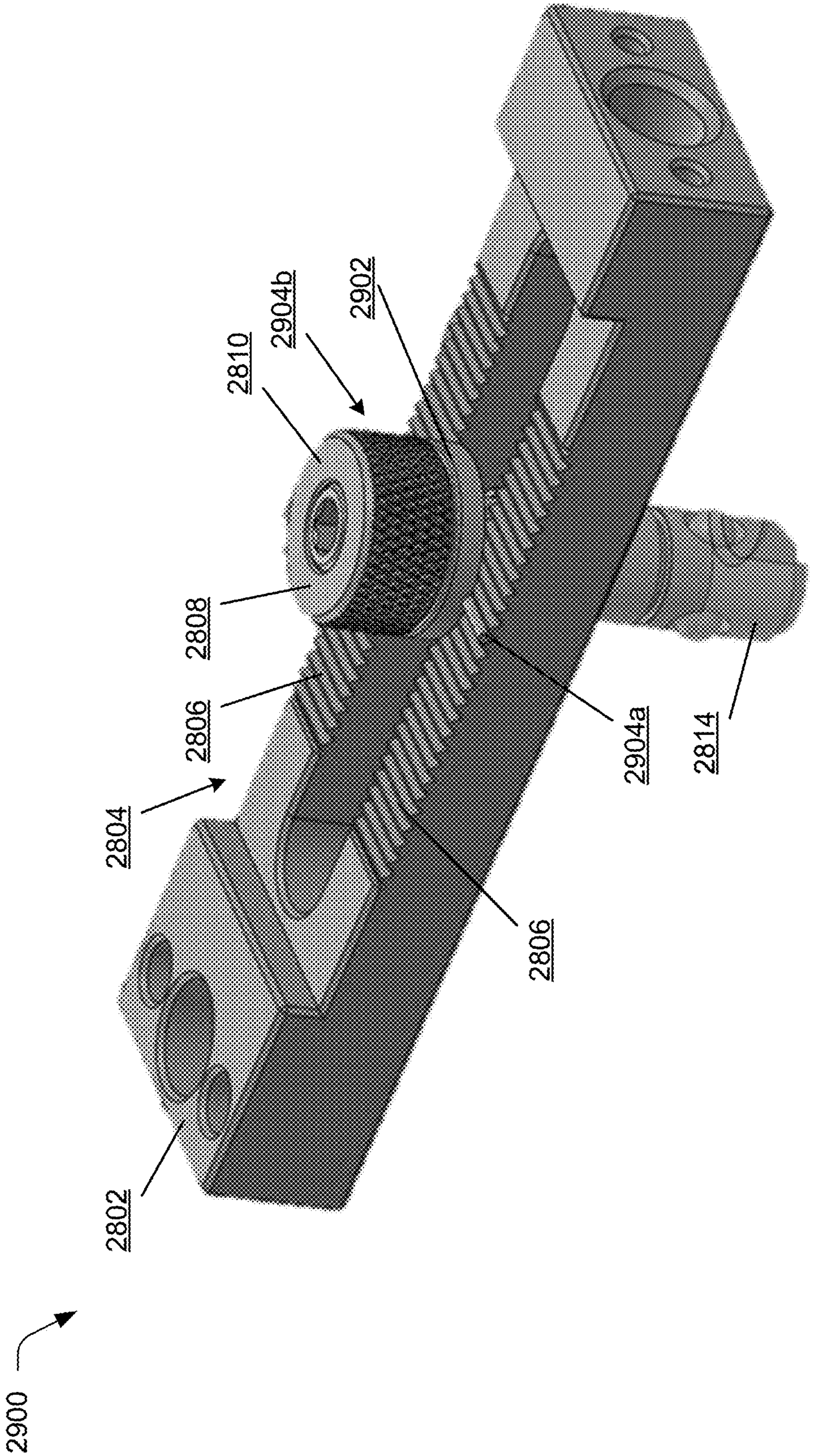
FIG. 29 depicts a scenario for utilizing a locking pin and a pin plate with engagement members for attachment of a block body to an adjacent surface in accordance with one or more implementations.

FIG. 29 depicts a scenario 2900 for utilizing a locking pin and a pin plate with engagement members for attachment of a block body to an adjacent surface in accordance with one or more implementations. The scenario 2900 includes the block body 2802 with the interior surface 2804 and the body tooth surface 2806 on the interior surface 2804, and the locking pin 2808 with the pin head 2810, a pin plate 2902, and the outer pin shaft 2814. Further, the pin plate 2902 includes engagement pins 2904*a*, 2904*b*, with engagement pin 2904*b* not being visible in this view. The engagement pins 2904*a*, 2904*b*, for instance, extend outwardly from the pin plate 2902 and are dimensioned to engage within valleys between teeth in the body tooth surface 2806.

Generally, engagement and disengagement of the pin plate 2902 operates similarly to that described above with reference to the scenarios 2700, 2800 detailed above. For instance, tightening the pin head 2810 causes the pin plate 2902 to move downward and the engagement pins 2904*a*, 2904*b* to engage with valleys in the tooth surface 2806. Further, loosening the pin head releases pressure from the pin plate 2902 such that the engagement pins 2904*a*, 2904*b* can disengage from the tooth surface 2806. In at least one implementation the pin plate 2902 floats on the inner pin shaft of the locking pin 2808 and thus does not rotate with the pin head 2810 and the inner pin shaft. Generally, this enables tightening of the pin head 2810 against the pin plate 2902 to engage the engagement pins 2904*a*, 2904*b* with the body tooth surface 2806.

Figure 30:
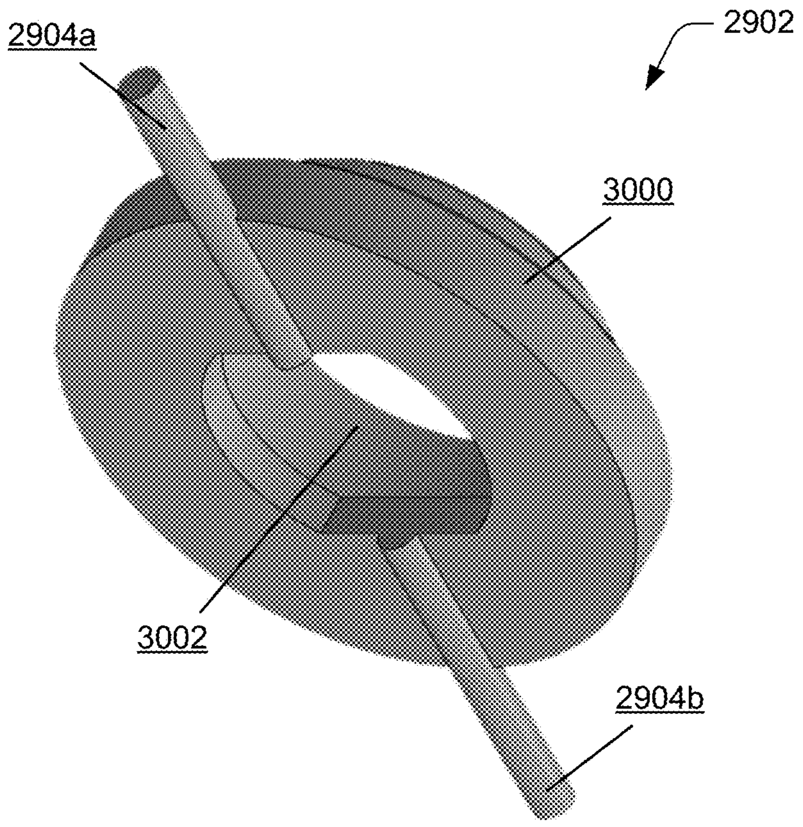
FIG. 30 depicts a detailed example of a pin plate in accordance with one or more implementations.

FIG. 30 depicts the pin plate 2902 introduced above in more detail in accordance with one or more implementations. The pin plate 2902 includes a washer body 3000, a washer aperture 3002 formed within the washer body 3000, and the engagement pins 2904*a*, 2904*b*. Generally, a pin shaft such as an inner pin shaft discussed above can be inserted through the washer aperture 3002. While the engagement pins 2904*a*, 2904*b* are cylindrical in this" particular implementation, the engagement pins 2904*a*, 2904*b* can be implemented in a variety of different forms that are engageable with a tooth surface, such as triangular engagement pins that fit within valleys of a tooth surface. Further, the engagement pins 2904*a*, 2904*b* can be formed in various ways, such as integrated features of the pin plate 2902, features that are attached to the pin plate 2902, and so forth.

Generally, an engagement body as described can include pieces such as plate members, pins, washer, and so forth, that are engageable with a block body. Further, an engagement member can include features of an engagement body such as tooth surfaces, pins, tooth wings, and so forth, that are engageable with a tooth surface of a block body.

Adjustable Block Component

Figure 31:
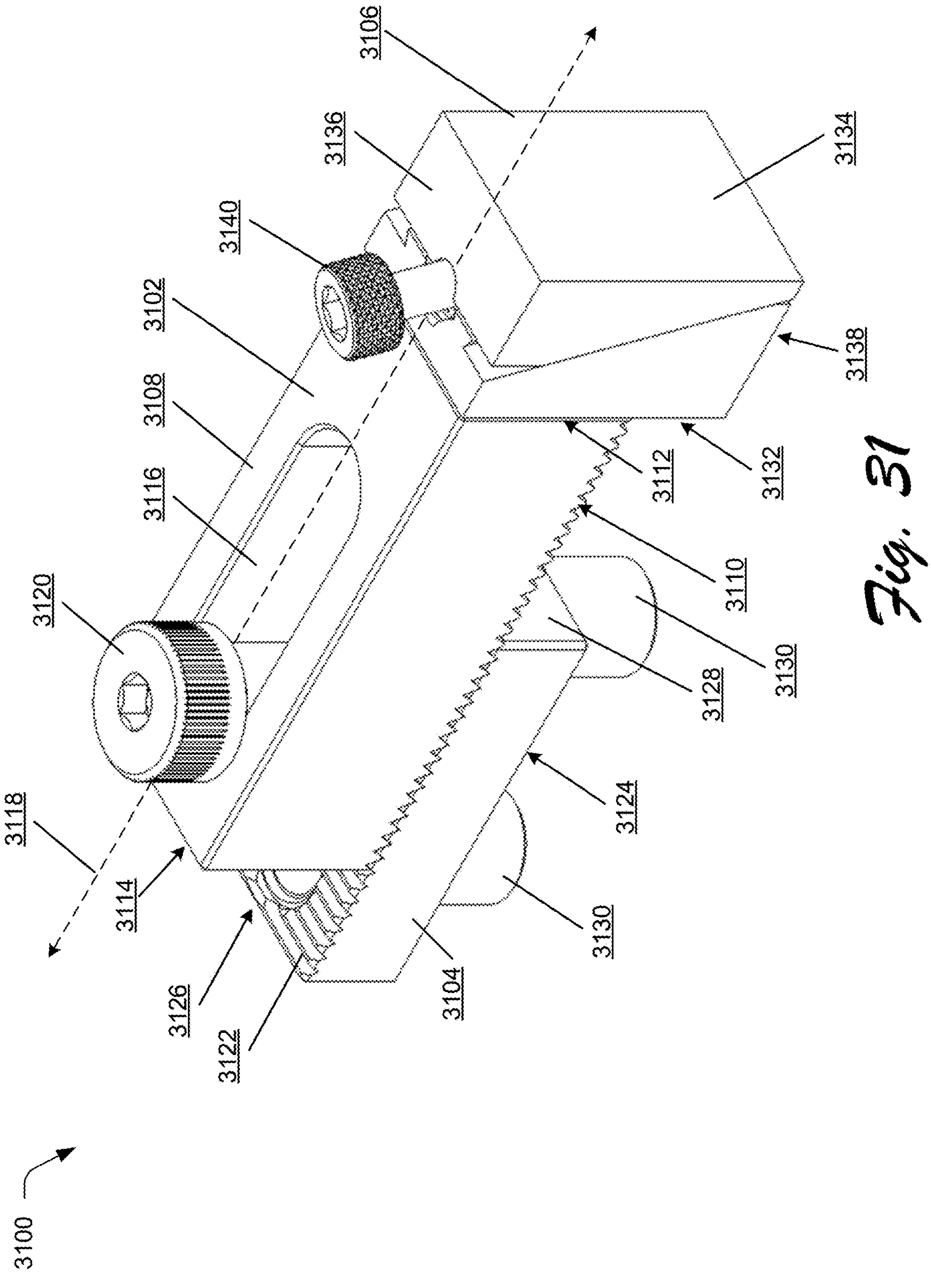
FIG. 31 depicts an adjustable length block assembly according to one or more implementations.

FIG. 31 depicts an adjustable length block assembly 3100 according to one or more implementations. The adjustable length block assembly 3100, for instance, represents an extension and/or variation of the various block assemblies described above and/or below. In the illustrated example, the adjustable length block assembly 3100 includes a block body 3102, a plate member 3104, and an adjustable block component 3106.

In some implementations, the block body 3102 is representative of one or more extensions and/or variations of the various block bodies described above and/or below. In this example, the block body 3102 includes a top surface 3108, a bottom surface 3110, a front surface 3112, and a rear surface 3114. The block body 3102 further includes a pin slot 3116 formed at least partially along the top surface 3108 that extends through an interior of the block body 3102 to the bottom surface 3110. The pin slot 3116, for instance, forms an extended slot extending along a longitudinal axis 3118 of the block body 3102. As described above, pins, bolts, screws, etc., such as the pin 3120, can be placed through the pin slot 3116 to secure the block body 3102 to the plate member 3104 and/or to an adjacent surface, such as a gridded work surface, e.g., a welding table. The bottom surface 3110 of the block body 3102 includes a body tooth surface with an arrangement of teeth that extend downwardly relative to the bottom surface 3110.

In some implementations, the plate member 3104 is representative of one or more extensions and/or variations of the various plate members described above and/or below. In this example, the plate member 3104 includes a top surface 3122, a bottom surface 3124, a rear surface 3126, and a front surface 3128. The top surface 3122 includes a plate tooth surface with an arrangement of teeth that extend upwardly relative to the top surface 3122 such that the plate tooth surface at least partially engages with the body tooth surface and the plate member 3104 is positionable at multiple different positions along a longitudinal length of the block body 3102 as further described above. Accordingly, spatial adjustment of either or both of the block body 3102 and/or the plate member 3104 supports variable positioning of the adjustable length block assembly 3100. The plate member 3104 further includes one or more removable studs 3130 to secure the adjustable length block assembly 3100 to an adjacent surface, such as a gridded worktable. In some examples, the one or more removable studs 3130 represent one or more extensions and/or variations of the pins described above, such as the pins 402*a*, 402*b*.

Generally, the adjustable block component 3106 is configurable to adjust a length of the adjustable length block assembly 3100, such as to make “fine-tune” adjustments to the length of the adjustable length block assembly 3100. In one example, the adjustable block component 3106 is operable to adjust the length of the adjustable length block assembly 3100 at continuous increments between a specified range, e.g., between zero inches and one fourth of an inch. This is by way of example and not limitation, and a variety of ranges are considered.

The adjustable block component 3106 includes a rear surface 3132, a front surface 3134, a top surface 3136, a bottom surface 3138, and an actuation component 3140. The rear surface 3132 of the adjustable block component 3106 is attachable to the front surface 3112 of the block body 3102. As further described below, the actuation component 3140 is operable to adjust a position of the front surface 3134 along the longitudinal length of the adjustable length block assembly 3100, e.g., along the axis 3118.

Figure 32A:
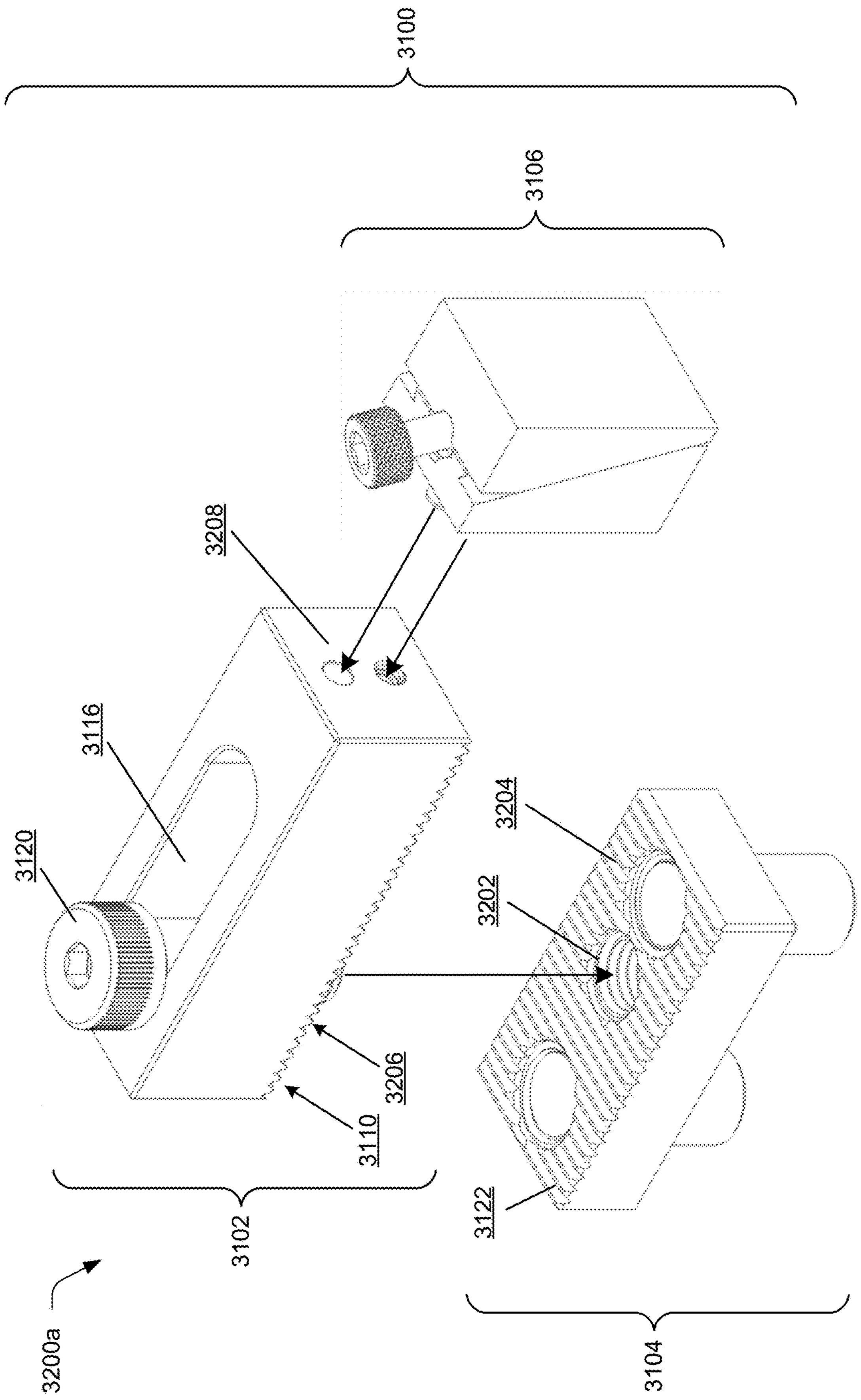
FIG. 32*a* depicts a view of the adjustable length block assembly with the adjustable block component, the block body, and the plate member disengaged from one another in accordance with one or more implementations.
Figure 32B:
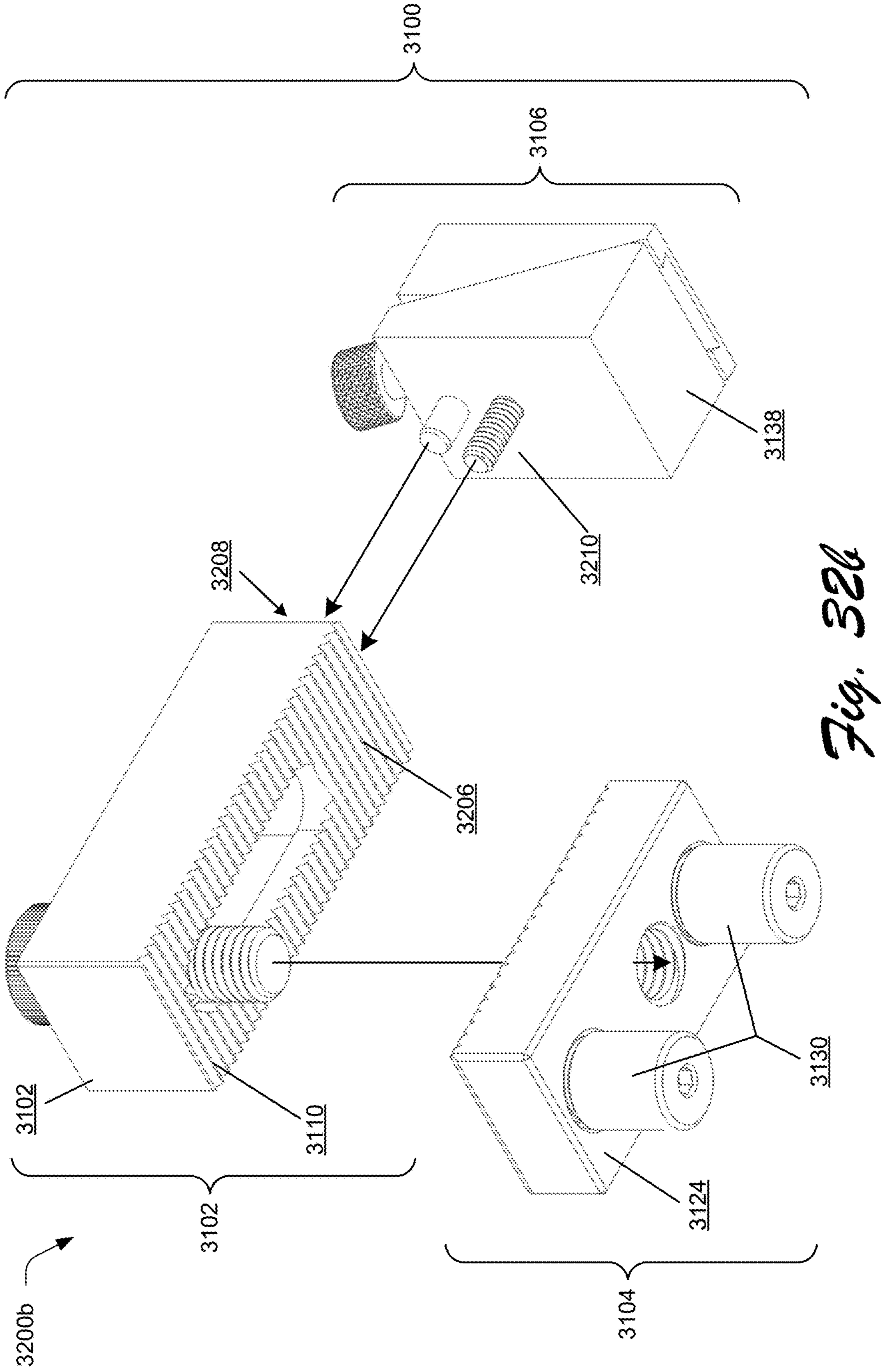
FIG. 32*b* depicts a view of the adjustable length block assembly with the adjustable block component, the block body, and the plate member disengaged from one another in accordance with one or more implementations.

FIG. 32*a* depicts a view 3200*a* of the adjustable length block assembly 3100 with the adjustable block component 3106, the block body 3102, and the plate member 3104 disengaged from one another in accordance with one or more implementations. The view **3200*a* illustrates a pin aperture 3202 and a plate tooth surface 3204 located on the top surface 3122 of the plate member 3104. Also depicted is a body tooth surface 3206 located on the bottom surface 3110 of the block body 3102. The pin aperture 3202 is tapped, e.g., the pin aperture 3202 includes “female” threads, and is depicted as aligned with the pin 3120 that is situated within the pin slot 3116**.

In an example to attach the block body 3102 to the plate member 3104, the tooth surfaces of the plate member 3104 and the block body 3102 are engaged with one another and the pin 3120 is positioned through the pin slot 3116 of the block body 3102 as well as the pin aperture 3202. The pin 3120 can engage with the pin aperture 3202 to affix the block body 3102 to the plate member 3104 and prevent movement of the block body 3102 relative to the plate member 3104. While in this example the block body 3102 and the plate member 3104 are attached via male threads of the pin 3120 and corresponding female threads of the tapped pin aperture 3202, this is by way of example and not limitation and a variety of suitable attachment mechanisms are considered.

The block body 3102 can be repositioned by disengaging the pin 3120 from the pin aperture 3202 as well as disengaging the plate tooth surface 3204 from the body tooth surface 3206. The block body 3102 can then be moved relative to the plate member 3104, e.g., along the longitudinal axis 3118 to adjust a length of the adjustable length block assembly 3100. In this way, the adjustable length block assembly 3100 supports positioning and repositioning of the block body, which impacts an overall length of the adjustable length block assembly 3100.

In some examples, ultrafine adjustment of the length of the adjustable length block assembly 3100 is desired. Accordingly, the adjustable length block assembly 3100 includes an adjustable block component 3106 that supports continuous fine-tune adjustment of the length of the adjustable length block assembly 3100, e.g., infinite adjustment within a predetermined range. To attach the adjustable block component 3106 to the block body 3102, the front surface 3112 of the block body 3102 includes a first mounting interface 3208. Generally, the first mounting interface 3208 is attachable to a second mounting interface 3210 of the adjustable block component 3106, which is visible in FIG. **32*b***.

FIG. **32*b* depicts a view 3200*b* of the adjustable length block assembly 3100 with the adjustable block component 3106, the block body 3102, and the plate member 3104 disengaged from one another in accordance with one or more implementations. The view 3200*b*, for instance, depicts the bottom surface 3110 of the block body 3102 which includes the body tooth surface 3206, the bottom surface 3124 of the plate member 3104, and a bottom surface 3138 of the adjustable block component 3106. Also depicted in this example is the second mounting interface 3210**.

In this example, the first mounting interface 3208 includes a first aperture and a second tapped aperture located below the first aperture as shown in FIG. **32*a*. Accordingly, the second mounting interface 3210 includes a first cylindrical protrusion and a second cylindrical protrusion that is threaded located below the first cylindrical protrusion. The cylindrical protrusions of the second mounting interface 3210 are dimensioned to coincide with the apertures of the first mounting interface 3208 such that insertion of the cylindrical protrusions into the apertures secures the adjustable block component 3106 to the block body 3102. The adjustable block component 3106 may also include an internal aperture to tighten the threaded cylindrical protrusion, such as to secure the second mounting interface 3210 to the first mounting interface 3208**.

This is by way of example and not limitation, and a variety of other configurations for the first mounting interface 3208 and the second mounting interface 3210 are considered. In one example, the first mounting interface 3208 includes one or more apertures fitted with one or more locking spring pins. The second mounting interface 3210 thus includes one or more protrusions that include a slot and/or groove to coincide with the locking spring pin. In this way, the adjustable block component 3106 is easily removable from the block body 3102 while maintaining a secure attachment while in a “locked” position. A variety of additional attachment mechanisms are considered, such as one or more of a snap-fit connections, magnetic attachments, threaded inserts, clamps, pins, etc.

In some examples, the plate member 3104 further includes one or more stud interfaces to house one or more removable studs 3130. Generally, the removable studs 3130 are pins that are operable to attach the adjustable length block assembly 3100 to an adjacent surface, such as a gridded work surface. The stud interfaces can attach the one or more removable studs 3130 to the plate member 3104 in a variety of ways. For instance, the stud interfaces include one or more of a threaded aperture, mechanical clasp, magnetic component, locking clip, etc. The removable studs 3130 can be dimensioned to coincide with apertures of a surface. In an example in which a grided work surface includes cylindrical mounting holes spaced two inches from one another, the one or more removable studs 3130 are spaced two inches from one another to coincide with the cylindrical mounting holes of the work surface. Thus, insertion of the removable studs 3130 into the mounting holes secures the adjustable length block assembly 3100 to the work surface.

In an additional or alternative example, the one or more removable studs 3130 are dimensioned to coincide with diagonal apertures of a work surface. Continuing the above example in which the gridded work surface includes cylindrical mounting holes spaced two inches from one another, the bottom surface 3124 of the plate member 3104 includes at least two stud interfaces spaced 2.83 inches apart, e.g., the distance between diagonal apertures of the gridded surface. In some implementations, the bottom surface 3124 of the plate member 3104 includes removable studs 3130 dimensioned to coincide with both adjacent and diagonal apertures of a surface, e.g., using three or more stud interfaces. In some examples, one or more of the stud interfaces are slidable such that one or more removable studs 3130 can be adjustably spaced at a customizable location. In this way, the adjustable length block assembly 3100 is customizable for a variety of implementations and work surfaces.

Further, in some examples the stud interfaces are located at an offset distance from either or both the rear surface 3126 and/or the front surface 3128 of the plate member 3104. Consider an example in which the plate member 3104 is four inches long. The bottom surface 3124 of the plate member 3104 includes a first stud interface to house a first removable stud 3130 located an offset distance from the rear surface 3126, e.g., 0.5 inches. The bottom surface 3124 further includes a second stud interface to house a second removable stud 3130. The second stud interface has a center two inches from a center of the first stud interface, such that the first and second removable studs 3130 in this example coincide with adjacent apertures of a gridded work surface.

Thus, the center of the second stud interface is located at an offset of 1.5 inches from the front surface 3128. Such dimensioning supports additional functionality, such that "reversing" an orientation of the adjustable length block assembly 3100 relative to the work surface adjusts an end location of the adjustable length block assembly 3100 by one inch. In this way, the offset location of the one or more removable studs 3130 supports efficient and intuitive arrangement of the adjustable length block assembly 3100.

Figure 33:
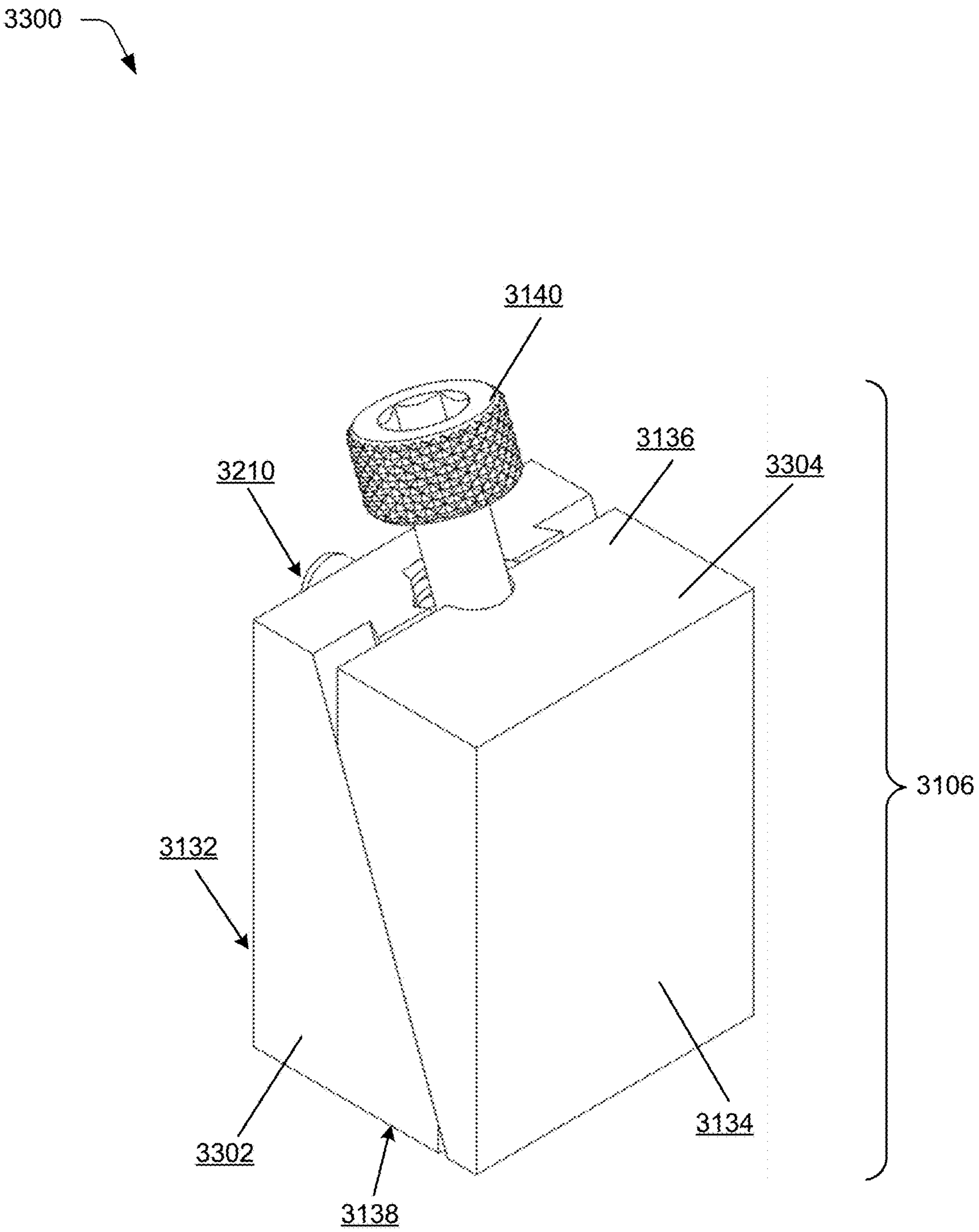
FIG. 33 depicts a view of the adjustable block component in accordance with one or more implementations.

FIG. 33 depicts a view 3300 of the adjustable block component 3106 in accordance with one or more implementations. Depicted in this example are the rear surface 3132, the front surface 3134, the top surface 3136, the bottom surface 3138, and the second mounting interface 3210. Although not depicted, in some examples the bottom surface 3138 includes one or more stud interfaces, such as to house one or more removable studs to attach the adjustable block component 3106 to a work surface. The adjustable block component 3106 further includes a mounting body 3302, a slidable body 3304, and the actuation component 3140. Generally, the mounting body 3302 is configured to attach to the block body 3102, such as via the first mounting interface 3208 and the second mounting interface 3210 as described above. The slidable body 3304 is operable to slide relative to the mounting body 3302 to adjust a length of the adjustable block component 3106 when the actuation component 3140 is actuated.

Figure 34A:
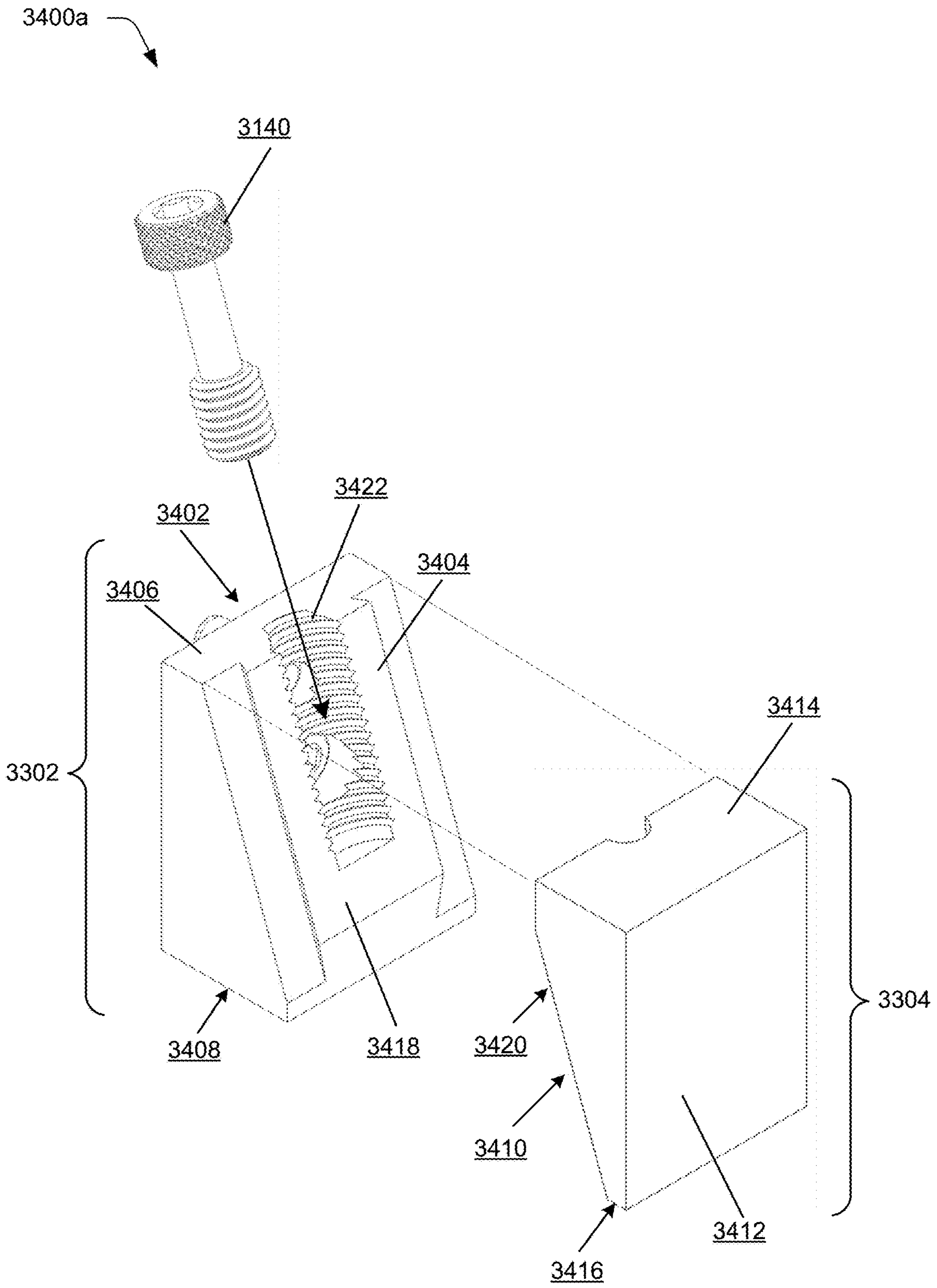
FIG. 34*a* depicts a first view of the adjustable block component with the mounting body, the slidable body, and the actuation component disengaged from one another in accordance with one or more implementations.
Figure 34B:
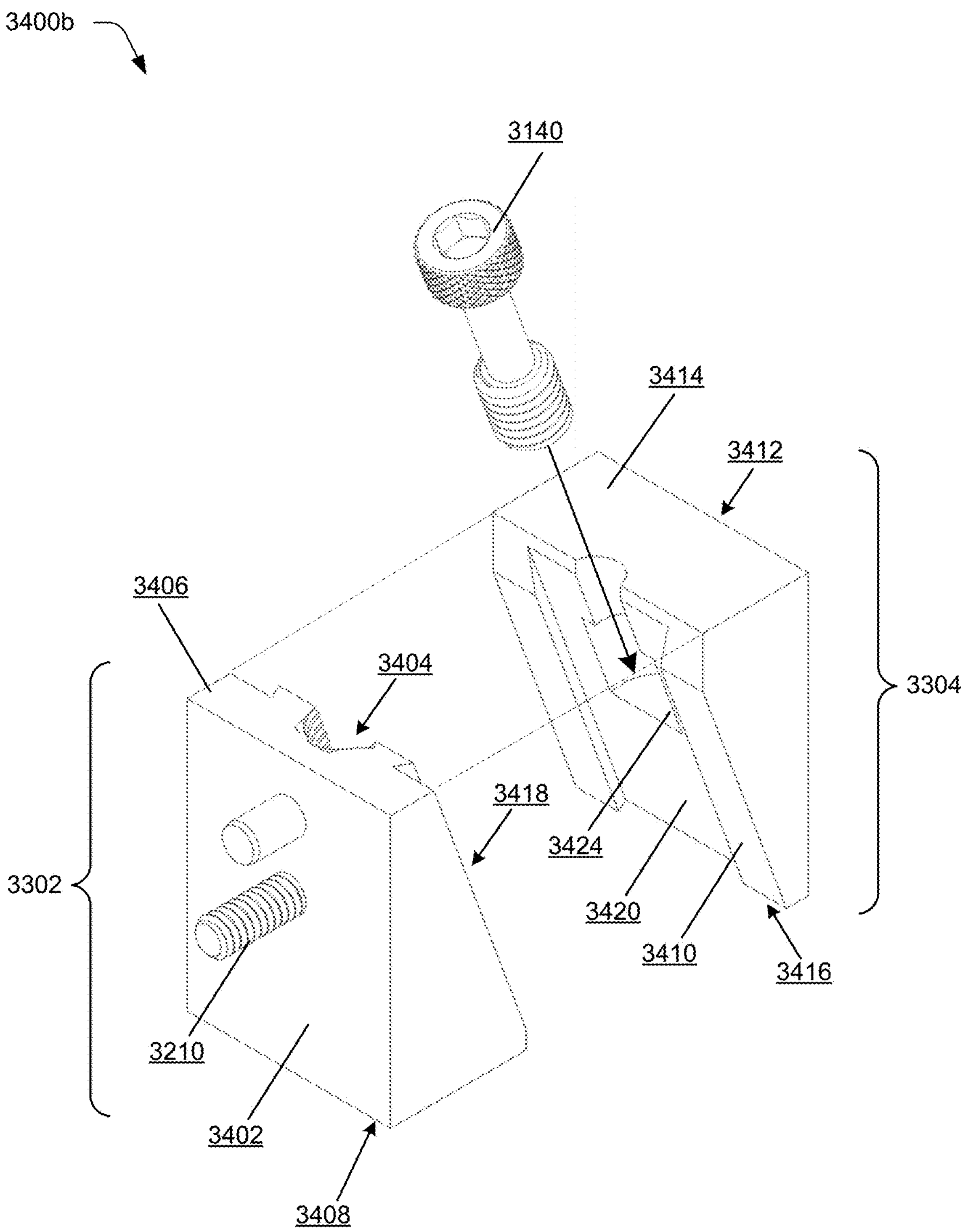
FIG. 34*b* depicts a second view of the adjustable block component with the mounting body, the slidable body, and the actuation component disengaged from one another in accordance with one or more implementations.

FIG. 34*a* depicts a first view 3400*a* of the adjustable block component 3106 with the mounting body 3302, the slidable body 3304, and the actuation component 3140 disengaged from one another in accordance with one or more implementations. FIG. 34*b* depicts a second view 3400*b* of the adjustable block component 3106 with the mounting body 3302, the slidable body 3304, and the actuation component 3140 disengaged from one another in accordance with one or more implementations. In the first view 3400*a* and the second view 3400*b*, dashed lines indicate an example alignment of the mounting body 3302 with the slidable body 3304.

In the illustrated examples, the mounting body 3302 includes a rear surface 3402 and an angled front surface 3404. The mounting body 3302 further includes a top surface 3406 and a bottom surface 3408. The slidable body 3304 includes an angled rear surface 3410, a front surface 3412, a top surface 3414, and a bottom surface 3416. The front surface 3412, for instance, is the front surface 3134 of the adjustable block component 3106 and is configured to contact an exterior body, e.g., a workpiece and or tool. Accordingly, in some examples the front surface 3412 includes multiple surfaces such as described above with respect to FIG. 1 and FIG. 19 such as a face surface and one or more angled surfaces that are angled at an acute angle relative to the contact surface. In this way, the differently angled surfaces of the front surface 3412 enable workpieces to be arranged at different angles relative to one another.

In various examples, the angled front surface 3404 and the angled rear surface 3410 are located in parallel planes to support secure attachment of the slidable body 3304 with the mounting body 3302. In the illustrated example, the mounting body 3302 and the slidable body 3304 are configurable in a "wedge" arrangement. For instance, the angled front surface 3404 is depicted as forming an acute angle with a plane defined by the bottom surface 3408, while the angled rear surface 3410 is depicted as forming an obtuse angle with a plane defined by the bottom surface 3416. In other words, the angled front surface 3404 is a downward sloping surface defined by a substantially consistent angular deviation from a plane defined by the rear surface 3402 of the mounting body 3302. The angled rear surface 3410 of the slidable body is an upward sloping surface substantially parallel to the angled front surface 3404.

This is by way of example and not limitation, and the angled front surface 3404 and the angled rear surface 3410 are configurable in a variety of ways. For instance, an angle formed by the angled front surface 3404 and a plane defined by the bottom surface 3408 can be within a range of greater than 0° to less than 180°. Similarly, an angle formed by the angled rear surface 3410 and a plane defined by the bottom surface 3416 can fall between a range of greater than 0° to less than 180°. In at least one example, the angled front surface 3404 and/or the angled rear surface 3410 are perpendicular to a plane defined by the bottom surface 3408 and/or the bottom surface 3416.

Further, in the illustrated example the angled front surface 3404 and the angled rear surface 3410 are depicted as having substantially consistent slope, e.g., the angled front surface 3404 and the angled rear surface 3410 are substantially planar faces. However, in various examples the angled front surface 3404 and/or the angled rear surface 3410 are non-planar. For instance, the angled front surface 3404 and/or the angled rear surface 3410 can have a shape and/or profile that is convex, concave, defined by one or more splines, etc.

Generally, the slidable body 3304 is operable to controllably slide along an axis defined by the angled front surface 3404 and/or the angled rear surface 3410. To do so, the mounting body 3302 includes a first slidable mounting interface 3418, which in this example is located on the angled front surface 3404. The first slidable mounting interface 3418 is attachable to a second slidable mounting interface 3420 of the slidable body 3304, which in this example is located on the angled rear surface 3410 of the slidable body 3304. The second slidable mounting interface 3420, for instance, is operable to adjustably connect the slidable body 3304 to the mounting body 3302 with the angled rear surface 3410 at least partially engaged with the angled front surface 3404.

The first slidable mounting interface 3418 and the second slidable mounting interface 3420 are configurable in a variety of ways. Generally, the first slidable mounting interface 3418 and the second slidable mounting interface 3420 enable controlled movement (e.g., as controlled by the actuation component 3140) of the slidable body 3304 along an axis defined by the angled front surface 3404 and/or the angled rear surface 3410 while restricting movement in one or more other directions. Thus, the front surface 3412 is configured to remain substantially perpendicular to a plane defined by the top surfaces of the mounting body 3302 and/or the block body 3102 in scenarios in which the adjustable block component 3106 is attached to the block body 3102. By defining a plane of movement of the slidable body 3304 as parallel to the angled front surface 3404, the adjustable block component 3106 prevents "slipping" when a force is applied in a lateral direction to the front surface 3412. In this way, the adjustable block component 3106 supports secure and efficient positioning of various workpieces to enable work to be applied to the workpieces without unintended movement of the workpieces while work is being applied.

In various examples, the first slidable mounting interface 3418 and/or the second slidable mounting interface 3420 include one or more grooves, slidable rails, bearings, linear motion sliders, tracks, etc. to engage the slidable body 3304 with the mounting body 3302 while enabling movement of the slidable body 3304 with respect to an axis defined by the angled front surface 3404. In some examples, the second slidable mounting interface 3420 includes one or more grooves (e.g., one or more channels) that extend partially and/or wholly along a face of the angled rear surface 3410, e.g., from the top surface 3414 to the bottom surface 3416. The first slidable mounting interface 3418 thus includes one or more protrusions that extend, partially and/or wholly, along a face of the angled front surface 3404 to substantially conform to the one or more grooves of the second slidable mounting interface 3420. Thus, when the slidable body 3304 and the mounting body 3302 are engaged, the first slidable mounting interface 3418 and the second slidable mounting interface 3420 allow movement of the slidable body 3304 along an axis defined by the angled front surface 3404 and/or the angled rear surface 3410 while restricting movement in other directions.

Figure 34C:
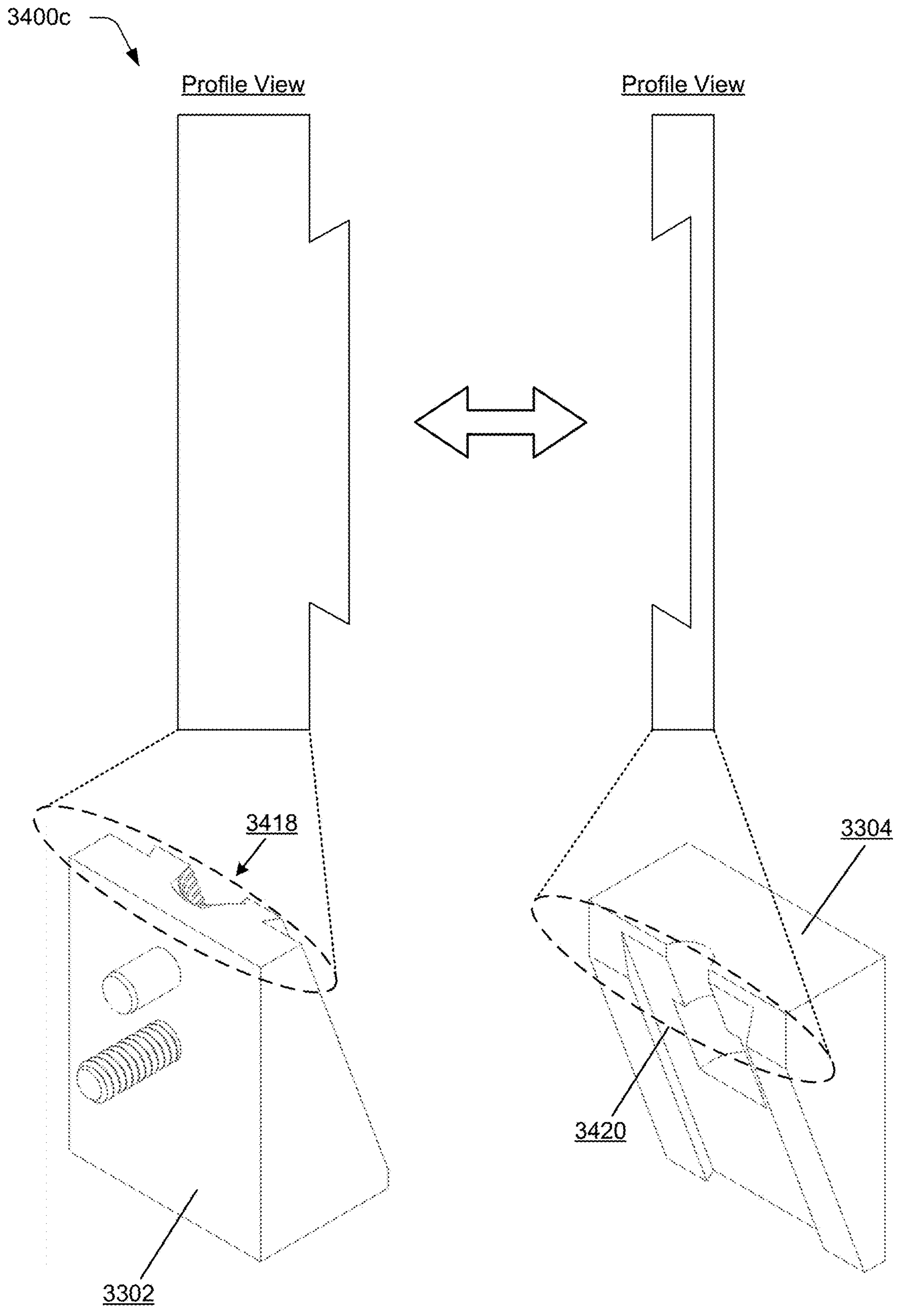
FIG. 34*c* depicts a view of a profile of the first slidable mounting interface and the second slidable mounting interface in accordance with one or more implementations.

FIG. 34*c* depicts a view 3400*c* of a profile of the first slidable mounting interface 3418 and the second slidable mounting interface 3420 in accordance with one or more implementations. In this example, the second slidable mounting interface 3420 includes a groove that extends the length of the angled rear surface 3410. The groove represents a dovetail socket, e.g., a recessed trapezoidal shape in which a width of the groove increases linearly as the groove deepens. The first slidable mounting interface 3418 includes a protrusion that corresponds to the groove. For instance, the first slidable mounting interface 3418 includes a dovetail shaped protrusion dimensioned to fit within an interior surface of the dovetail socket to enable the slidable body 3304 and the mounting body 3302 to engage. This is by way of example and not limitation, and a variety of shapes and configurations for the first slidable mounting interface 3418 and the second slidable mounting interface 3420 are considered.

Returning to the view 3400*a*, also depicted is a partial aperture 3422 located on the angled front surface 3404 of the mounting body 3302. The partial aperture 3422 is parallel to the angled front surface 3404 and is configured to engage with the actuation component 3140 as further described below with respect to FIG. 35. The view 3400*b* depicts a recessed cavity 3424 located on the angled rear surface 3410 of the slidable body 3304 that is configured to house at least a portion of the actuation component 3140 as further described below with respect to FIG. 36. Thus, the actuation component 3140 can engage with both the mounting body 3302 and the slidable body 3304 simultaneously.

Figure 35:
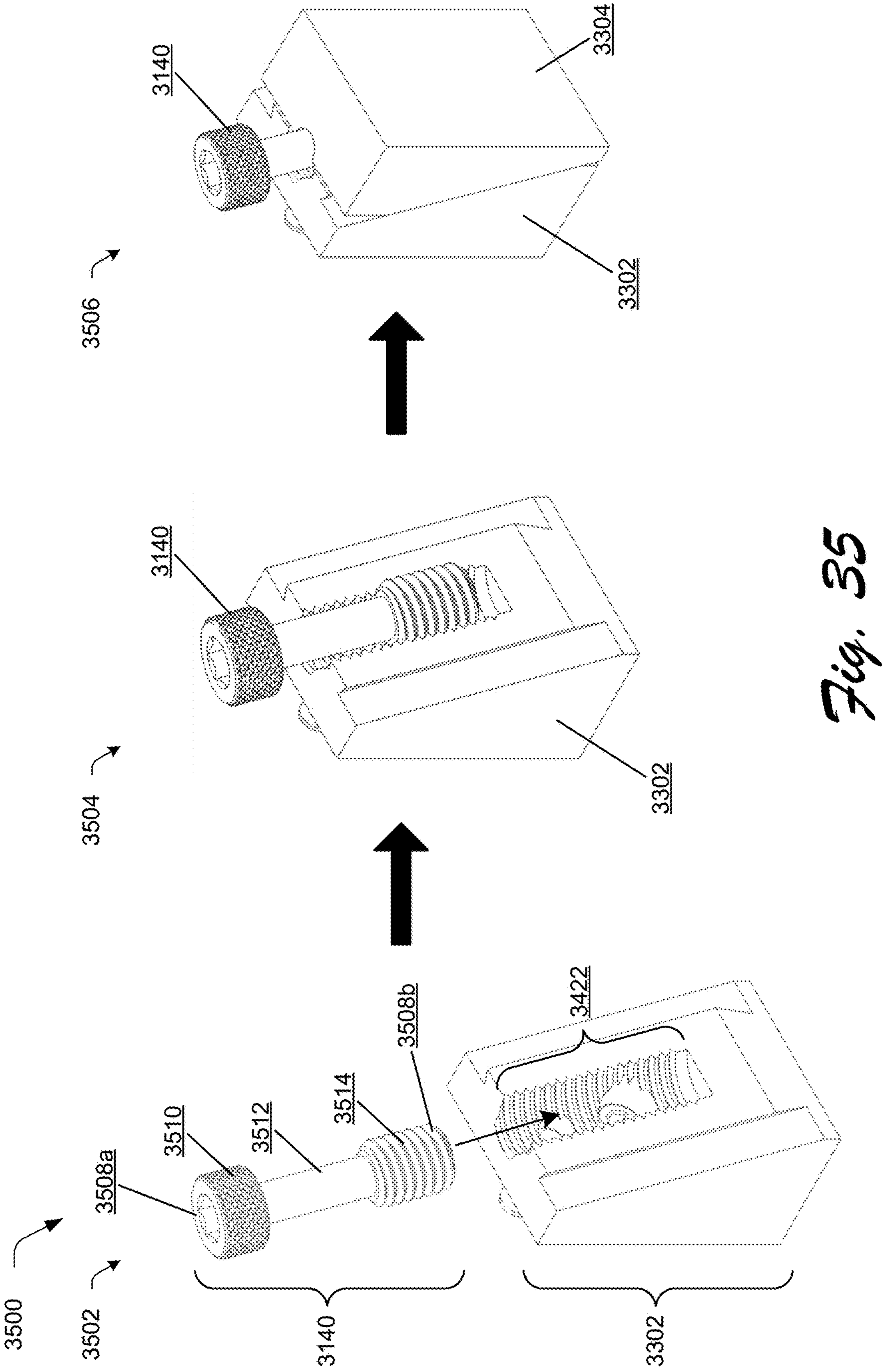
FIG. 35 depicts a scenario illustrating engagement of the actuation component with the adjustable block component in accordance with one or more implementations.

FIG. 35 depicts a scenario 3500 illustrating engagement of the actuation component 3140 with the adjustable block component 3106 in accordance with one or more implementations in a first stage 3502, a second stage 3504, and a third stage 3506 from a first view angle. The first stage 3502 depicts the actuation component 3140 as disengaged from the mounting body 3302. The actuation component 3140 includes a proximal end 3508*a* and a distal end 3508*b*. The actuation component 3140 includes an actuator 3510 located at the proximal end 3508*a*, a spindle 3512 between the proximal end 3508*a* and the distal end 3508*b*, and a threaded component 3514 located at the distal end 3508*b*. In this example, the actuator 3510 is depicted as a knob that can be actuated (e.g., rotated clockwise and/or counterclockwise) by either a hand or instrument, however a variety of suitable actuation devices, interface, and/or controls are considered including but not limited to buttons, switches, knobs, electronic controls, levers, dials, etc. The mounting body 3302 includes a partial aperture 3422, which in this example is a tapped semicylindrical aperture that is located along an axis defined by the angled front surface 3404. The partial aperture 3422, for instance, has female threads that correspond to male threads of the threaded component 3514.

As illustrated in the second stage 3504, the actuation component 3140 is engaged with the mounting body 3302. In this example, the partial aperture 3422 is dimensioned to fit the threaded component 3514 of the actuation component 3140. Thus, the actuation component 3140 can "screw" into the mounting body 3302 via engagement of the threaded component 3514 and the tapped partial aperture 3422. For instance, rotation of the actuator 3510, such as by a user, causes the actuation component 3140 to raise or lower, depending on the direction of the rotation. The third stage 3506 depicts the actuation component 3140 as engaged with both the mounting body 3302 and the slidable body 3304.

Figure 36:
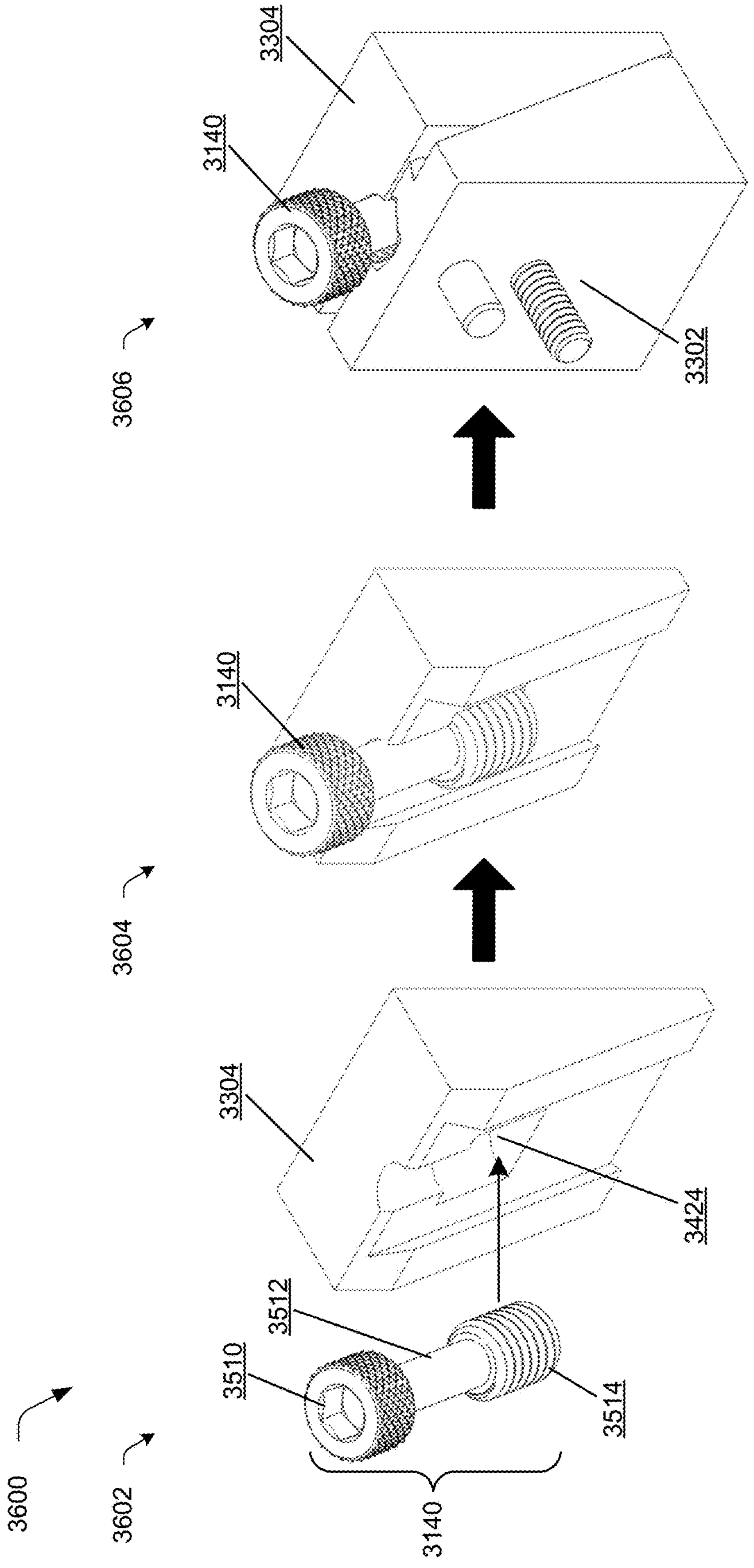
FIG. 36 depicts a scenario illustrating engagement of the actuation component with the adjustable block component in accordance with one or more implementations.

FIG. 36 depicts a scenario 3600 illustrating engagement of the actuation component 3140 with the adjustable block component 3106 in accordance with one or more implementations in a first stage 3602, a second stage 3604, and a third stage 3606 from a second view angle. In this example, engagement of the actuation component 3140 with the slidable body 3304 is illustrated. For instance, in the first stage 3602 the actuation component 3140 is disengaged from the slidable body 3304. The slidable body 3304 includes a recessed cavity 3424 that is dimensioned to house the threaded component 3514, either partially or wholly. For instance, the recessed cavity 3424 includes a first semicylindrical recessed region of a first diameter substantially similar to the diameter of the threaded component 3514. The recessed cavity 3424 further includes a second semicylindrical recessed region of a second diameter. The second diameter corresponds to (e.g., is substantially similar to) a diameter of the spindle 3512.

As shown in the second stage 3604, the actuation component 3140 is engaged with the slidable body 3304 such that a portion of the threaded component 3514 is secured within the first semicylindrical recessed region of the recessed cavity 3424. A portion of the spindle 3512 is secured within the second semicylindrical recessed region. The third stage 3606 depicts the actuation component 3140 as engaged with both the mounting body 3302 and the slidable body 3304.

Figure 37:
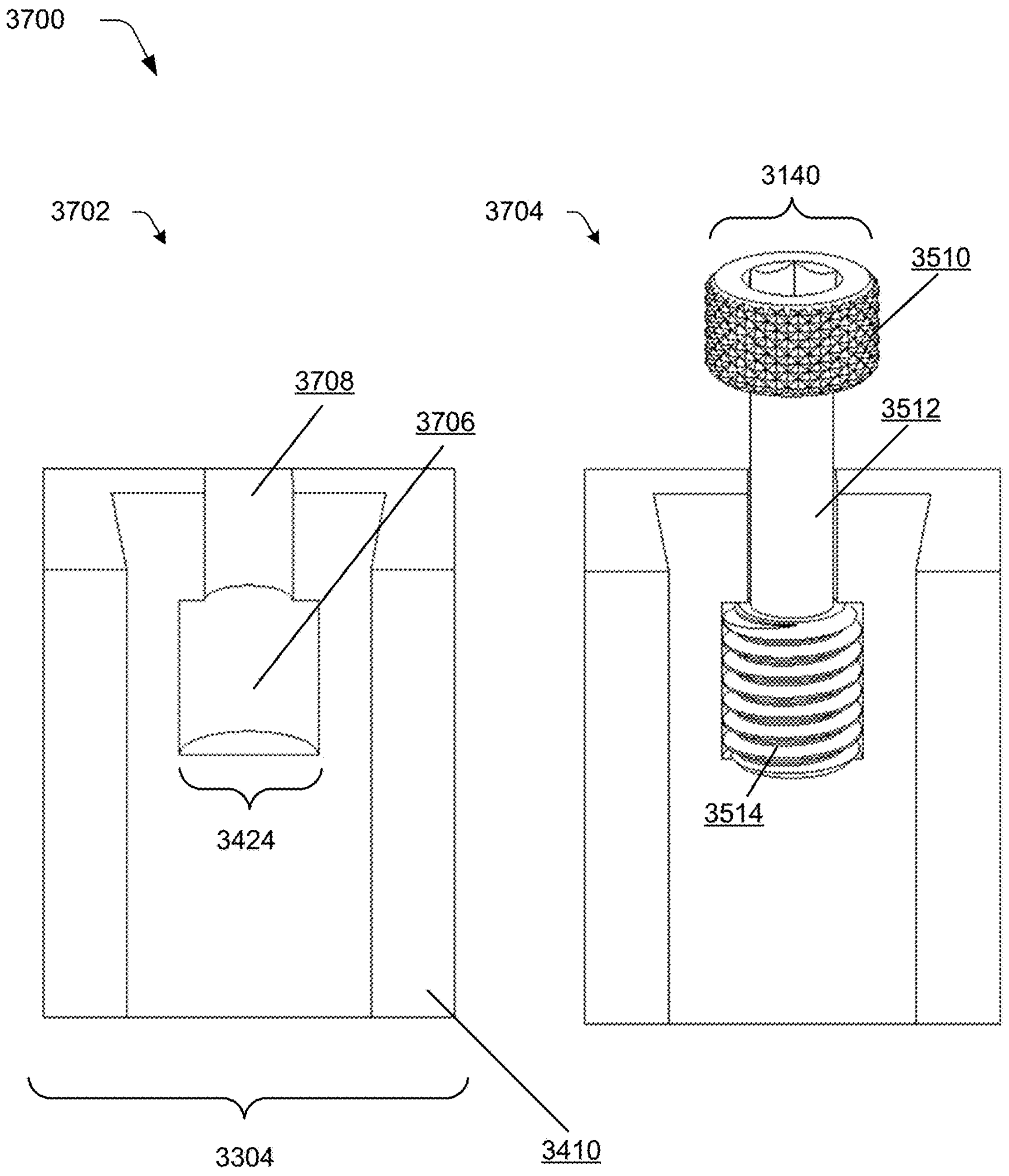
FIG. 37 depicts a view of the slidable body to illustrate the recessed cavity in accordance with one or more implementations.

FIG. 37 depicts a view 3700 of the slidable body 3304 to illustrate the recessed cavity 3424 in accordance with one or more implementations in a first example 3702 and a second example 3704. The view 3700, for instance, is of the angled rear surface 3410 of the slidable body 3304. As depicted in the first example 3702, the recessed cavity 3424 includes a first semicylindrical recessed region 3706 of a first diameter substantially similar to the diameter of the threaded component 3514. The recessed cavity 3424 further includes a second semicylindrical recessed region 3708 of a second diameter that corresponds to a diameter of the spindle 3512. The second example 3704 depicts the actuation component 3140 housed within the recessed cavity 3424 of the slidable body 3304. In this way, the actuation component 3140 is secured within the slidable body 3304 such that movement of the actuation component 3140 causes the slidable body 3304 to move simultaneously, such as relative to the mounting body 3302.

Figure 38:
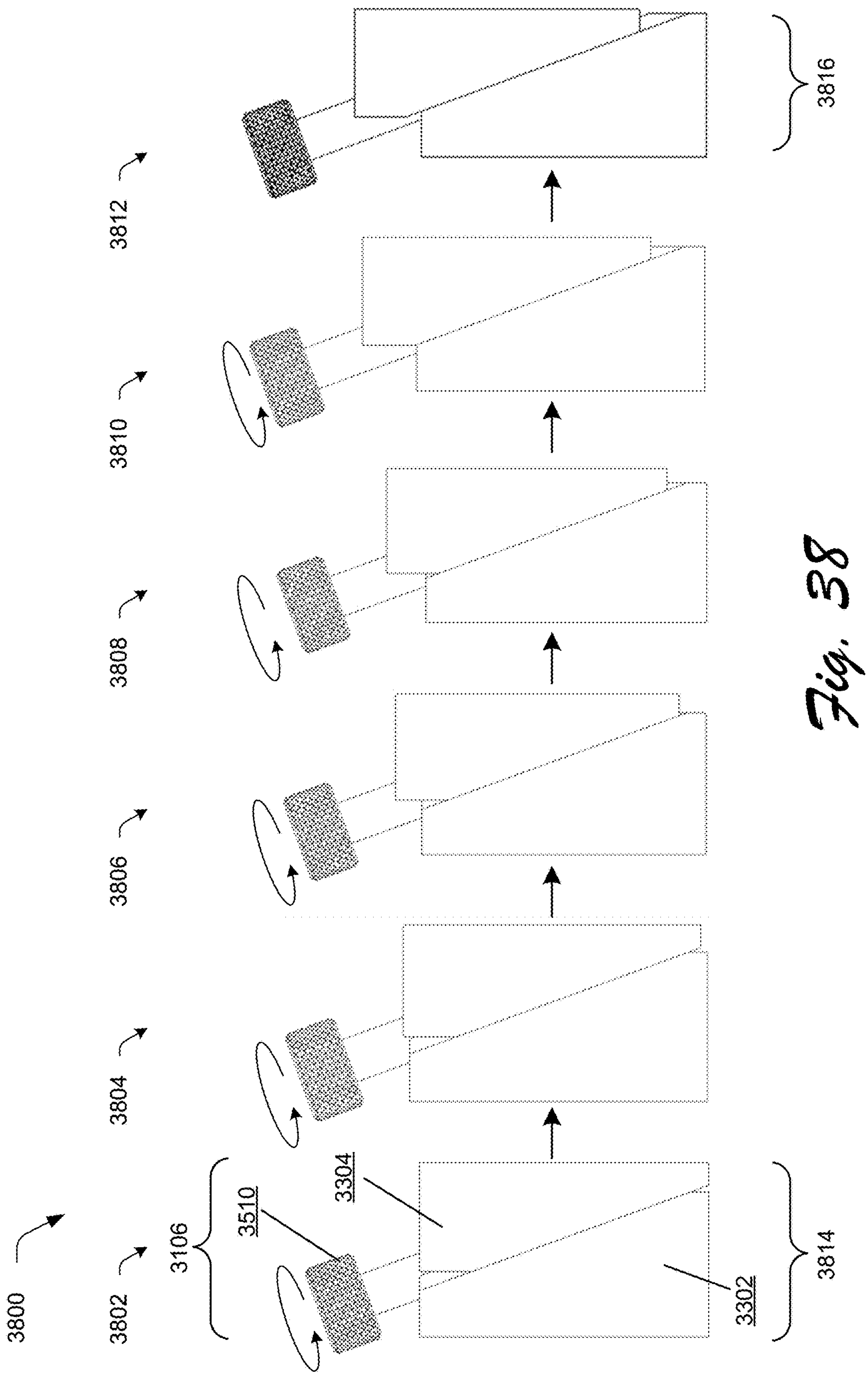
FIG. 38 depicts a scenario of actuation of the actuation component to cause the slidable body to move in accordance with one or more implementations.

For example, FIG. 38 depicts a scenario 3800 of actuation of the actuation component 3140 to cause the slidable body 3304 to move in accordance with one or more implementations in stages 3802, 3804, 3806, 3808, 3810, and 3812. For instance, the actuator 3510 of the actuation component 3140 is rotated counterclockwise, which causes the male threads of the threaded component 3514 to interact with the female threads of the tapped partial aperture 3422. In this example, counterclockwise rotation corresponds to "upward" movement, e.g., to move the actuation component 3140 towards the top surface 3406 of the mounting body 3302 along an axis defined by the partial aperture 3422, which in this example is parallel to the angled front surface 3404.

Because the actuation component 3140 is also engaged with the slidable body 3304 via the recessed cavity 3424, the movement of the actuation component 3140 is effective to "pull" the slidable body 3304 along an axis defined by the angled front surface 3404. Further, the front surface 3412 of the slidable body 3304 remains perpendicular to the top surface 3406 and the bottom surface 3408 of the mounting body 3302. Accordingly, progressing from stage 3802 to stage 3812, as the actuation component 3140 is rotated, the adjustable block component 3106 continuously "shortens" in length. In this example, the adjustable block component 3106 can adjust the location of the front surface 3412 (e.g., the length of the adjustable block component 3106) continuously up to 0.25 inches.

In an example implementation, adjustment of the actuation component 3140 causes the slidable body 3304 to move relative to the mounting body 3302 such as to cause a length of the adjustable block component 3106 to vary in either direction by up to n inches, e.g., n=0.25 inches. For instance, in the illustrated example a first distance 3814 represents a length of the adjustable block component 3106 before adjustment of the actuation component 3140 and a second distance 3816 represents a length of the adjustable block component 3106 after adjustment of the actuation component 3140. The first distance 3814 is greater than the second distance 3816, such as 0.25 inches longer.

In some examples, one or more of the mounting body 3302 and/or the slidable body 3304 include a stopper component that is operable to prevent the slidable body 3304 from moving past a particular point. Although not depicted, in some examples the adjustable block component 3106 includes one or more scale regions that are visual representations of a particular linear measurement scale such as described above with respect to the block body. While in this example the adjustable block component 3106 is depicted as disengaged from the block body 3102, it should be understood that the same and/or similar functionality can be performed when the adjustable block component 3106 is engaged with the block body 3102. Thus, the adjustable block component 3106 supports fine-tuned adjustment to a length of various block assemblies, such as depicted in the following examples.

Figure 39A:
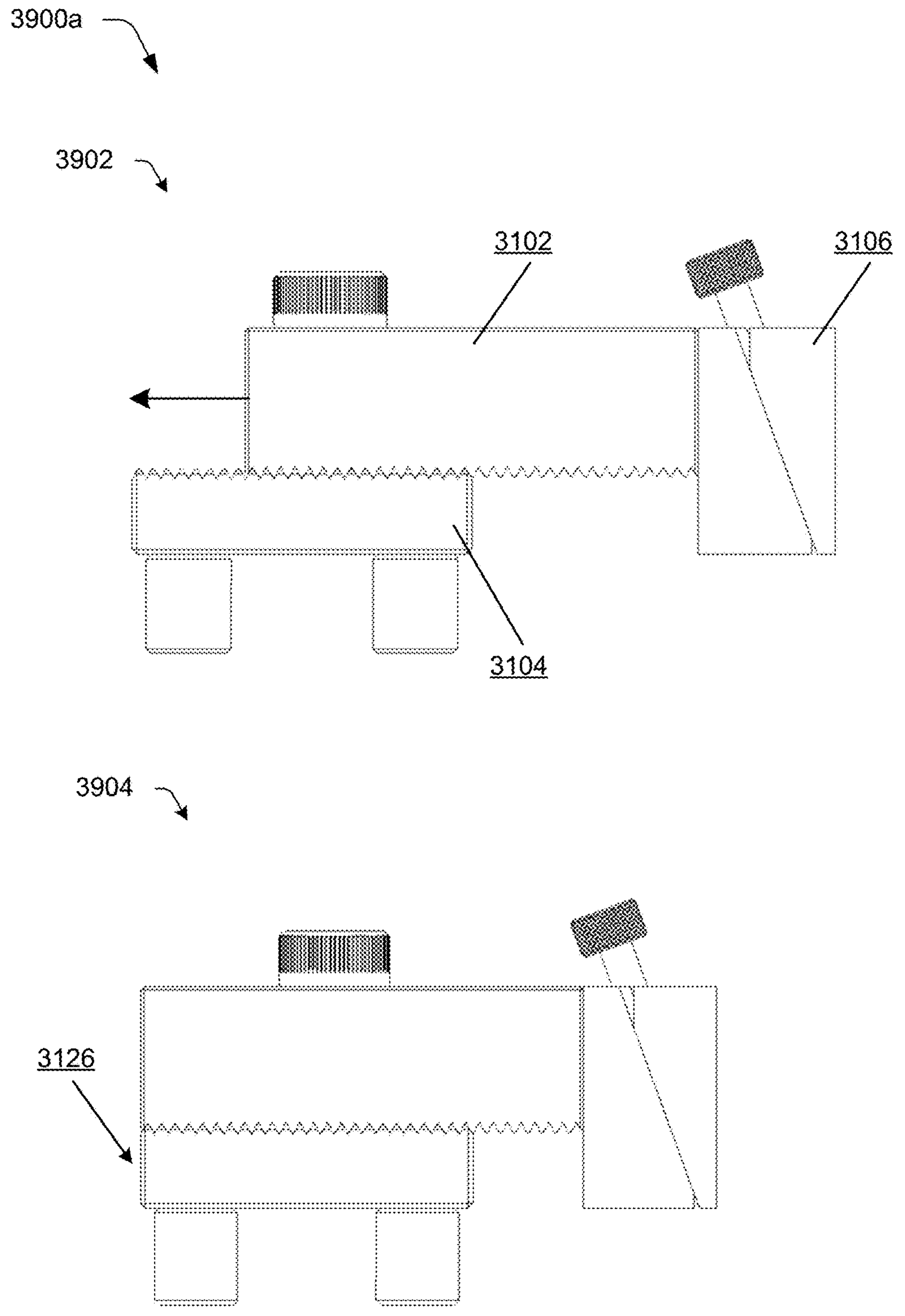
FIGS. 39*a* and 39*b* depict an example usage scenario to use an adjustable length block assembly in accordance with one or more implementations.
Figure 39B:
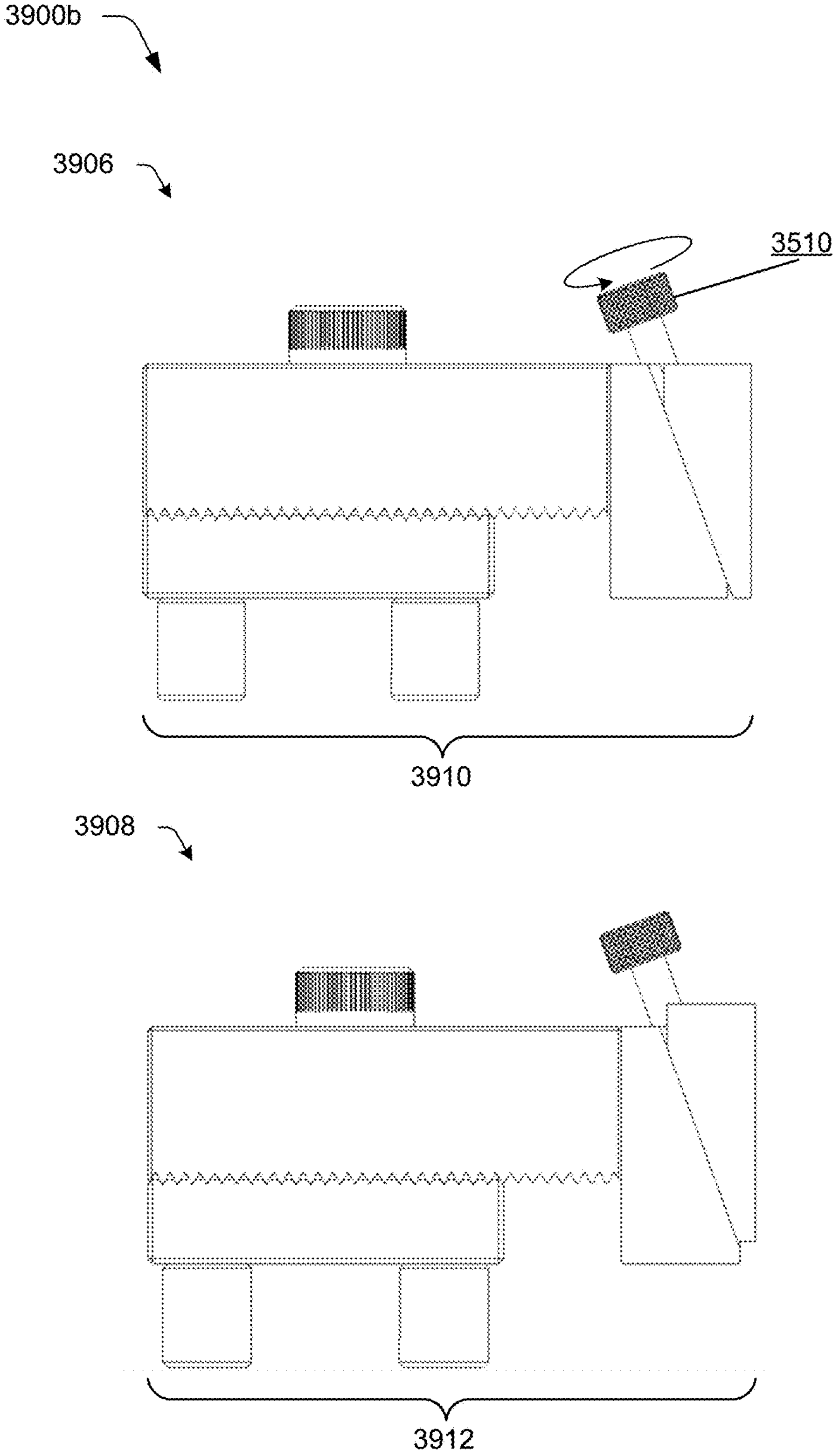

FIGS. 39*a* and 39*b* depict an example usage scenario 3900*a* and 3900*b* to use an adjustable length block assembly 3100 in accordance with one or more implementations in a first stage 3902, a second stage 3904, a third stage 3906, and a fourth stage 3908. In this example, the adjustable block component 3106 is attached to the block body 3102 in accordance with the techniques described herein. The first stage 3902 depicts the adjustable length block assembly 3100, with the block body 3102 and the adjustable block component 3106 in a first position. A user of the adjustable length block assembly 3100 wishes to shorten the adjustable length block assembly 3100 for a particular application, e.g., to secure a workpiece having particular dimensions. Accordingly, in the second stage 3904, the block body 3102 is repositioned towards the rear surface 3126 of the plate member 3104 and secured via engagement of the top surface plate tooth surface 3204 and the body tooth surface 3206. The block body 3102 and the plate member 3104 are further secured via engagement of the pin 3120 and the pin aperture 3202. In this way, the length of the adjustable length block assembly 3100 is shortened.

In this example, the user desires precise positioning of the adjustable length block assembly 3100 for the particular application, e.g., to secure a workpiece on a gridded worktable. Accordingly, in the third stage 3906 the user rotates the actuation component 3140, which causes the slidable body 3304 to move upwards in a direction defined by the angled front surface 3404 of the mounting body 3302. In this way, the user is able to shorten the adjustable length block assembly 3100 by minute measurements, e.g., fractions of an inch. Further, the actuation component 3140 simultaneously secures the slidable body 3304 to restrict movement along a longitudinal length of the adjustable length block assembly 3100, which is not possible using conventional techniques that involve separate actions to reposition and secure components.

Accordingly, fourth stage 3908 depicts the adjustable length block assembly 3100 having a precise shortened length particular to the user's application. For instance, a first distance 3910 represents a length of the adjustable length block assembly 3100 before adjustment of the actuation component 3140 and a second distance 3912 represents a length of the adjustable length block assembly 3100 after adjustment of the actuation component 3140. The second distance 3912 is shorter than the first distance 3910, such as by a minute distance less than 0.25 inches.

Figure 40A:
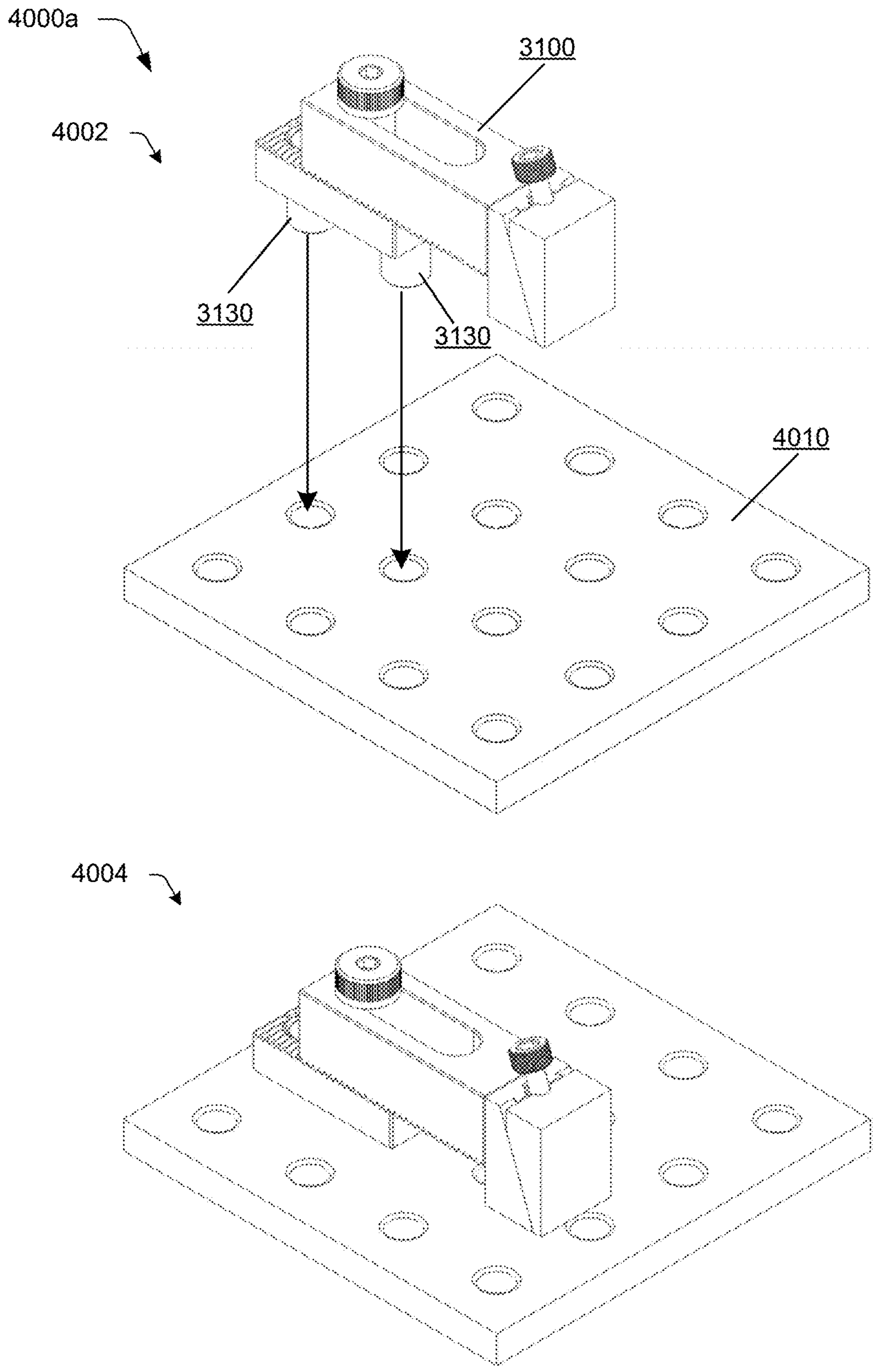
FIGS. 40*a* and 40*b* depict an example usage scenario to use an adjustable length block assembly in accordance with one or more implementations.
Figure 40B:
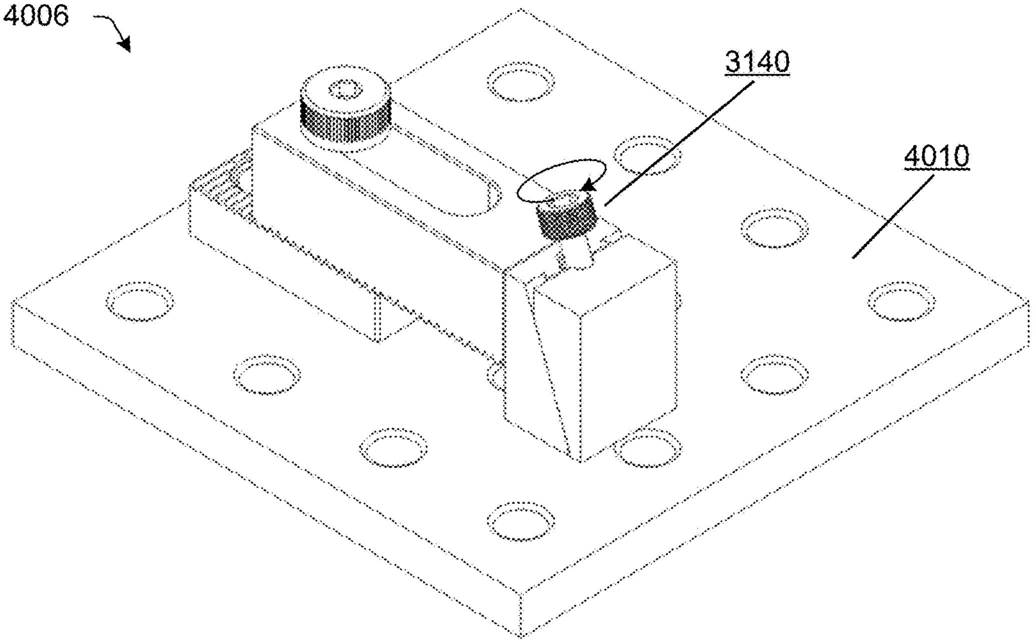
Figure 40B:
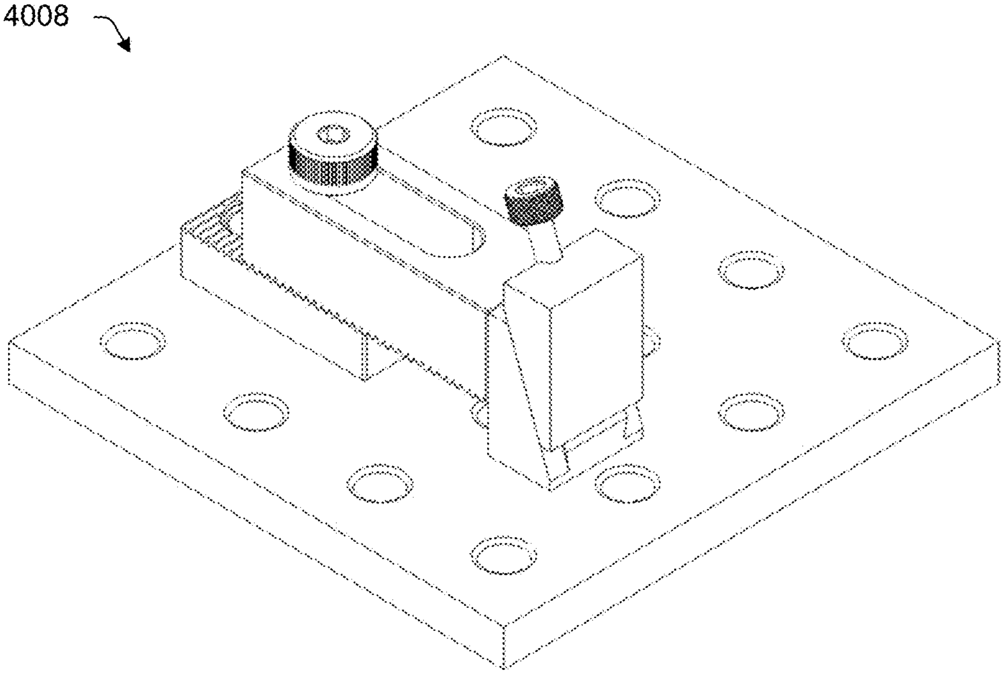

FIGS. 40*a* and 40*b* depict an example usage scenario 4000*a* and 4000*b* to use an adjustable length block assembly 3100 in accordance with one or more implementations in a first stage 4002, a second stage 4004, a third stage 4006, and a fourth stage 4008. As shown in first stage 4002, the bottom surface 3124 of the plate member 3104 includes two removable studs 3130 that are dimensioned to coincide with apertures of a surface 4010, e.g., adjacent apertures of a gridded worktable. For instance, the surface 4010 includes cylindrical mounting holes spaced two inches from one another. Accordingly, the centers of the removable studs 3130 are spaced two inches apart.

In this way, the adjustable length block assembly 3100 is attachable to the surface 4010 via the removable studs 3130 while preventing lateral or rotational movement as shown in second stage 4004. In the third stage 4006, the actuation component 3140 is rotated to adjust the position of the adjustable block component 3106. In accordance with the techniques described herein, the rotation to the actuation component 3140 causes the slidable body 3304 to move, which adjusts an overall length of the adjustable length block assembly 3100.

Figure 41:
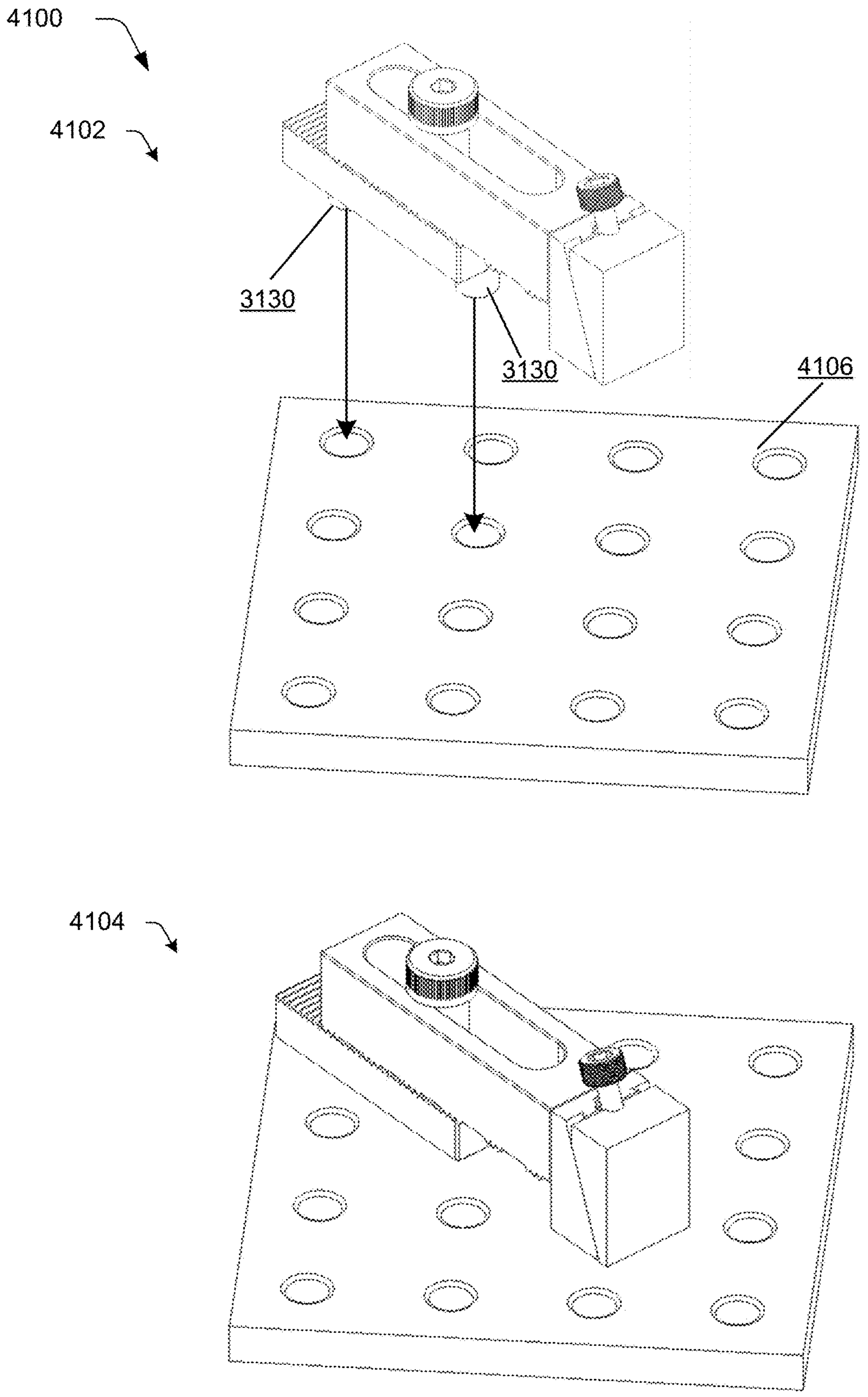
FIG. 41 depicts an example usage scenario to use an adjustable length block assembly in accordance with one or more implementations.

FIG. 41 depicts an example usage scenario 4100 to use an adjustable length block assembly 3100 in accordance with one or more implementations in a first stage 4102 and a second stage 4104. As shown in first stage 4102, the bottom surface 3124 of the plate member 3104 includes two removable studs 3130 that are dimensioned to coincide with apertures of a surface 4106, e.g., apertures of a gridded worktable that are diagonally adjacent. In this example, the gridded worktable includes cylindrical mounting holes spaced two inches from one another. Accordingly, the centers of the two removable studs 3130 are spaced 2.83 inches apart, e.g., the distance between the diagonal apertures of the gridded surface. In this way, the adjustable length block assembly 3100 provides secure attachment to the surface 4106 for a variety of implementations and work surfaces.

Interface Component

Figure 42:
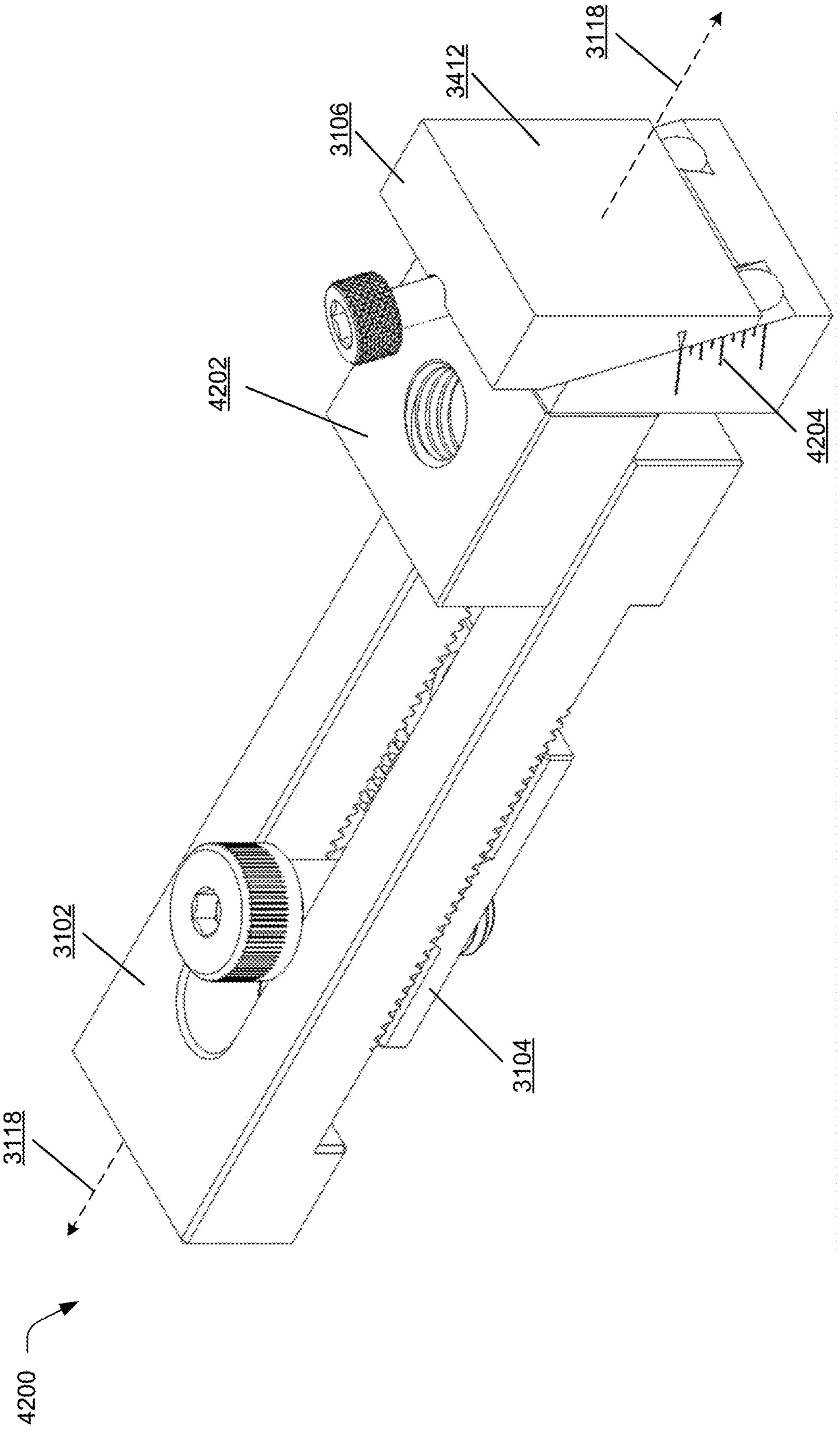
FIG. 42 depicts a scenario in which the adjustable length block assembly 3100 includes an interface component according to one or more implementations.

FIG. 42 depicts a scenario 4200 in which the adjustable length block assembly 3100 includes an interface component 4202 according to one or more implementations. The adjustable length block assembly 3100, for instance, represents an extension and/or variation of the various block assemblies described above and/or below. In the illustrated example, the adjustable length block assembly 3100 includes the block body 3102, the plate member 3104, the adjustable block component 3106, and the interface component 4202.

Generally, the interface component 4202 is configurable to attach to the adjustable block component 3106 at a face of the interface component 4202 and attach to one or more additional block bodies via one or more other faces of the interface component 4202 as further described below. Thus, the interface component 4202 is configured to support a variety of positions and/or orientations of the adjustable block component 3106 relative to various block bodies. In the illustrated scenario 4200, for instance, the adjustable block component 3106 is depicted as attached "in-line" with the block body 3102 via the interface component 4202. In additional or alternative examples, the adjustable block component 3106 is attached at an angled position relative to the block body 3102 via the interface component 4202, such as perpendicular to the block body 3102.

Further, in the illustrated example, the adjustable block component 3106 includes a scale region 4204. The scale region 4204 is a visual representation of a measurement scale (e.g., metric, imperial, etc.) such as described above with respect to FIG. 9. Generally, the scale region 4204 indicates a relative position of the front surface 3412 of the slidable body along the longitudinal axis 3118 of the block body 3102, such as "how much" the adjustable block component 3106 has been adjusted. In one or more examples, the scale region 4204 is scaled such that the scale marks correspond to movement of the front surface 3412 along the longitudinal axis 3118 of the block body 3102.

Figure 43A:
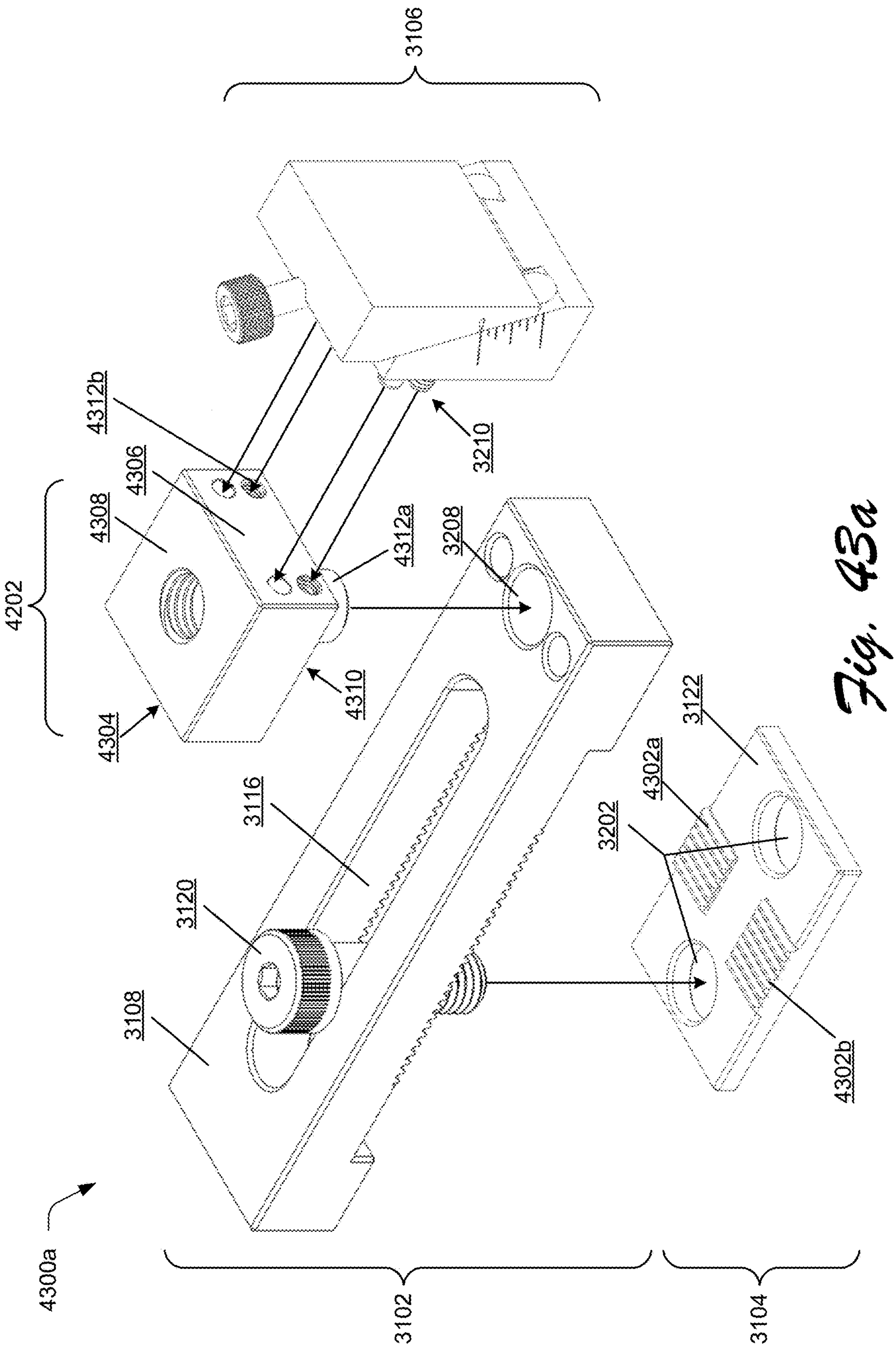
FIG. 43*a* depicts a view of the adjustable length block assembly with the block body, the plate member, the adjustable block component, and the interface component disengaged from one another in accordance with one or more implementations.

FIG. 43*a* depicts a view 4300*a* of the adjustable length block assembly 3100 with the block body 3102, the plate member 3104, the adjustable block component 3106, and the interface component 4202 disengaged from one another in accordance with one or more implementations. The view 4300*a* depicts two pin apertures 3202 located on the top surface 3122 of the plate member 3104. This is by way of example and not limitation, and the plate member 3104 can include various numbers and/or configurations of pin apertures 3202. One of the pin apertures 3202 is depicted as aligned with the pin 3120, which is situated in the pin slot 3116. In accordance with the techniques described above, the block body 3102 and the plate member 3104 can engage with one another to affix the block body 3102 to the plate member 3104 and prevent movement of the block body 3102 relative to the plate member 3104.

Notably, in this example the plate member 3104 includes a first plate tooth surface 4302*a* and a second plate tooth surface 4302*b*. The first plate tooth surface 4302*a* has a first configuration of teeth and the second plate tooth surface 4302*b* has a second configuration of teeth that is offset from the first configuration of teeth. As further described below in FIGS. 50-55, this supports reversibility of the plate member 3104 such as to achieve a variety of different arrangements of the adjustable length block assembly 3100.

The interface component 4202 includes a rear surface 4304, a front surface 4306, a top surface 4308, and a bottom surface 4310. In the illustrated example, the bottom surface 4310 of the interface component 4202 includes a mounting interface 4312*a* that corresponds to the first mounting interface 3208 of the block body 3102, which in this example is located on the top surface 3108 of the block body 3102. For instance, the mounting interface 4312*a* includes a cylindrical protrusion that is dimensioned to coincide with an aperture of the first mounting interface 3208 such that insertion of the cylindrical protrusion into the aperture secures the interface component 4202 to the block body 3102.

Further, the front surface 4306 includes a mounting interface 4312*b* that corresponds to the second mounting interface 3210 of the adjustable block component 3106. For instance, the mounting interface 4312*b* includes a configuration of one or more apertures. The apertures are dimensioned to coincide with protrusions of the second mounting interface 3210. As depicted, the mounting interface 4312*b* includes two non-tapped apertures that are dimensioned to coincide with non-threaded protrusions of the second mounting interface 3210 and two tapped apertures that are dimensioned to coincide with corresponding threaded protrusions of the second mounting interface 3210. Thus, insertion of the cylindrical protrusions of the second mounting interface 3210 into the apertures of the mounting interface 4312*b* secures the adjustable block component 3106 to the interface component 4202. This is by way of example and not limitation, and a variety of suitable mounting interface configurations and/or components are considered, such as those described above with respect to the first mounting interface 3208 and the second mounting interface 3210.

Figure 43B:
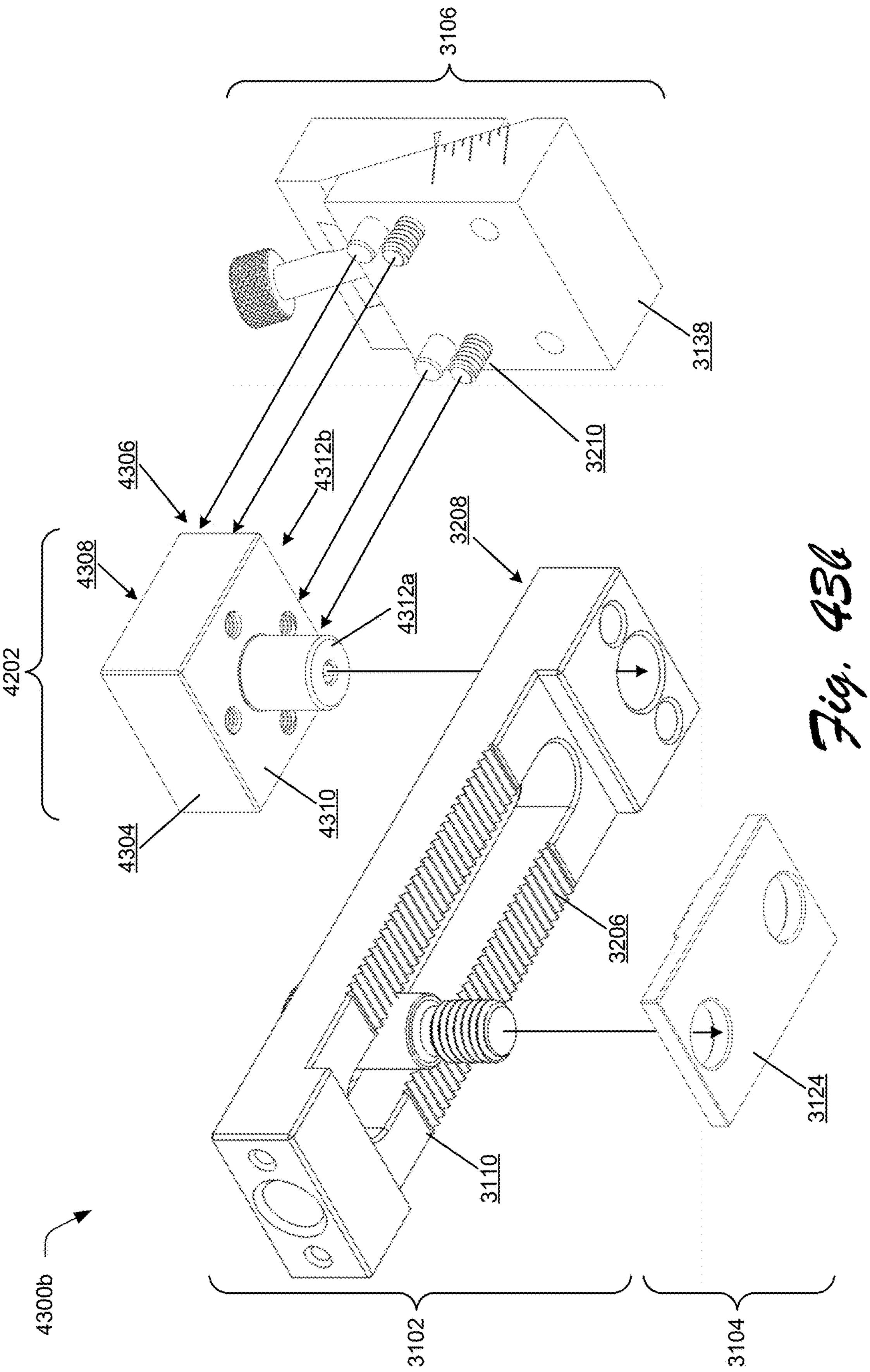
FIG. 43*b* depicts a view of the adjustable length block assembly with the adjustable block component, the interface component, the block body, and the plate member disengaged from one another in accordance with one or more implementations.

FIG. 43*b* depicts a view 4300*b* of the adjustable length block assembly 3100 with the adjustable block component 3106, the interface component 4202, the block body 3102, and the plate member 3104 disengaged from one another in accordance with one or more implementations. The view 4300*b*, for instance, depicts the bottom surface 3110 of the block body 3102 which includes the body tooth surface 3206, the bottom surface 3124 of the plate member 3104, the bottom surface 3138 of the adjustable block component 3106, and the bottom surface 4310 of the interface component 4202. Visible in this example is the mounting interface 4312*a*, which is depicted as including a cylindrical protrusion that is dimensioned to coincide with the first mounting interface 3208 of the block body 3102. Further visible is the second mounting interface 3210, which includes protrusions that are dimensioned to coincide with apertures of the mounting interface 4312*b* of the interface component 4202 as described above. A variety of configurations and/or attachment mechanisms for the mounting interface 4312*a*, the mounting interface 4312*b*, the first mounting interface 3208, and/or the second mounting interface 3210 are considered, such as one or more of a snap-fit connections, locking spring-pins, magnetic attachments, threaded inserts, clamps, pins, etc.

Figure 44A:
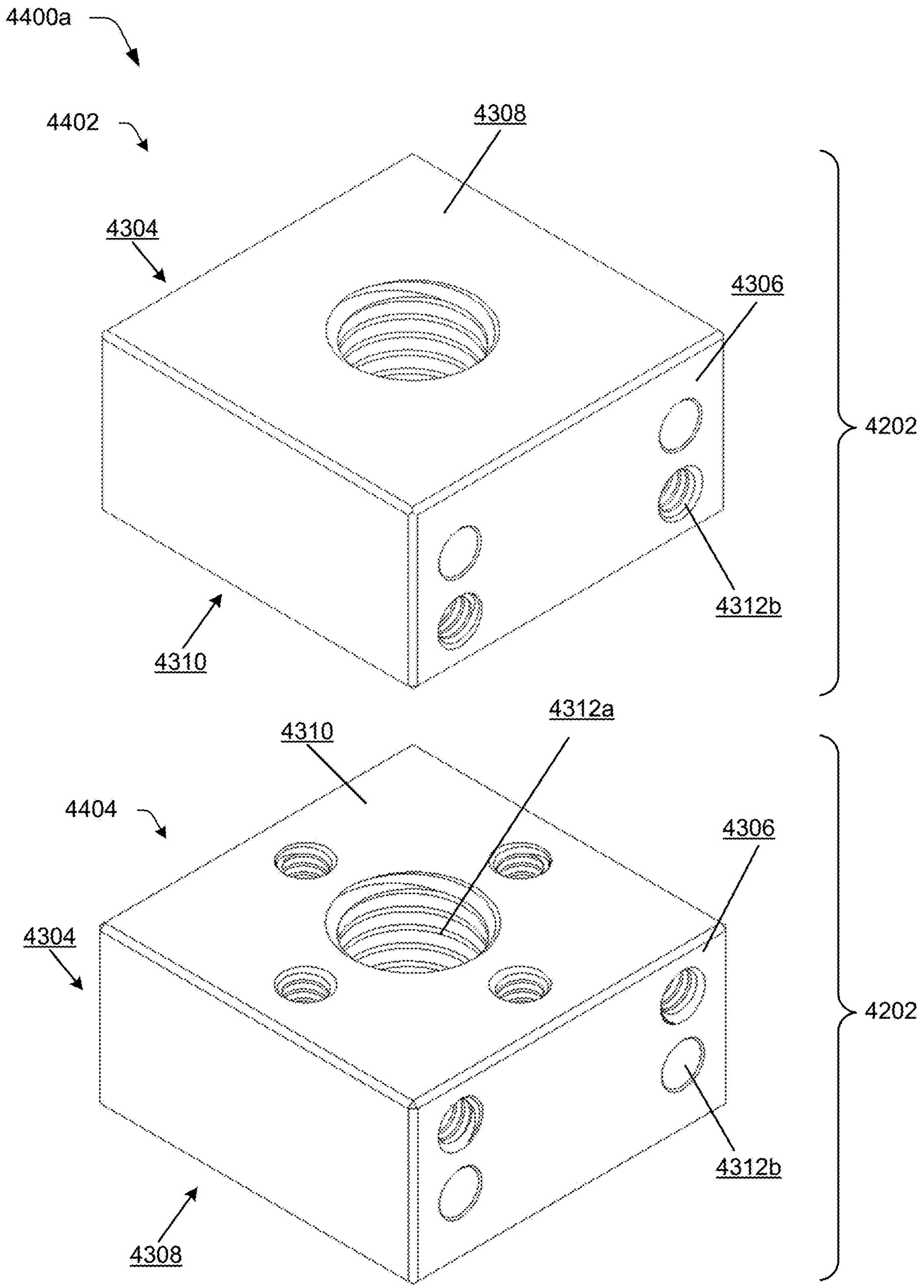
FIG. 44*a* depicts an example of the interface component in accordance with one or more implementations.

FIG. 44*a* depicts an example 4400*a* of the interface component 4202 in accordance with one or more implementations in a first view 4402 and a second view 4404. The first view 4402 is a top view of the interface component 4202 that depicts the top surface 4308 and the front surface 4306. As illustrated, the top surface 4308 includes an aperture that forms a portion of the mounting interface 4312*a*. The front surface 4306 includes a configuration of apertures that form the mounting interface 4312*b*. The mounting interface 4312*b* is generally configured to secure the interface component 4202 to the adjustable block component 3106.

The second view 4404 is a bottom view of the interface component 4202 that depicts the bottom surface 4310 as well as the front surface 4306. The second view 4404, for instance, depicts the interface component 4202 illustrated in the first view 4402 rotated 180 degrees about an axis defined by a midline of the interface component 4202. The bottom surface 4310 includes the mounting interface 4312*a*, which in this example includes a configuration of five apertures, such as a central tapped aperture and four smaller tapped apertures that encircle the central aperture. The mounting interface 4312*a* is generally configured to attach the interface component 4202 to one or more additional block bodies, such as shown in the following examples. Accordingly, the interface component 4202 may include a plurality of mounting interfaces 4312*a*, such as on one or more faces of the interface component 4202 to support variable attachment to different block bodies.

Figure 44B:
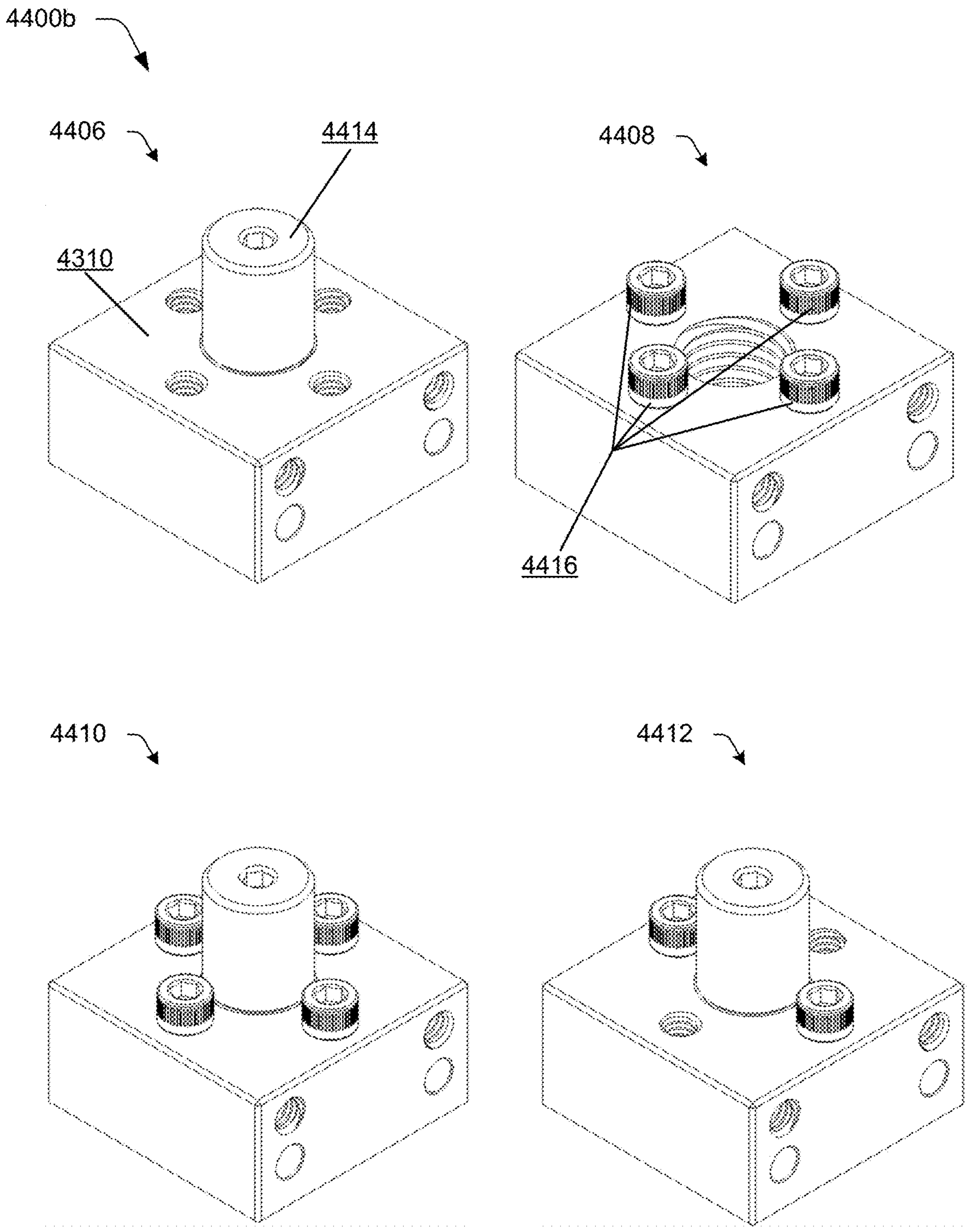
FIG. 44*b* depicts an example of various configurations of the mounting interface of the interface component in accordance with one or more implementations.

FIG. 44*b* depicts an example 4400*b* of various configurations of the mounting interface 4312*a* of the interface component 4202 in accordance with one or more implementations in a first example 4406, a second example 4408, a third example 4410, and a fourth example 4412. The examples 4406, 4408, 4410, and 4412, depict the bottom surface 4310 of the interface component 4202. In the first example 4406, the mounting interface 4312*a* includes a cylindrical protrusion 4414. The cylindrical protrusion 4414 is dimensioned to coincide with one or more apertures of various block bodies. The cylindrical protrusion 4414 is further configured to enable rotation of the interface component 4202 about a vertical axis defined by the cylindrical protrusion 4414. In this way, the interface component 4202 can be positioned at various orientations relative to a block body.

In the second example, the mounting interface 4312*a* includes four pins 4416. The pins 4416 are configurable to attach the interface component 4202 to various block bodies in various configurations. The pins 4416 can be used to fasten the interface component 4202 to the various block bodies while preventing rotation of the interface component 4202. In some examples, the mounting interface 4312*a* includes the cylindrical protrusion 4414 as well as one or more pins 4416. For instance, in the third example 4410 the mounting interface 4312*a* includes four pins 4416 as well as the cylindrical protrusion 4414. In the fourth example 4412, the mounting interface 4312*a* is configured with two pins 4416 as well as the cylindrical protrusion 4414.

Figure 45:
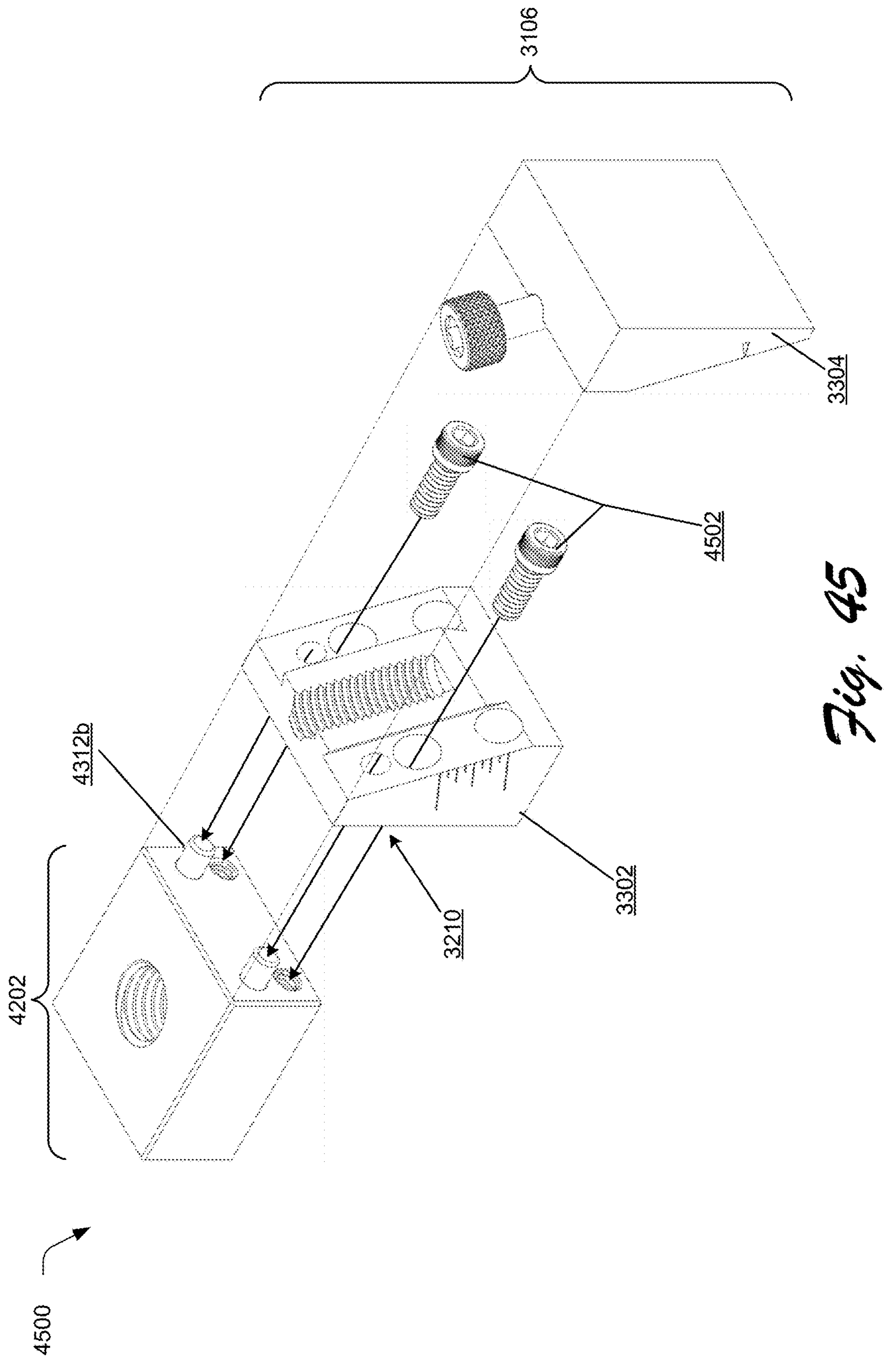
FIG. 45 depicts a scenario illustrating attachment of the adjustable block component to the interface component in accordance with one or more implementations.

FIG. 45 depicts a scenario 4500 illustrating attachment of the adjustable block component 3106 to the interface component 4202 in accordance with one or more implementations. In this example, the adjustable block component 3106 is depicted with the mounting body 3302 and the slidable body 3304 disengaged from one another. The dashed lines indicate an example alignment of the mounting body 3302, the slidable body 3304, and the interface component 4202.

In the scenario 4500, the mounting interface 4312*b* includes two threaded apertures as well as two cylindrical protrusions. As depicted by the solid arrows, the cylindrical protrusions and the apertures of the mounting interface 4312*b* are configured to coincide with corresponding apertures of the second mounting interface 3210 of the adjustable block component 3106. Further, screws 4502 enable attachment of the mounting body 3302 to the interface component 4202 such as via threaded attachment. In this way, the adjustable block component 3106 is attachable to the interface component 4202.

Figure 46:
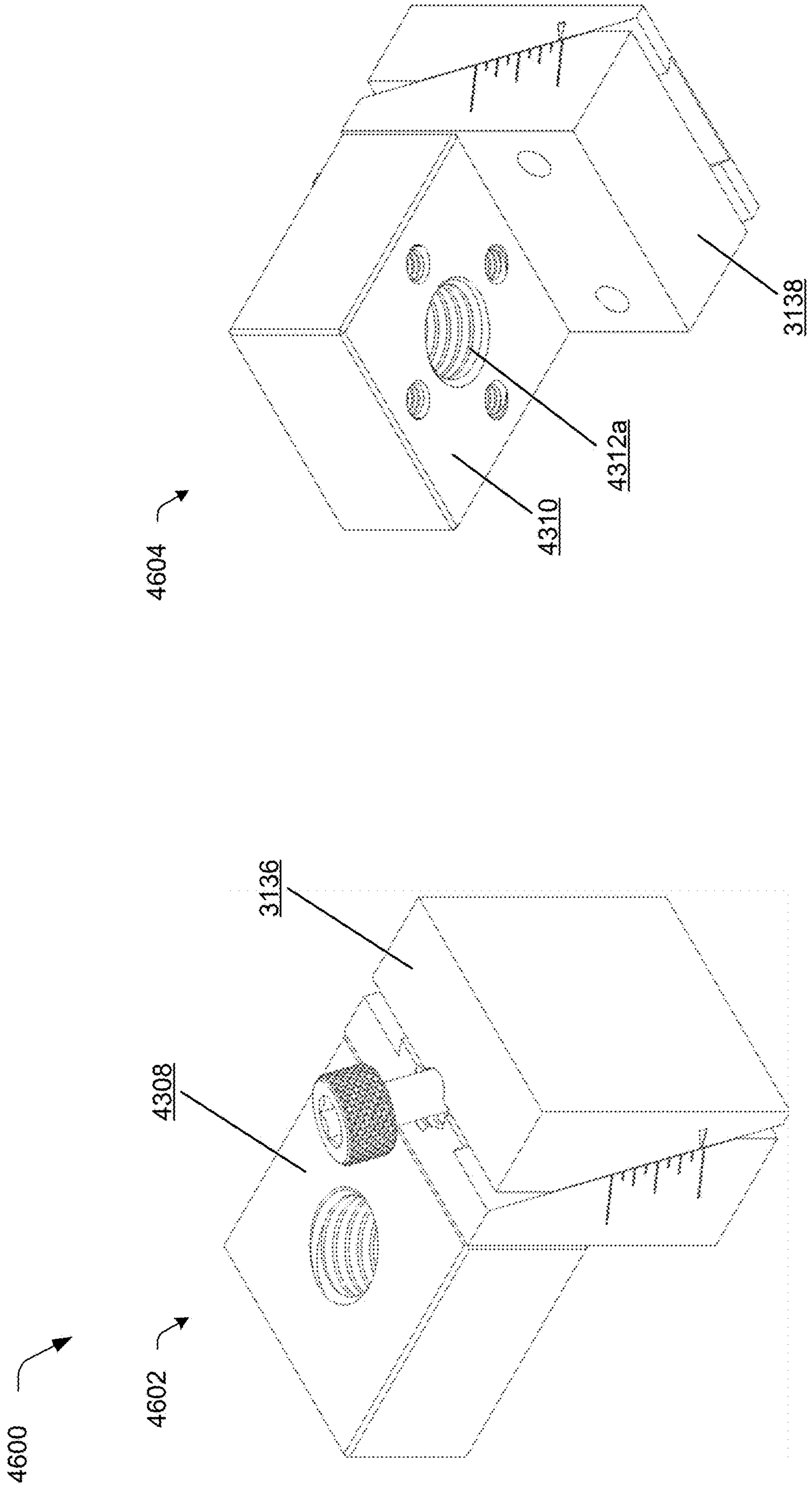
FIG. 46 depicts a scenario depicting the interface component attached to the adjustable block component in accordance with one or more implementations.

FIG. 46 depicts a scenario 4600 depicting the interface component 4202 attached to the adjustable block component 3106 in accordance with one or more implementations in a first view 4602 and a second view 4604. The scenario 4600, for instance, represents a result of the attachment of the interface component 4202 to the adjustable block component 3106 as depicted in FIG. 45. The first view 4602 depicts the top surface 4308 of the interface component 4202 and the top surface 3136 of the adjustable block component 3106. In this example, the mounting interface 4312*b* and the second mounting interface 3210 are dimensioned such that the top surface 4308 is substantially parallel to the top surface 3136. The second view 4604 depicts the bottom surface 4310 of the interface component 4202 as well as the bottom surface 3138 of the adjustable block component 3106. In this example, the bottom surface 4310 and the bottom surface 3138 are offset from one another. Further depicted in the second view 4604 is the mounting interface 4312*a*, which includes a configuration of apertures to enable the interface component 4202 to connect to additional block bodies.

Figure 47:
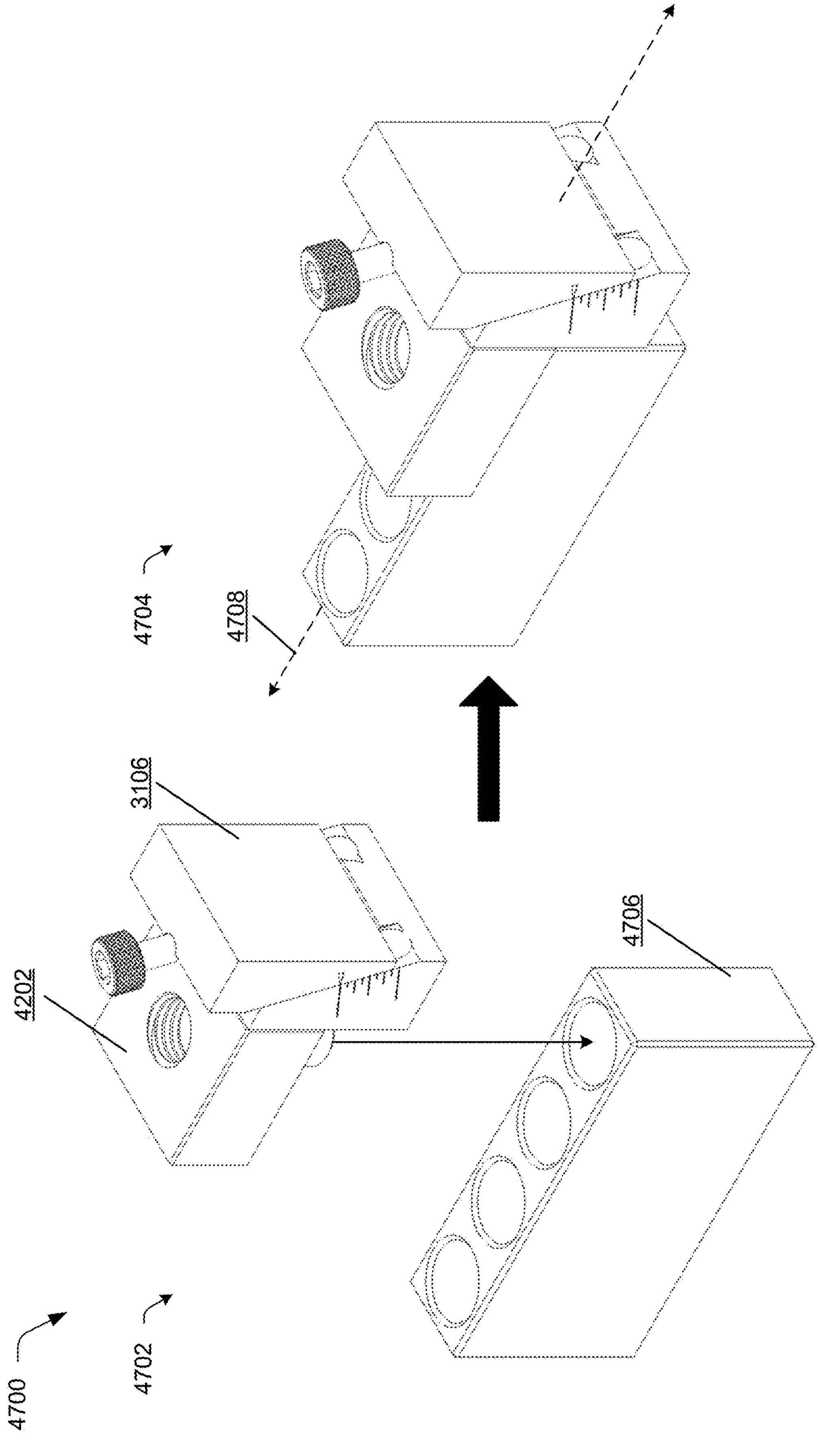
FIG. 47 depicts a scenario illustrating attachment of the interface component and the adjustable block component to a block body in accordance with one or more implementations.

FIG. 47 depicts a scenario 4700 illustrating attachment of the interface component 4202 and the adjustable block component 3106 to a block body in accordance with one or more implementations in a first stage 4702 and a second stage 4704. As depicted in first stage 4702, the mounting interface 4312*a* includes a cylindrical protrusion that is aligned with an aperture of a block 4706. The block 4706, for instance, is a fence block that is configured to be secured to an adjacent surface such as a gridded worktable.

As depicted in the second stage 4704, the interface component 4202 is attached to the block 4706 via the mounting interface 4312*a*. In this example, the interface component 4202 and the 3106 are attached to the block 4706 "in-line" with the block 4706, such as along a longitudinal axis 4708 of the block 4706. Further in this example, the mounting interface 4312*a* enables rotation of the interface component 4202 about an axis defined by the cylindrical protrusion such as described above with respect to FIG. 44*b*. Although not illustrated, in some examples the interface component 4202 includes one or more removable shims such as to prevent rotation between the interface component 4202 and various block bodies.

Figure 48:
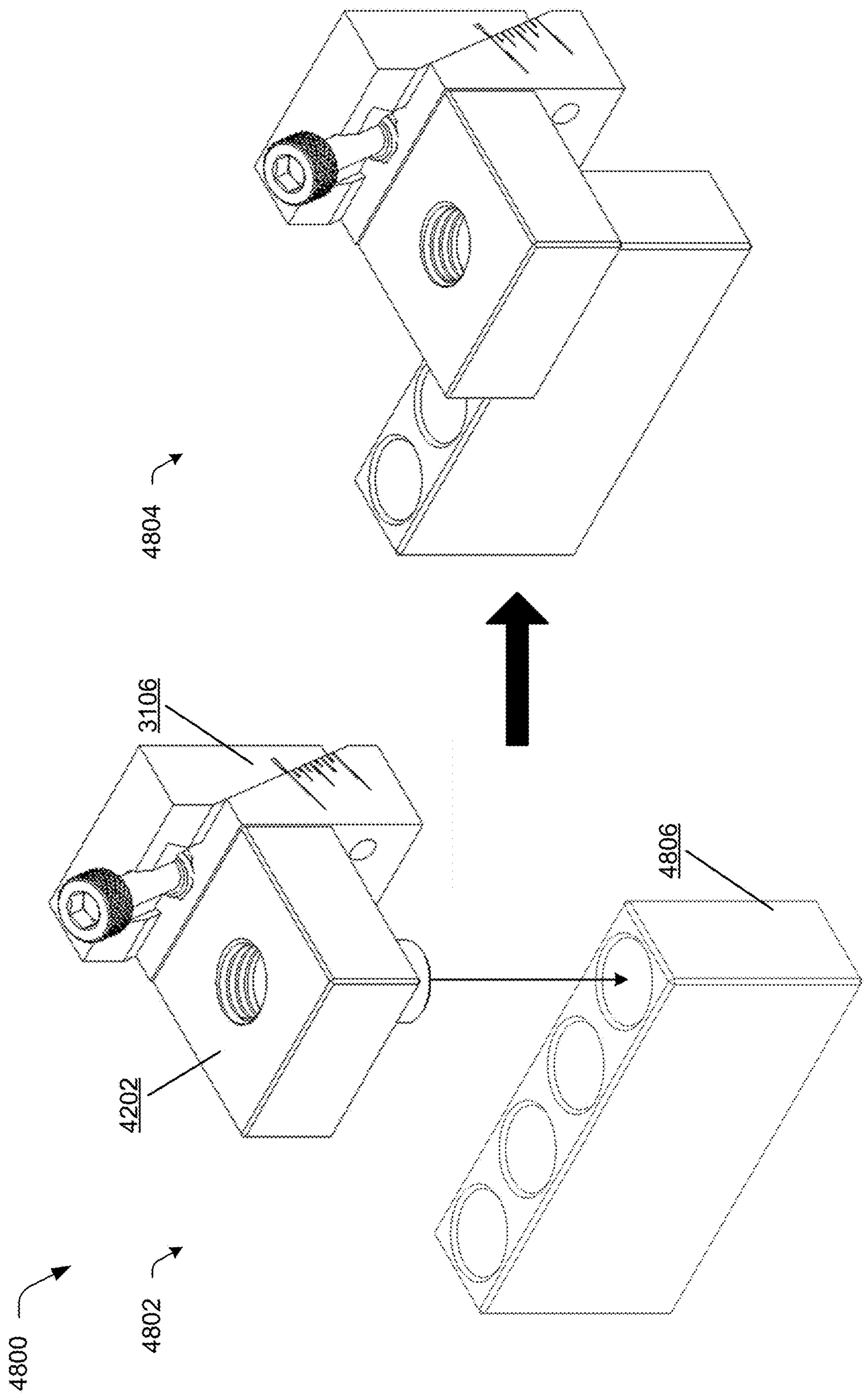
FIG. 48 depicts a scenario illustrating attachment of the interface component and the adjustable block component to a block body in accordance with one or more implementations.

FIG. 48 depicts a scenario 4800 illustrating attachment of the interface component 4202 and the adjustable block component 3106 to a block body in accordance with one or more implementations in a first stage 4802 and a second stage 4804. As depicted in first stage 4802, the mounting interface 4312*a* includes a cylindrical protrusion that is aligned with an aperture of a block 4806. As depicted in the second stage 4704, the interface component 4202 is attached to the block 4806 via the mounting interface 4312*a*. In this example, the interface component 4202 and the 3106 are attached perpendicular to the block 4806. Thus, the adjustable block component 3106 is positionable such as to contact a workpiece perpendicular to the block 4806.

Figure 49:
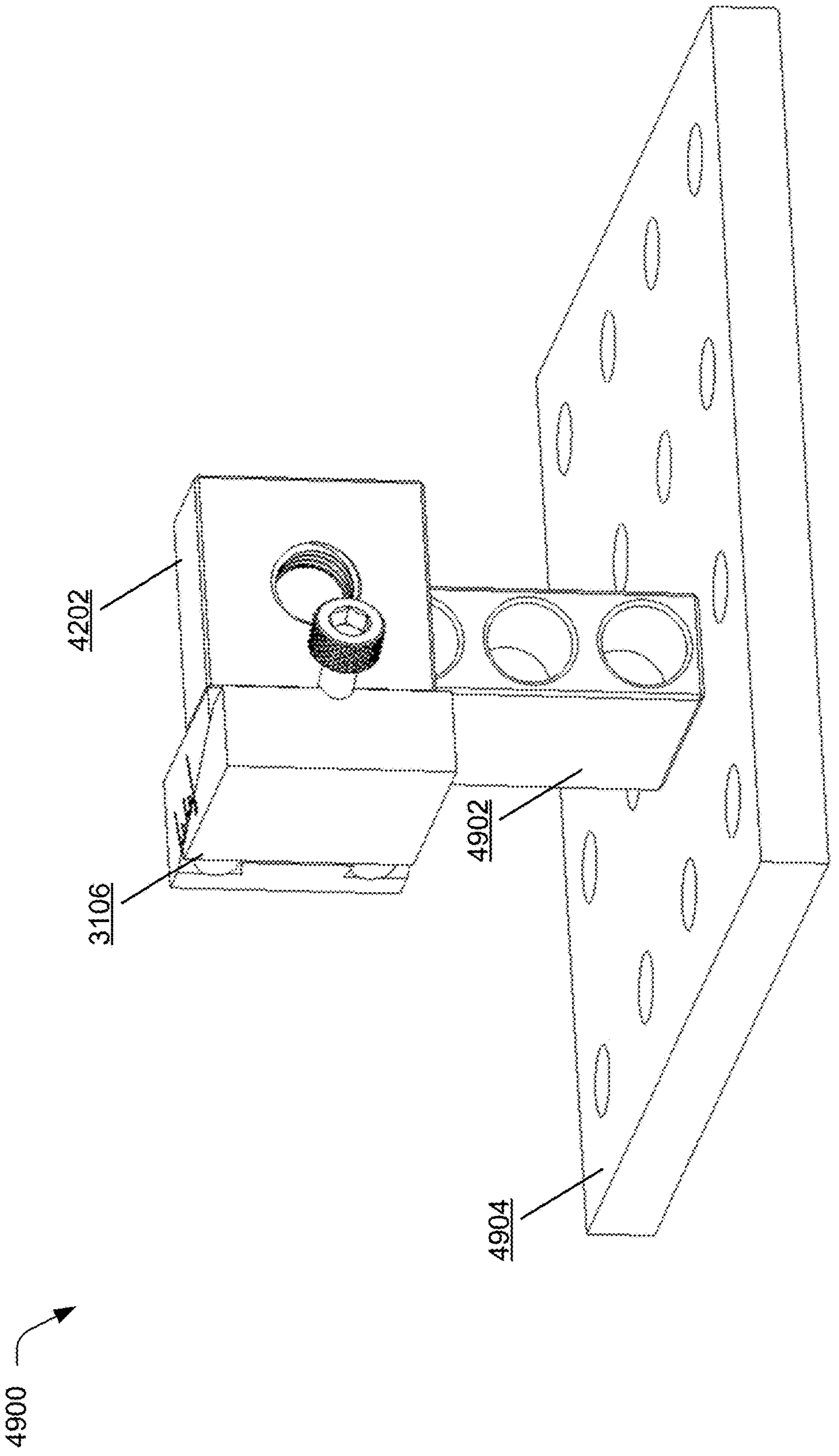
FIG. 49 depicts a scenario illustrating attachment of the interface component and the adjustable block component to a block in accordance with one or more implementations.

FIG. 49 depicts a scenario 4900 illustrating attachment of the interface component 4202 and the adjustable block component 3106 to a block 4902 in accordance with one or more implementations. In this example, the block 4902 is attached to a gridded worktable 4904 in a vertical configuration, e.g., with several apertures parallel to the gridded worktable 4904. The interface component 4202 is attached to the block 4902 via the mounting interface 4312*a* in a perpendicular orientation. Thus, in this example the adjustable block component 3106 is positionable to contact a workpiece in a plane that is perpendicular to the gridded worktable 4904. Accordingly, the inclusion of the interface component 4202 supports various configurations and/or arrangements of the adjustable block component 3106.

Modular Tooth Fittings and Reversible Plate Member

Figure 50:
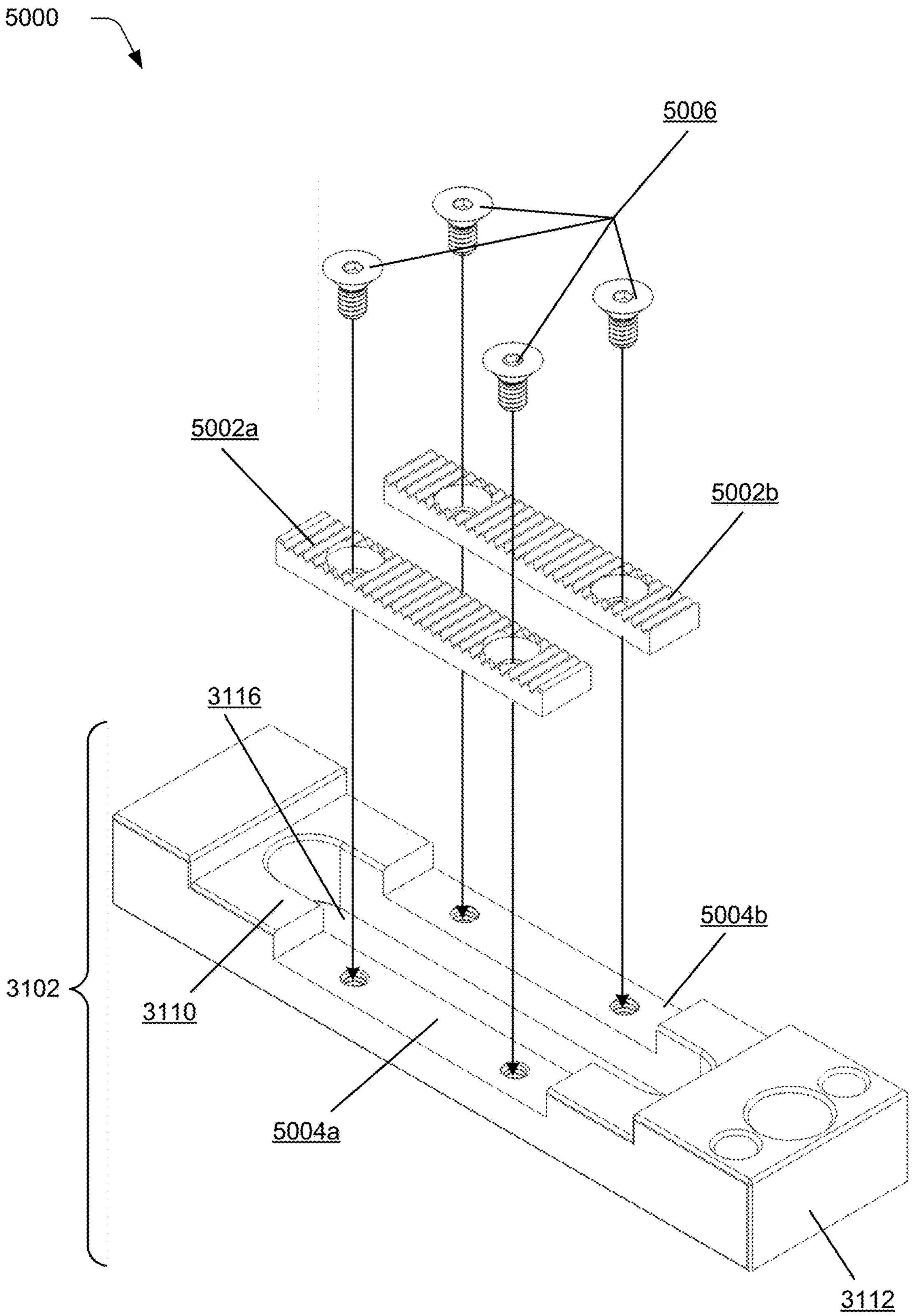
FIG. 50 depicts an example implementation of a block body that includes modular tooth fittings in accordance with one or more implementations.

FIG. 50 depicts an example implementation 5000 of a block body 3102 that includes modular tooth fittings 5002*a*, 5002*b* in accordance with one or more implementations. FIG. 50, for instance, depicts the bottom surface 3110 of the block body 3102. Similar to the example described above with respect to FIG. 12, in this example, the block body 3102 includes a first recessed region that forms a fitting cavity 5004*a* and a second recessed region that forms a second fitting cavity 5004*b*. The fitting cavities 5004*a*, 5004*b* extend along a longitudinal axis of the bottom surface 3110 of the block body 3102 and are parallel to the pin slot 3116. The fitting cavities 5004*a*, 5004*b* are dimensioned to enable the modular tooth fittings 5002*a*, 5002*b* to be inserted and/or attached to the fitting cavities 5004*a*, 5004*b*.

The modular tooth fittings 5002*a*, 5002*b* can be fastened into the fitting cavities 5004*a*, 5004*b* utilizing any suitable attachment technique, such as using fasteners, adhesive, magnetic components, press fitting, and so forth. In the illustrated example, the modular tooth fittings 5002*a*, 5002*b* include apertures through which fasteners 5006 are placed to attach the modular tooth fittings 5002*a*, 5002*b* within the fitting cavities 5004*a*, 5004*b*. Further, the block body 3102 includes apertures within the fitting cavities 5004*a*, 5004*b* into which the fasteners 5006 can be placed to attach the modular tooth fittings 5002*a*, 5002*b* into the fitting cavities 5004*a*, 5004*b*. The apertures 1212, for instance, are tapped and are configured to receive the fasteners 5006. Thus, the modular tooth fittings 5002*a*, 5002*b* can be efficiently removed and replaced with tooth fittings of varying sizes, tooth patterns, tooth spacings, tooth configurations, etc.

In this example, the modular tooth fitting 5002*a* includes a first configuration of teeth and the modular tooth fitting 5002*b* includes a second configuration of teeth that is different from the first configuration of teeth. For instance, the first configuration of teeth and the second configuration of teeth include teeth and valleys between the teeth. In this example, the first configuration of teeth and the second configuration of teeth have a uniform spacing, e.g., ⅛ of an inch between adjacent teeth and ⅛ of an inch between adjacent valleys. However, the first configuration of teeth includes an offset, e.g., 1/16 of an inch, relative to the second configuration of teeth as depicted in FIG. 51.

Figure 51:
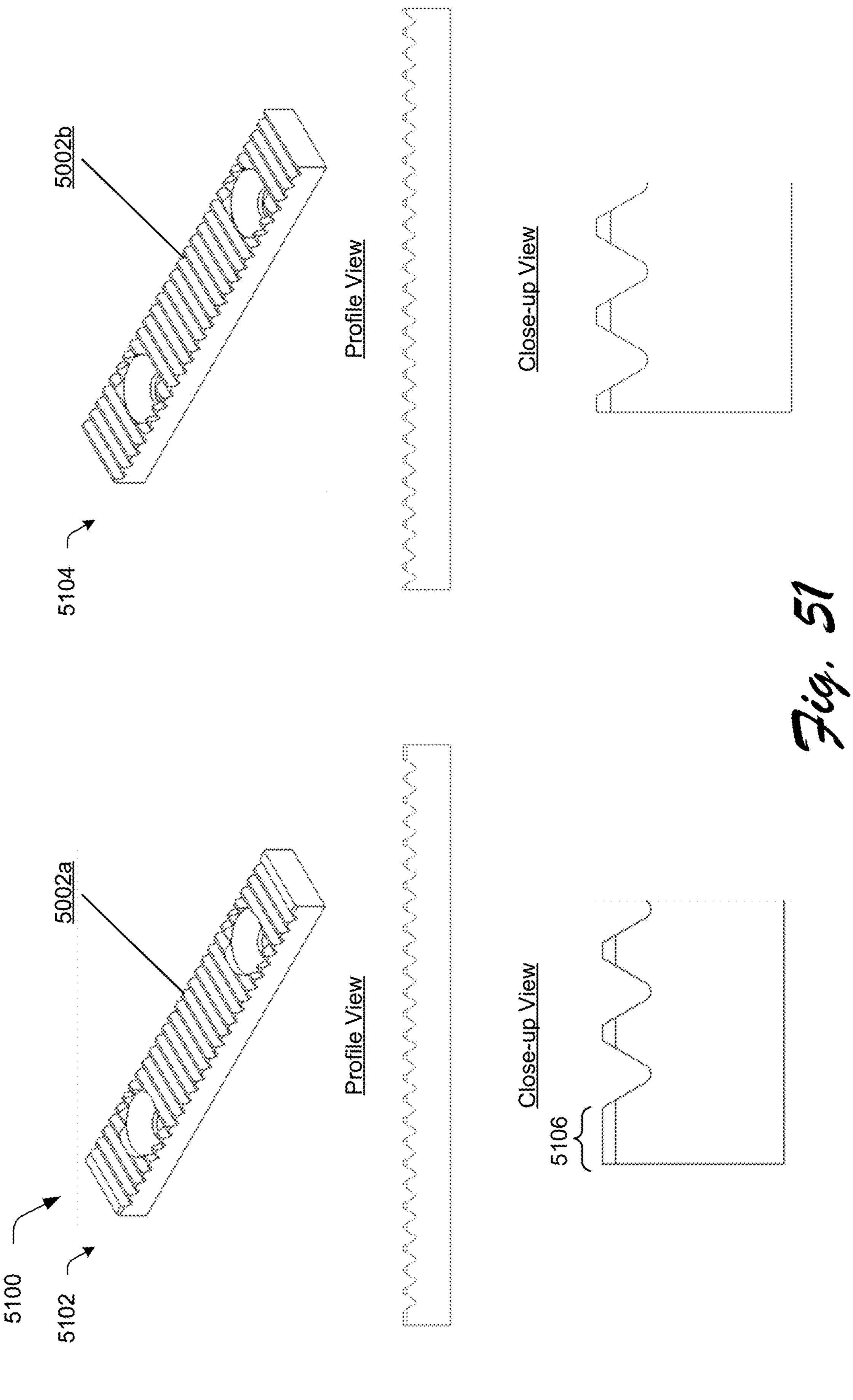
FIG. 51 depicts an example of the modular tooth fittings introduced above in more detail in accordance with one or more implementations.

FIG. 51 depicts an example 5100 of the modular tooth fittings 5002*a*, 5002*b* introduced above in more detail in accordance with one or more implementations in a first example 5102 and a second example 5104. The first example 5102 depicts the modular tooth fitting 5002*a* and the second example 5104 depicts the modular tooth fitting 5002*b*. As depicted in the profile view in the first example 5102 and the second example 5104, the modular tooth fittings 5002*a*, 5002*b* include a substantially similar spacing. That is, the distance between adjacent teeth as well as adjacent valleys for both the modular tooth fitting 5002*a* and the modular tooth fitting 5002*b* are substantially similar, e.g., ⅛ of an inch. This is by way of example and not limitation, and a variety of tooth spacings and/or patterns are considered.

As depicted in the close-up view in the first example 5102 and the second example 5104, the modular tooth fitting 5002*a* includes an offset 5106 relative to the modular tooth fitting 5002*b*. That is, a first valley for the modular tooth fitting 5002*a* is located a distance defined by the offset 5106 from an end of the modular tooth fitting 5002*a*. In this example, the offset 5106 is 1/16 of an inch however a variety of offset distances can be used. In this way, the modular tooth fittings 5002*a*, 5002*b* enable the block body 3102 to be compatible with a reversible plate member 3104, as described in the following examples.

Figure 52:
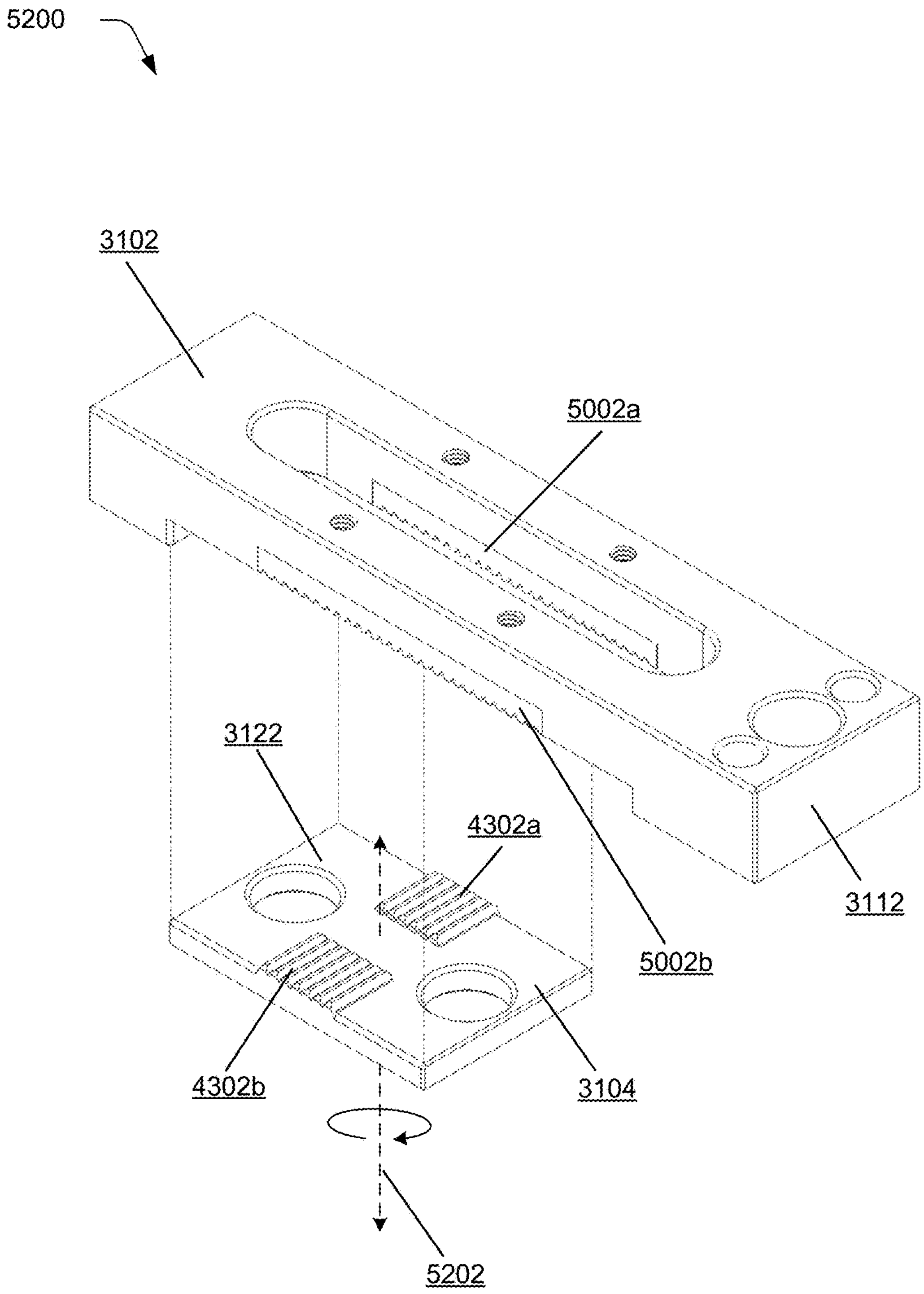
FIG. 52 depicts a scenario in which the block body is attachable to a plate member that is reversible in accordance with one or more implementations.

FIG. 52 depicts a scenario 5200 in which the block body 3102 is attachable to a plate member 3104 that is reversible in accordance with one or more implementations. The block body 3102 and the plate member 3104 are depicted as disengaged from one another, and the dashed lines indicate an example alignment of the block body 3102 and the plate member 3104. In this example, the block body 3102 includes the modular tooth fittings 5002*a*, 5002*b* as described above. The top surface 3122 of the plate member 3104 includes a first plate tooth surface 4302*a* and a second plate tooth surface 4302*b*.

The first plate tooth surface 4302*a* has a first configuration of teeth and the second plate tooth surface 4302*b* has a second configuration of teeth that is offset from the first configuration of teeth. For instance, the first configuration of teeth and the second configuration of teeth have a substantially similar spacing (e.g., ⅛ of an inch), however are offset by a distance, e.g., 1/16 of an inch. Accordingly, the plate member 3104 is configured to engage with the modular tooth fittings 5002*a*, 5002*b*. For instance, the first plate tooth surface 4302*a* can engage with the modular tooth fitting 5002*a*, while the second plate tooth surface 4302*b* is engaged with the modular tooth fitting 5002*b*.

The plate member 3104 can also be reversed, such as rotated 180 degrees about a vertical axis 5202 that is perpendicular to the top surface 3122 of the plate member 3104. Upon rotation, the first plate tooth surface 4302*a* can engage with the modular tooth fitting 5002*b*, while the second plate tooth surface 4302*b* is engaged with the modular tooth fitting 5002*a*. As described in the following examples, rotation of the plate member 3104 enables precise position of the adjustable length block assembly 3100 such as to secure a workpiece for a variety of applications.

Figure 53:
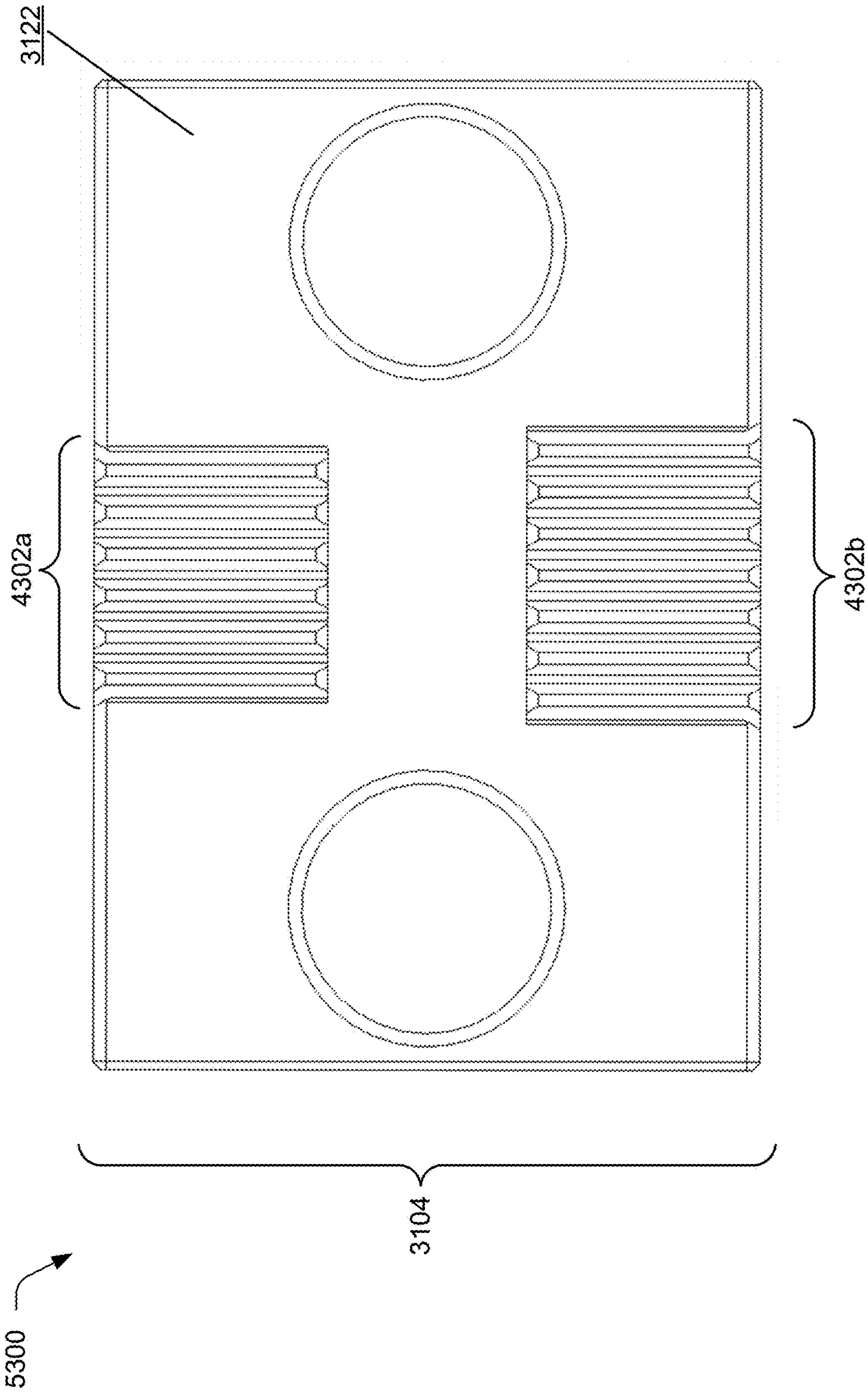
FIG. 53 depicts an example in which the plate member is reversible as introduced above in more detail in accordance with one or more implementations.

FIG. 53 depicts an example 5300 in which the plate member 3104 is reversible as introduced above in more detail in accordance with one or more implementations. As depicted, the plate member 3104 includes the first plate tooth surface 4302*a* and the second plate tooth surface 4302*b*. The first plate tooth surface 4302*a* and the second plate tooth surface 4302*b* are parallel to one another and located on opposite sides of the top surface 3122. In this example, the first plate tooth surface 4302*a* includes a first configuration of teeth while the second plate tooth surface 4302*b* includes a second configuration of teeth. The first configuration of teeth and the second configuration of teeth have a uniform spacing, e.g., ⅛ of an inch between adjacent teeth and ⅛ of an inch between adjacent valleys. However, the first configuration of teeth includes an offset, e.g., 1/16 of an inch, relative to the second configuration of teeth. Accordingly, the first plate tooth surface 4302*a* and the second plate tooth surface 4302*b* are dimensioned to align with the modular tooth fitting 5002*a* and the modular tooth fitting 5002*b*.

Figure 54:
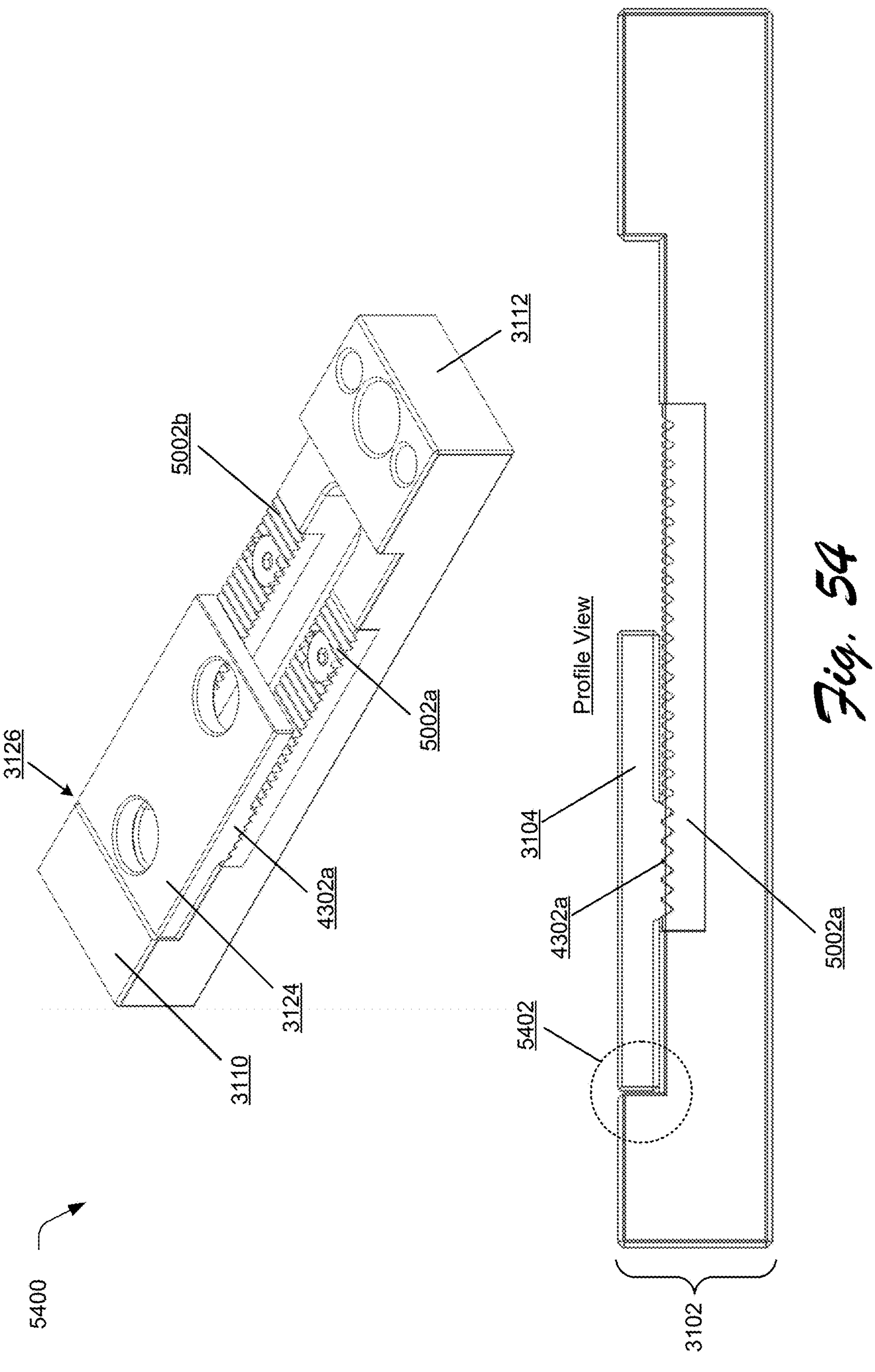
FIG. 54 depicts a scenario of the reversible plate member in a first orientation engaged with the block body in accordance with one or more implementations.

FIG. 54 depicts a scenario 5400 of the reversible plate member 3104 in a first orientation engaged with the block body 3102 in accordance with one or more implementations. In this example, the first plate tooth surface 4302*a* of the plate member 3104 is engaged with the modular tooth fitting 5002*a*. The second plate tooth surface 4302*b* is engaged with the modular tooth fitting 5002*b*. As illustrated, the rear surface 3126 of the plate member 3104 is flush with an adjacent surface of the block body 3102. For instance, as shown at a location 5402 denoted by a dashed circle there is no gap between the block body 3102 and the plate member 3104.

Figure 55:
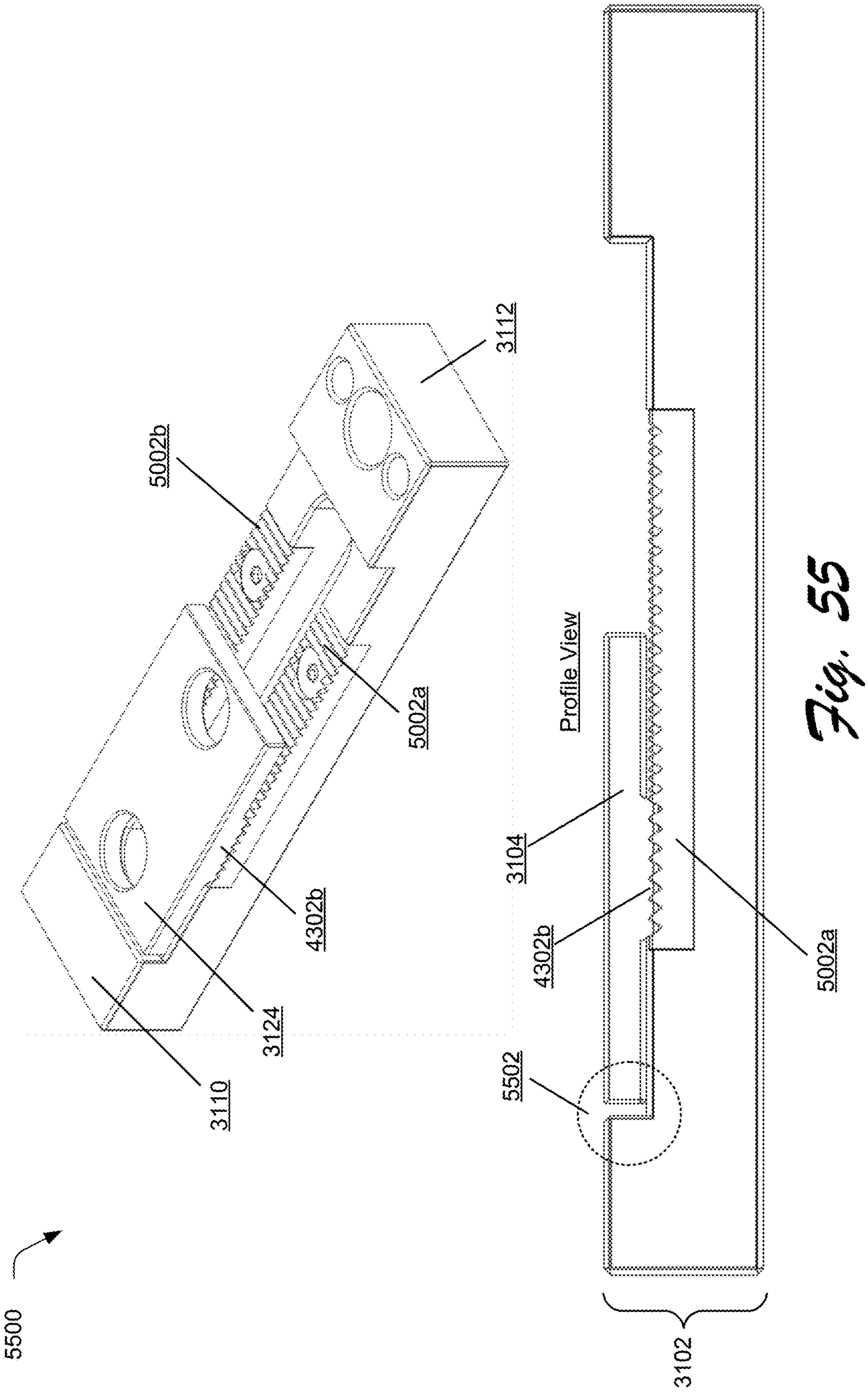
FIG. 55 depicts a scenario of the reversible plate member in a second orientation engaged with the block body in accordance with one or more implementations.

FIG. 55 depicts a scenario 5500 of the reversible plate member 3104 in a second orientation engaged with the block body 3102 in accordance with one or more implementations. In this example, the plate member 3104 has been rotated 180 degrees about an axis perpendicular to the bottom surface 3124 of the plate member 3104. Thus, the first plate tooth surface 4302*a* of the plate member 3104 is engaged with the modular tooth fitting 5002*b* while the second plate tooth surface 4302*b* is engaged with the modular tooth fitting 5002*a*.

As illustrated, the plate member 3104 is offset from an adjacent surface of the block body 3102. For instance, as shown at a location 5502 denoted by a dashed circle there is a gap between the block body 3102 and the plate member 3104. In this way, use of the reversible block body 3102 enables the plate member 3104 to be positioned at offset increments relative to the block body. That is, even though the tooth spacing for the modular tooth fittings 5002*a*, 5002*b*, the first plate tooth surface 4302*a* and the second plate tooth surface 4302*b* is ⅛ of an inch, adjustments can be made by increments of 1/16 of an inch by rotating the plate member 3104 one hundred and eighty degrees. This is by way of example and not limitation, and a variety of tooth spacing patterns are contemplated. Accordingly, rotation of the plate member 3104 enables precise position of the adjustable length block assembly 3100 to secure a workpiece for a variety of applications.

Generally, the various structures discussed herein such as block bodies and toothed surfaces and features are combinable in various ways including implementations not expressly illustrated herein to provide for a variety of different adjustable length block assemblies.

CONCLUSION

Accordingly, adjustable length block assemblies and techniques are described. The block assemblies are usable to ensure precise and durable alignment of various workpieces while providing access for performing attachment and/or other work techniques thereon, which is not possible using conventional tools and techniques.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention. Additional aspects of the techniques, features, and/or methods discussed herein relate to one or more of the following:

In some aspects, the techniques described herein relate to an adjustable length block assembly including: a block body including a top surface, a bottom surface, and a front surface that includes a first mounting interface, the bottom surface including a body tooth surface with an arrangement of teeth that extend downwardly relative to the bottom surface; a plate member including a top surface and a bottom surface, the top surface of the plate member including a plate tooth surface with an arrangement of teeth that extend upwardly relative to the top surface such that the plate tooth surface at least partially engages with the body tooth surface and the plate member is positionable at multiple different positions along a longitudinal length of the block body; and an adjustable block component to adjust a length of the adjustable length block assembly, the adjustable block component including: a mounting body with a rear surface and an angled front surface, the rear surface including a second mounting interface attachable to the first mounting interface of the block body, the angled front surface including a first slidable mounting interface; and a slidable body with an angled rear surface and a front surface, the angled rear surface including a second slidable mounting interface to adjustably connect the slidable body to the mounting body with the angled rear surface at least partially engaged with the angled front surface, the front surface configured to remain substantially perpendicular to a plane defined by the top surface of the block body.

In some aspects, the techniques described herein relate to an adjustable length block assembly, wherein the block body includes a pin slot formed at least partially along the top surface and extending through an interior of the block body to the bottom surface and the plate member includes one or more apertures that align with the pin slot of the block body with the plate tooth surface at least partially engaged with the body tooth surface.

In some aspects, the techniques described herein relate to an adjustable length block assembly, wherein the bottom surface of the plate member includes one or more apertures to house one or more removable studs located an offset distance from a rear surface of the plate member.

In some aspects, the techniques described herein relate to an adjustable length block assembly, wherein the first mounting interface includes an aperture and a tapped aperture, and the second mounting interface includes a cylindrical protrusion insertable into the aperture and a threaded cylindrical protrusion dimensioned to be insertable into the tapped aperture.

In some aspects, the techniques described herein relate to an adjustable length block assembly, wherein the adjustable block component includes an actuation component at least partially engaged with the mounting body and at least partially engaged with the slidable body to control a position of the front surface of the slidable body along a longitudinal length of the adjustable block component.

In some aspects, the techniques described herein relate to an adjustable length block assembly, wherein the actuation component includes a proximal end and a distal end, the distal end including a threaded component, the angled rear surface of the slidable body including a recessed cavity to house at least a portion of the threaded component, and the angled front surface of the mounting body including a tapped semicylindrical aperture along an axis defined by the angled front surface to engage with the threaded component.

In some aspects, the techniques described herein relate to an adjustable length block assembly, wherein one of the first slidable mounting interface or the second slidable mounting interface includes a configuration of grooves and an other of the first slidable mounting interface or the second slidable mounting interface includes one or more protrusions to conform to the configuration of grooves to support movement of the slidable body along an axis defined by the angled front surface.

In some aspects, the techniques described herein relate to an adjustable length block assembly, wherein the plate member includes a first plate tooth surface and a second plate tooth surface that are substantially parallel to one another, the first plate tooth surface having a first configuration of teeth that is offset from a second configuration of teeth of the second plate tooth surface.

In some aspects, the techniques described herein relate to an adjustable length block assembly, wherein the bottom surface of the block body includes a first recessed region and a second recessed region to house a first modular tooth fitting and a second modular tooth fitting, the first modular tooth fitting and the second modular tooth fitting configured to engage with the first plate tooth surface and the second plate tooth surface, respectively.

In some aspects, the techniques described herein relate to an adjustable block component configurable to attach to an interface component, the adjustable block component including: a mounting body with an angled front surface and a rear surface, the rear surface including a mounting interface that is attachable to a corresponding mounting interface of the interface component, the angled front surface including a first slidable mounting interface; a slidable body with a front surface and an angled rear surface, the angled rear surface including a second slidable mounting interface to adjustably connect the slidable body to the mounting body with the angled rear surface at least partially engaged with the angled front surface, the rear surface configured to, when attached to the interface component, remain substantially perpendicular to a plane defined by a top surface of the interface component; and an actuation component configured to control a position of the slidable body relative to a plane defined by the angled front surface.

In some aspects, the techniques described herein relate to an adjustable block component, wherein the second slidable mounting interface includes one or more grooves that extend along a face of the angled rear surface and the first slidable mounting interface includes one or more protrusions along a face of the angled front surface to conform to the one or more grooves to support movement of the slidable body along an axis defined by the angled front surface.

In some aspects, the techniques described herein relate to an adjustable block component, wherein the actuation component includes a proximal end and a distal end, the distal end including a threaded component, the angled rear surface of the slidable body including a recessed cavity to house at least a portion of the threaded component, and the angled front surface of the mounting body including a tapped semicylindrical aperture along an axis defined by the angled front surface to engage with the threaded component.

In some aspects, the techniques described herein relate to an adjustable block component, wherein the proximal end of the actuation component includes an actuator configured to control the position of the slidable body relative to the plane defined by the angled front surface when actuated by rotating the threaded component.

In some aspects, the techniques described herein relate to an adjustable block component, wherein the angled front surface is a downward sloping surface defined by a substantially consistent angular deviation from a plane defined by the rear surface of the mounting body and the angled rear surface of the slidable body is an upward sloping surface substantially parallel to the angled front surface.

In some aspects, the techniques described herein relate to an adjustable block component, wherein the front surface of the slidable body includes a face surface and one or more angled surfaces that are angled at an acute angle relative to the face surface.

In some aspects, the techniques described herein relate to an adjustable block component, wherein the interface component includes an interface rear surface, an interface top surface, an interface bottom surface, and an interface front surface, the interface front surface including the corresponding mounting interface and at least one of the interface rear surface, the interface top surface, or the interface bottom surface including an additional mounting interface that is attachable to one or more block bodies.

In some aspects, the techniques described herein relate to an adjustable length block assembly including: a block body including a top surface, a bottom surface, and a front surface, the bottom surface including a body tooth surface with an arrangement of teeth that extend downwardly relative to the bottom surface; a plate member including a top surface and a bottom surface, the top surface of the plate member including a plate tooth surface with an arrangement of teeth that extend upwardly relative to the top surface such that the plate tooth surface at least partially engages with the body tooth surface and the plate member is positionable at multiple different positions along a longitudinal length of the block body; and an adjustable block component that includes a rear surface, a front surface, and an actuation component, the rear surface attachable to the front surface of the block body, the actuation component configured to adjust a location of the front surface along a longitudinal length of the adjustable length block assembly.

In some aspects, the techniques described herein relate to an adjustable length block assembly, wherein the front surface of the adjustable block component is configured to remain substantially perpendicular to a plane defined by the top surface of the block body.

In some aspects, the techniques described herein relate to an adjustable length block assembly, wherein the actuation component is configured to restrict movement of the front surface along the longitudinal length of the adjustable length block assembly when not actuated.

In some aspects, the techniques described herein relate to an adjustable length block assembly, wherein the body tooth surface includes two or more modular tooth fittings, the two or more modular tooth fittings removable from the block body.

What is claimed is:

1. An adjustable length block assembly comprising:

a block body including a top surface, a bottom surface, and a front surface that includes a first mounting interface, the bottom surface including a first recessed region and a second recessed region to house a first modular tooth fitting and a second modular tooth fitting, respectively, the first modular tooth fitting and the second modular tooth fitting having arrangements of teeth that extend downwardly relative to the bottom surface;

a plate member including a top surface and a bottom surface, the top surface of the plate member including a plate tooth surface with an arrangement of teeth that extend upwardly relative to the top surface such that the plate tooth surface at least partially engages with the first modular tooth fitting and the second modular tooth fitting and the plate member is positionable at multiple different positions along a longitudinal length of the block body; and an adjustable block component to adjust a length of the adjustable length block assembly, the adjustable block component including:

a mounting body with a rear surface and an angled front surface, the rear surface including a second mounting interface attachable to the first mounting interface of the block body, the angled front surface including a first slidable mounting interface; and a slidable body with an angled rear surface and a front surface, the angled rear surface including a second slidable mounting interface to adjustably connect the slidable body to the mounting body with the angled rear surface at least partially engaged with the angled front surface, the front surface configured to remain substantially perpendicular to a plane defined by the top surface of the block body.

2. The adjustable length block assembly as described in claim 1, wherein the block body includes a pin slot formed at least partially along the top surface and extending through an interior of the block body to the bottom surface and the plate member includes one or more apertures that align with the pin slot of the block body with the plate tooth surface at least partially engaged with the first modular tooth fitting and the second modular tooth fitting.

3. The adjustable length block assembly as described in claim 1, wherein the bottom surface of the plate member includes one or more apertures to house one or more removable studs located an offset distance from a rear surface of the plate member.

4. The adjustable length block assembly as described in claim 1, wherein the first mounting interface includes an aperture and a tapped aperture, and the second mounting interface includes a cylindrical protrusion insertable into the aperture and a threaded cylindrical protrusion dimensioned to be insertable into the tapped aperture.

5. The adjustable length block assembly as described in claim 1, wherein the adjustable block component includes an actuation component at least partially engaged with the mounting body and at least partially engaged with the slidable body to control a position of the front surface of the slidable body along a longitudinal length of the adjustable block component.

6. The adjustable length block assembly as described in claim 5, wherein the actuation component includes a proximal end and a distal end, the distal end including a threaded component, the angled rear surface of the slidable body including a recessed cavity to house at least a portion of the threaded component, and the angled front surface of the mounting body including a tapped semicylindrical aperture along an axis defined by the angled front surface to engage with the threaded component.

7. The adjustable length block assembly as described in claim 1, wherein one of the first slidable mounting interface or the second slidable mounting interface includes a configuration of grooves and an other of the first slidable mounting interface or the second slidable mounting interface includes one or more protrusions to conform to the configuration of grooves to support movement of the slidable body along an axis defined by the angled front surface.

8. The adjustable length block assembly as described in claim 1, wherein the plate member includes a first plate tooth surface and a second plate tooth surface that are substantially parallel to one another, the first plate tooth surface having a first configuration of teeth that is offset from a second configuration of teeth of the second plate tooth surface.

9. The adjustable length block assembly as described in claim 1, wherein the first recessed region and the second recessed region include at least one of a fastener, an adhesive, a magnetic component, or a press fitting.

10. The adjustable length block assembly as described in claim 1, wherein the first recessed region and the second recessed region are configured to house a third modular tooth fitting and a fourth modular tooth fitting, respectively, the third modular tooth fitting and the fourth modular tooth fitting having different arrangements of teeth than the teeth of the first modular tooth fitting and the second modular tooth fitting.

11. An adjustable block component comprising:

a mounting body with an angled front surface and a rear surface, the rear surface including a mounting interface that is attachable to a corresponding mounting interface of an interface component, the angled front surface including a first slidable mounting interface;

a slidable body with a front surface and an angled rear surface, the angled rear surface including a second slidable mounting interface to adjustably connect the slidable body to the mounting body with the angled rear surface at least partially engaged with the angled front surface, the rear surface configured to, when attached to the interface component, remain substantially perpendicular to a plane defined by a top surface of the interface component;

an actuation component configured to control a position of the slidable body relative to a plane defined by the angled front surface to adjust a length of the interface component; and the interface component including:

a top surface, a bottom surface, and a front surface that includes a first mounting interface, the bottom surface including a first recessed region and a second recessed region to house a first modular tooth fitting and a second modular tooth fitting, respectively, the first modular tooth fitting and the second modular tooth fitting having arrangements of teeth that extend downwardly relative to the bottom surface; and a plate member including a top surface and a bottom surface, the top surface of the plate member including a plate tooth surface with an arrangement of teeth that extend upwardly relative to the top surface such that the plate tooth surface at least partially engages with the first modular tooth fitting and the second modular tooth fitting and the plate member is positionable at multiple different positions along a longitudinal length of the interface component.

12. The adjustable block component as described in claim 11, wherein the second slidable mounting interface includes one or more grooves that extend along a face of the angled rear surface and the first slidable mounting interface includes one or more protrusions along a face of the angled front surface to conform to the one or more grooves to support movement of the slidable body along an axis defined by the angled front surface.

13. The adjustable block component as described in claim 11, wherein the actuation component includes a proximal end and a distal end, the distal end including a threaded component, the angled rear surface of the slidable body including a recessed cavity to house at least a portion of the threaded component, and the angled front surface of the mounting body including a tapped semicylindrical aperture along an axis defined by the angled front surface to engage with the threaded component.

14. The adjustable block component as described in claim 13, wherein the proximal end of the actuation component includes an actuator configured to control the position of the slidable body relative to the plane defined by the angled front surface when actuated by rotating the threaded component.

15. The adjustable block component as described in claim 11, wherein the angled front surface is a downward sloping surface defined by a substantially consistent angular deviation from a plane defined by the rear surface of the mounting body and the angled rear surface of the slidable body is an upward sloping surface substantially parallel to the angled front surface.

16. The adjustable block component as described in claim 11, wherein the interface component is attachable to a surface via removable studs.

17. An adjustable length block assembly comprising:

a block body including a top surface, a bottom surface, and a front surface, the bottom surface including a first recessed region and a second recessed region to house a first modular tooth fitting and a second modular tooth fitting, respectively, the first modular tooth fitting and the second modular tooth fitting having arrangements of teeth that extend downwardly relative to the bottom surface;

a plate member including a top surface and a bottom surface, the top surface of the plate member including a plate tooth surface with an arrangement of teeth that extend upwardly relative to the top surface such that the plate tooth surface at least partially engages with the first modular tooth fitting and the second modular tooth fitting and the plate member is positionable at multiple different positions along a longitudinal length of the block body; and an adjustable block component that includes a rear surface, a front surface, and an actuation component, the rear surface attachable to the front surface of the block body, the actuation component configured to adjust a location of the front surface along a longitudinal length of the adjustable length block assembly.

18. The adjustable length block assembly as described in claim 17, wherein the front surface of the adjustable block component is configured to remain substantially perpendicular to a plane defined by the top surface of the block body.

19. The adjustable length block assembly as described in claim 17, wherein the actuation component is configured to restrict movement of the front surface along the longitudinal length of the adjustable length block assembly when not actuated.

20. The adjustable length block assembly as described in claim 17, wherein the first modular tooth fitting and the second modular tooth fitting are parallel.

* * * * *